United States Patent
Guilloux et al.

(10) Patent No.: US 8,608,312 B2
(45) Date of Patent: Dec. 17, 2013

(54) METHOD FOR DETERMINING AN ASPHERIZATION LAYER FOR AN OPHTHALMIC LENS

(75) Inventors: Cyril Guilloux, Charenton le Pont (FR); Soazic Mousset, Charenton le Pont (FR)

(73) Assignee: Essilor International (Compagnie Generale d' Optique), Charenon le-Pont (FR)

(*) Notice: Subject to any disclaimer, the term of this patent is extended or adjusted under 35 U.S.C. 154(b) by 92 days.

(21) Appl. No.: 13/144,459

(22) PCT Filed: Jan. 11, 2010

(86) PCT No.: PCT/IB2010/050086
§ 371 (c)(1), (2), (4) Date: Jul. 13, 2011

(87) PCT Pub. No.: WO2010/082152
PCT Pub. Date: Jul. 22, 2010

(65) Prior Publication Data
US 2011/0273664 A1    Nov. 10, 2011

(30) Foreign Application Priority Data
Jan. 13, 2009 (FR) ................................... 09 00127

(51) Int. Cl.
*G01C 7/02* (2006.01)
(52) U.S. Cl.
USPC ........... 351/159.73; 351/159.07; 351/159.22; 351/159.46; 351/159.53
(58) Field of Classification Search
CPC .......... G02C 7/02; G02C 7/024; G02C 7/027; G02C 2202/06
USPC ............ 351/159.01, 159.02, 159.07, 159.22, 351/159.46, 159.52, 159.73–159.77
See application file for complete search history.

(56) References Cited

U.S. PATENT DOCUMENTS

| | | | |
|---|---|---|---|
| 5,270,745 A | 12/1993 | Pedrono | |
| 5,272,495 A | 12/1993 | Pedrono | |
| 5,488,442 A | 1/1996 | Harsigny et al. | |
| 5,812,238 A | 9/1998 | Ahsbahs et al. | |
| 6,318,859 B1 | 11/2001 | Baudart et al. | |

(Continued)

FOREIGN PATENT DOCUMENTS

| | | |
|---|---|---|
| EP | 1950601 A1 | 7/2008 |
| JP | 10-175149 A | 6/1998 |

(Continued)

OTHER PUBLICATIONS

International Search Report, PCT/IB2010/050086, dated Apr. 26, 2010, 3 pages.

(Continued)

*Primary Examiner* — Darryl J Collins
(74) *Attorney, Agent, or Firm* — Polsinelli PC

(57) ABSTRACT

The invention relates to a method for determining an aspherization layer for an ophthalmic lens for a wearer for whom a power and an astigmatism have been prescribed. The method can be used equally satisfactorily on a unifocal or a multifocal lens. The invention also extends to the method for determining an ophthalmic lens from an aspoherization layer obtained by the method. The invention improves the optical performance of lenses obtained from semi-finished lenses in which the complex surface is unknown.

19 Claims, 74 Drawing Sheets

(56) References Cited

U.S. PATENT DOCUMENTS

Figure 1:
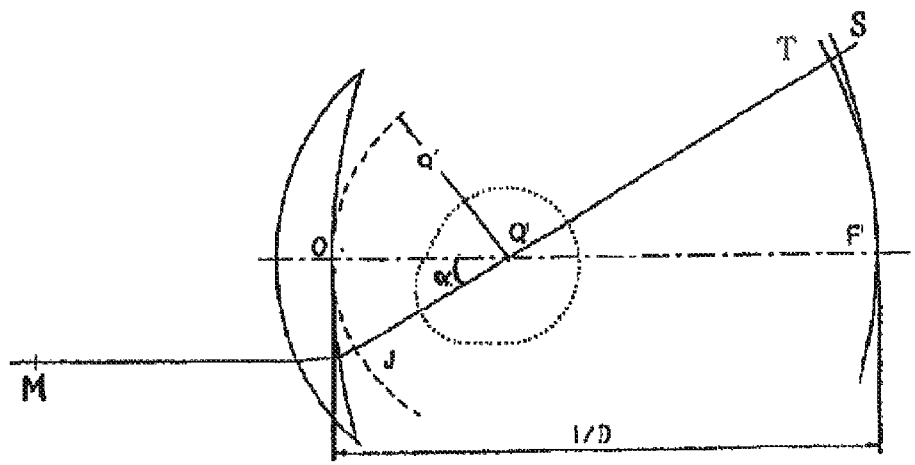

| | | |
|---|---|---|
| 6,382,789 B1 | 5/2002 | Baudart et al. |
| 7,249,850 B2 * | 7/2007 | Donetti et al. ........... 351/159.52 |
| 2003/0048408 A1 | 3/2003 | Yamamoto |

FOREIGN PATENT DOCUMENTS

| | | |
|---|---|---|
| WO | WO 02/059682 A2 | 8/2002 |
| WO | WO 2005/019905 A1 | 3/2005 |
| WO | WO 2007/017766 A2 | 2/2007 |

OTHER PUBLICATIONS

International Preliminary Examination Report, PCT/IB2010/050086, dated Jul. 19, 2011, 13 pages.

* cited by examiner

Sphere map – front surface of the semi-finished lens – example 1

Sphere map – generic surface – example 1

Cylinder map – generic surface – example 1

Sphere map – aspherization layer – example 1

Cylinder map – aspherization layer – example 1

Power and astigmatism defects along the meridian – lens obtained using the method according to the invention – example 1

Power defect map – lens obtained using the method according to the invention – example 1

Astigmatism defect map – lens obtained using the method according to the invention – example 1

Power and astigmatism defects along the meridian – lens according to the prior art – example 1

Power defect map – lens according to the prior art – example 1

Astigmatism defect map – lens according to the prior art – example 1

Sphere map – front surface of the semi-finished lens – example 2

Cylinder map – front surface of the semi-finished lens – example 2

Sphere map – generic surface – example 2

Cylinder map – generic surface – example 2

Cylinder map – aspherization layer – example 2

Power and astigmatism defect along the meridian – lens obtained using the method according to the invention – example 2

Power defect map – lens obtained using the method according to the invention – example 2

Astigmatism defect map – lens obtained using the method according to the invention – example 2

Power and astigmatism defect along the meridian – lens according to the prior art – example 2

Power defect – lens according to the prior art – example 2

Astigmatism defect map – lens according to the prior art – example 2

Sphere map – front surface of the semi-finished lens – example 3

Cylinder map – front surface of the semi-finished lens – example 3

Sphere map – generic surface – example 3

Cylinder map – generic surface – example 3

Cylinder map – aspherization layer – example 3

Power and astigmatism defects along the meridian – lens obtained using the method according to the invention – example 3

Power defect map – lens obtained using the method according to the invention – example 3

Astigmatism defect map – lens obtained using the method according to the invention – example 3

Power and astigmatism defects along the meridian – lens according to the prior art – example 3

Power defect map – lens according to the prior art – example 3

Astigmatism defect map – lens according to the prior art – example 3

Cylinder map – front surface of the semi-finished lens – example 4

Power and astigmatism defects along the meridian – lens obtained using the method according to the invention – example 4

Power defect map – lens obtained using the method according to the invention – example 4

Astigmatism defect map – lens obtained using the method according to the invention – example 4

Power and astigmatism defects along the meridian – lens according to the prior art – example 4

Power defect map – lens according to the prior art – example 1

Sphere map – front surface of the semi-finished lens – example 5

Cylinder map – front surface of the semi-finished lens – example 5

Cylinder map – generic surface – example 5

Sphere map – aspherization layer – example 5

Power and astigmatism defects along the meridian – lens obtained using the method according to the invention – example 5

Power defect map – lens obtained using the method according to the invention – example 5

Astigmatism defect map – lens obtained using the method according to the invention – example 5

Power and astigmatism defects along the meridian – lens according to the prior art – example 5

Power defect map – lens according to the prior art – example 5

Astigmatism defect map – lens according to the prior art – example 5

Sphere map – front surface of the semi-finished lens – example 6

Cylinder map – front surface of the semi-finished lens – example 6

Sphere map – generic surface – example 6

Cylinder map – generic surface – example 6

Cylinder map – aspherization layer – example 6

Power and astigmatism defects along the meridian – lens obtained using the method according to the invention – example 6

Power defect map – lens obtained using the method according to the invention – example 6

Astigmatism defect map – lens obtained using the method according to the invention – example 6

Power and astigmatism defects along the meridian – lens according to the prior art – example 6

Power defect map – lens according to the prior art – example 6

Astigmatism defect map – lens according to the prior art – example 6

METHOD FOR DETERMINING AN ASPHERIZATION LAYER FOR AN OPHTHALMIC LENS

CROSS-REFERENCE TO RELATED APPLICATIONS

This application is a national stage filing based upon international application number PCT/IB2010/050086, filed on 11 Jan. 2010, and published on 22 Jul. 2010 under international publication number WO 2010/082152 (the '086 application), which claims priority to French application number 09 00 127, filed 13 Jan. 2009 (the '127 application). The '086 application and the '127 application are both hereby incorporated by reference as though fully set forth herein.

The present invention relates to a method for determining an aspherization layer for an ophthalmic lens for a wearer to whom a power and an astigmatism have been prescribed. The method can be applied indifferently for a unifocal or multifocal lens. The invention also refers to a method for determining an ophthalmic lens from an aspherization layer obtained using the method.

A wearer may be prescribed a positive or negative power correction. For presbyopic wearers, the value of the power correction is different in distant vision and near vision, due to the difficulties in accommodating near vision. The prescription is then made up of a near vision power value and an addition representative of the power increment between the distant vision and the near vision. The ophthalmic lenses that offset presbyopia are multifocal lenses, the most adapted being progressive multifocal lenses.

Progressive multifocal ophthalmic lenses are now well known. Such lenses are used to offset presbyopia and allow the wearer of the glasses to view objects in a wide range of distances, without having to take off his glasses. Multifocal lenses typically include a distant vision zone, situated at the top of the lenses, a near vision zone, situated in the bottom of the lens, an intermediate zone connecting the near vision zone and the distant vision zone, as well as a main progression meridian passing through all three zones.

The preamble of document FR-A-2 699 294 describes the different elements of such a progressive multifocal ophthalmic lens, as well as the work done by the applicant to improve the comfort of the wearers of such lenses. Reference may be made to this document for further information on these points.

The application has also proposed, for example in U.S. Pat. No. 5,270,745 or U.S. Pat. No. 5,272,495, to vary the meridian, and in particular its decentration in a near vision control point, as a function of the addition and ametropia.

The applicant also proposed, to better meet the visual needs of presbyopic persons and improve the comfort of progressive multifocal lenses, various improvements (FR-A-2 683 642, FR-A-2 699 294, FR-A-2 704 327).

Usually, progressive multifocal lenses include an aspheric multifocal surface, for example the surface opposite the wearer of the glasses, and a spherical or annular surface, called prescription surface. This spherical or annular surface makes it possible to adapt the lens to the user's ametropia, such that a multifocal lens is generally only defined by its aspheric surface. As is well known, such an aspheric surface is generally defined by the altitude of all of its points. The parameters made up of the minimum and maximum curves in each point are also used, or more commonly their half-sum and their difference. This half-sum and the absolute value of this difference multiplied by a factor n−1, n being the refraction index of the material of the lens, are called average sphere and cylinder.

Families of progressive multifocal lenses are defined, each lens in a family being characterized by an addition, which corresponds to the power variation between the distant vision zone and the near vision zone. More precisely, the addition, noted Add, corresponds to the power variation between a point L of the distant vision zone and a point P of the near vision zone, which are respectively called distant vision control point and near vision control point, and which represent the intersection points of the viewing and the surface of the lens for infinite vision and for reading vision. In a same family of lenses, the addition varies from one lens to another of the family between a minimum addition value and a maximum addition value. Usually, the minimum and maximum addition values are respectively 0.75 diopter and 3.5 diopters, and the addition varies from 0.25 diopter in 0.25 diopter from one lens to another in the family.

Lenses with the same addition differ in a reference point by the value of the average sphere, also called base, measured on the surface opposite the eye. It is for example possible to choose to measure the base at the distant vision control point L.

For progressive multifocal lenses, the choice of a pair (addition, base) thus defines a group or set of aspheric multifocal surfaces. Usually, it is thus possible to define 5 base values and 12 addition values, or sixty multifocal surfaces. For each pair (addition, base), a lens commonly called "semi-finished," whereof the addition is provided by the aspheric surface by the curve variation between the distant vision zone and the near vision zone can be made. Such a lens has enough material for the manufacturer to be able to shape its surface opposite the aspheric surface, which makes it possible to obtain a lens with the desired prescription.

It is known to master the optical performance of the finished lens for each base for a unifocal lens, or for a pair (base, addition) for a multifocal lens, by optimizing the aspheric surface of the "semi-finished" so that the finished lens resulting from the "semi-finished" lens has an optical performance that is:

optimal under standard wearing conditions chosen by the manufacturer for a given power prescription, generally corresponding to a non-astigmatic prescription, i.e. having a zero astigmatism.

non-optimal, but improved relative to the optical performance obtained with a non-optimized semi-finished lens in the case of another prescription or specific wearing conditions.

Indeed, in the case of specific wearing conditions, the glass will have uncontrolled power and astigmatism flaws.

Such aberrations on the multifocal ophthalmic lenses can also arise for annular prescriptions intended for astigmatic wearers. The ophthalmic prescription can comprise, in addition to the power prescription, an astigmatism prescription. Such a prescription is done by the ophthalmologist in the form of a pair made up of an axis value (in degrees) and an amplitude value (in diopters). The amplitude value represents the difference between the minimum and maximum powers in a given direction, which make it possible to correct the visual defect for a wearer. According to the chosen convention, the axis represents the orientation of one of the two powers relative to a reference axis and in an agreed-upon direction of rotation. In practice, the reference axis is horizontal and the direction of rotation is the direct trigonometric direction for each eye, when looking at the wearer. An axis value of +45° therefore represents an axis oriented obliquely, which, when one looks at the wearer, extends from the top right quadrant to the bottom left quadrant. Such an astigmatism prescription is measured on the wearer looking in distant vision. The term "astigmatism" is used to designate the pair (amplitude, angle); although it is an abuse of language, this term is also sometimes used to designate the amplitude of the astigmatism. The context allows a person skilled in the art to understand what accepted meaning is being adopted. It is also known by those skilled in the art that a wearer's power and astigmatism prescription are usually designated and noted using the terms sphere, cylinder, and axis.

Ophthalmic lenses correcting a wearer's astigmatism prescription can be made up of sphero-cylindrical surfaces. In geometric terms, the cylinder is defined by an amplitude value and an axis value. The amplitude represents the absolute difference $1/R_1 - 1/R_2$ between the main curves (multiplied by (n−1)); the axis value represents the orientation of the main curves (multiplied by (n−1)); the axis value represents the orientation of the main curves in a reference, generally related to the surface, and in an agreed-upon direction of rotation.

In such cases of annular prescriptions, the annulus applied on the surface opposite the aspheric surface causes optical aberrations for lack of power and resulting (or residual) astigmatism. These optical aberrations originate on one hand from the uncontrolled combination between the surface aberrations of the aspheric front surface and the prescription annulus, and on the other hand, the optical effects related to the obliqueness of the rays in the field.

One skilled in the art knows how to offset these flaws. For example, WO-A-98/12590 describes a determination method through optimization of a set of multifocal ophthalmic lenses. This document proposes to define the set of lenses by considering the optical characteristics of the lenses and in particular the power and the oblique astigmatism, under the wearing conditions. The lens is optimized by drawing rays, from an ergorama associating a targeted point with each viewing direction under the wearing conditions.

Also known from document EP-A-0 990 939 is a determination method by optimization of an ophthalmic lens for a wearer having an astigmatism prescription. This document proposes to choose a target lens and use a method for drawing rays and to minimize the difference between the residual astigmatism and the astigmatism of the target lens. The residual astigmatism is defined in this document as the amplitude and axis deviation between the prescribed astigmatism and the astigmatism generated by the lens. This method allows better adaptation of the lenses to astigmatic wearers, while avoiding the optical aberrations caused by the addition of an annular surface. The calculation is done in a reference connected to the eye, which makes it possible to take into account the torsion effect of the eye when the wearer looks in an off-center direction.

However, the implementation of such a method assumes knowledge of the multifocal aspheric surface of the lens. However, the aspheric surface may not be known. This is in particular the case when the prescribing laboratory performs the finishing, i.e. the final machining of a semi-finished glass coming from a non-partner or competing manufacturer of the laboratory. Indeed, to prevent the determination of an aspheric surface, known from patent WO-A-2007/017766 is a means for encoding the surface. The method previously described cannot be used and the astigmatism caused by the annular prescription is then not corrected.

There is therefore a need to improve the optical performance of lenses obtained from semi-finished lenses whereof the aspheric surface is unknown, in particular in the case of annular prescriptions or customized wearing conditions.

The invention more particularly proposes a method for determining an aspherization layer for an ophthalmic lens for a wearer for whom a power and an astigmatism have been prescribed, comprising the following steps:
  choosing a generic surface having known sphere and cylinder values at each point;
  creating a fictitious target lens having:
    a front surface that is the generic surface, and
    a rear surface, which is a first simple surface, the target fictitious lens defining optical targets for each viewing direction;
  creating a current fictitious lens, the current fictitious lens initially being an initial fictitious trial lens having:
    a front surface that is the generic surface, and
    a rear surface, which is a second simple surface,
  optimizing the current fictitious lens by modulating the rear surface to achieve the optical targets of the target fictitious lens for each viewing direction;
  determining a complex aspherization layer corresponding to the rear surface of the optimized current fictitious lens from which the rear surface of the initial test fictitious lens is subtracted.

Depending on the embodiments, the method for determining an aspherization layer according to the invention can also include one or more of the following features:
  the optical targets of the fictitious target lens are defined under standard wearing conditions.
  the current fictitious lens is positioned under standard wearing conditions during optimization.
  the current fictitious lens is positioned under customized wearing conditions during optimization.
  Depending on the embodiment, the first simple surface is such that the target fictitious lens has:
    an average power value at a reference point substantially equal to the sum of the prescribed power and half of the prescribed astigmatism, and
    a substantially null value of the prescribed astigmatism at the reference point
  and the second simple surface is such that the initial fictitious test lens has:
    an average power value at a reference point substantially equal to the prescribed power, and
    an astigmatism value at the reference point equal to the prescribed astigmatism.
  Depending on the embodiment, the first simple surface is such that the target fictitious lens has:
    an average power value at a reference point substantially equal to the prescribed power, and
    an astigmatism value at the reference point substantially equal to the prescribed power;
  and in which the second simple surface is such that the initial fictitious test lens has:
    an average power value at a reference point substantially equal to the prescribed power, and
    an astigmatism value at the reference point substantially equal to the prescribed astigmatism.
  Depending on the embodiment, the inventive method can also comprise one or more of the following features:
    a step for providing lens and base index values, for the fictitious target lens and the fictitious initial test lens,
    the step for providing lens and base index values is done by providing a semi-finished lens.
    the optical targets of the fictitious target lens are chosen among the power, astigmatism, resulting astigmatism, prismatic deviation, and distortion targets, or a combination thereof.

the first simple surface and the second simple surface are chosen among an annulus and a sphere.

the ophthalmic lens is a progressive lens, the reference point being the distant vision control point.

The invention also concerns a determination method for a lens for a wearer to whom an astigmatism and a power have been prescribed comprising the steps of:
providing a semi-finished lens,
the determination of a lens having:
the front surface of the semi-finished lens, and
the rear surface having a surface obtained by the sum of the complex aspherization layer obtained using the determination method of an aspherization layer and a simple surface such that the value of the power at the reference point is equal to the prescribed power and the value of the astigmatism at the reference point is equal to the prescribed astigmatism.

Depending on the embodiment, the determination method of an aspherization layer according to the invention can also comprise one or more of the following features:
the provided semi-finished lens is a progressive lens, the chosen generic surface having the same progression length as the semi-finished lens.
the provided semi-finished lens is a progressive lens, the chosen generic surface having the same progression length as the semi-finished lens.

Figure 2:
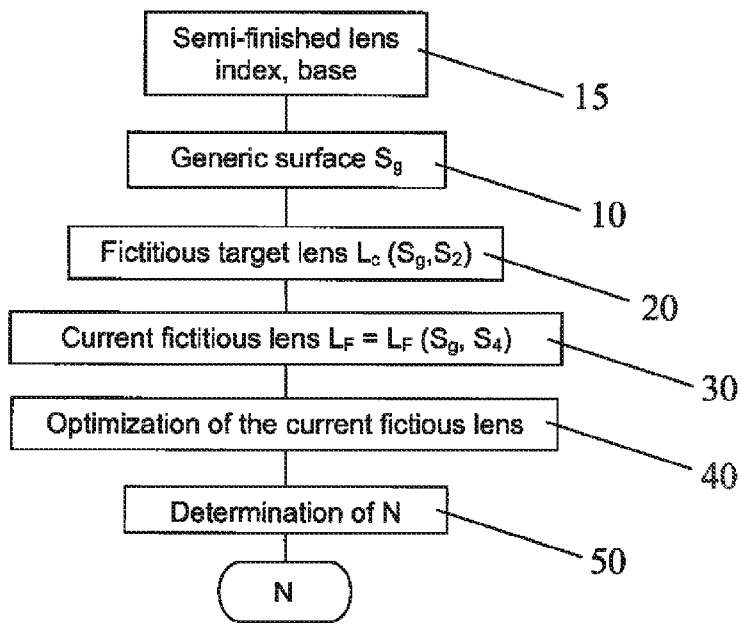
Figure 3:
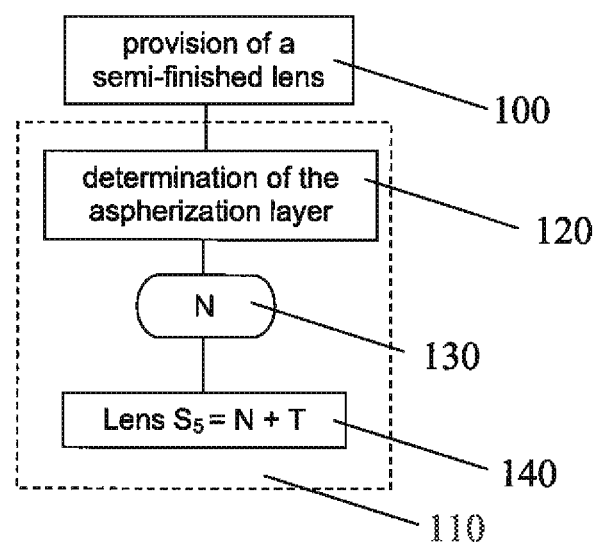
Figure 4:
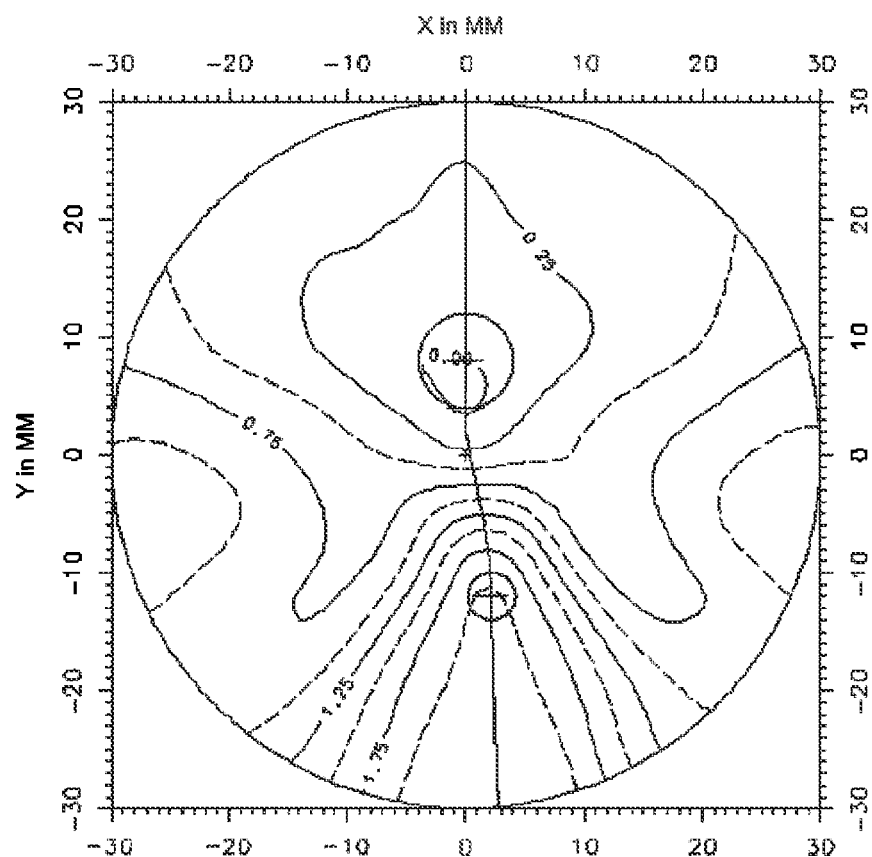
Figure 5:
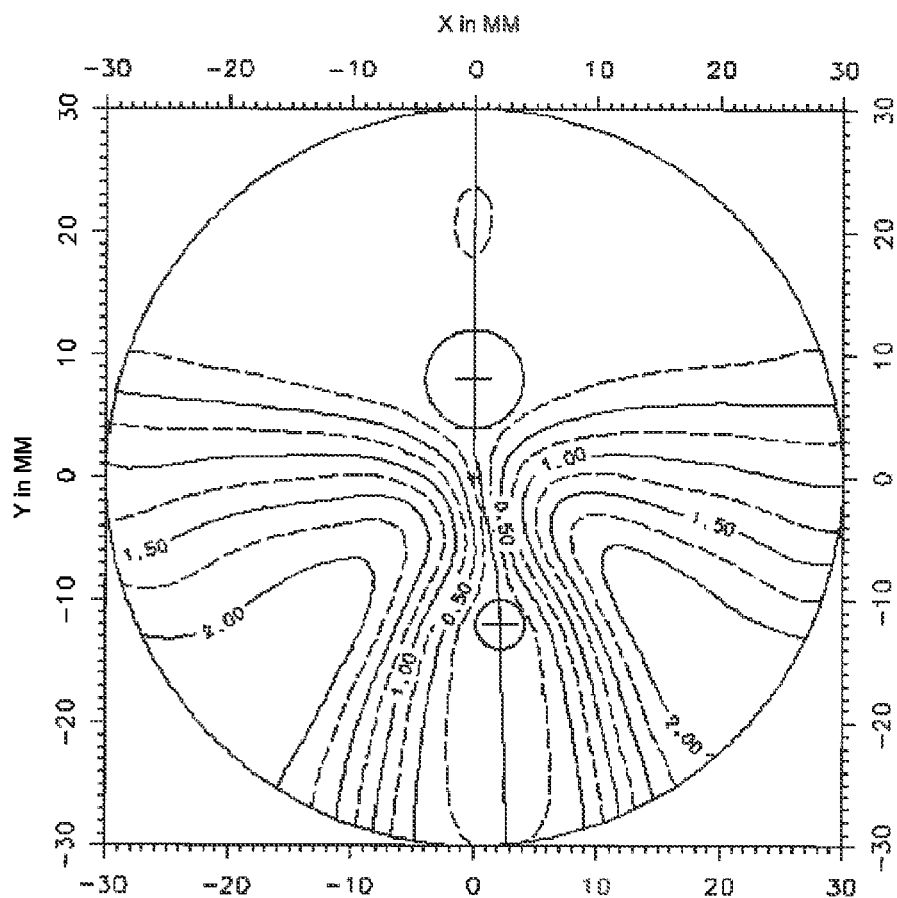
Figure 6:
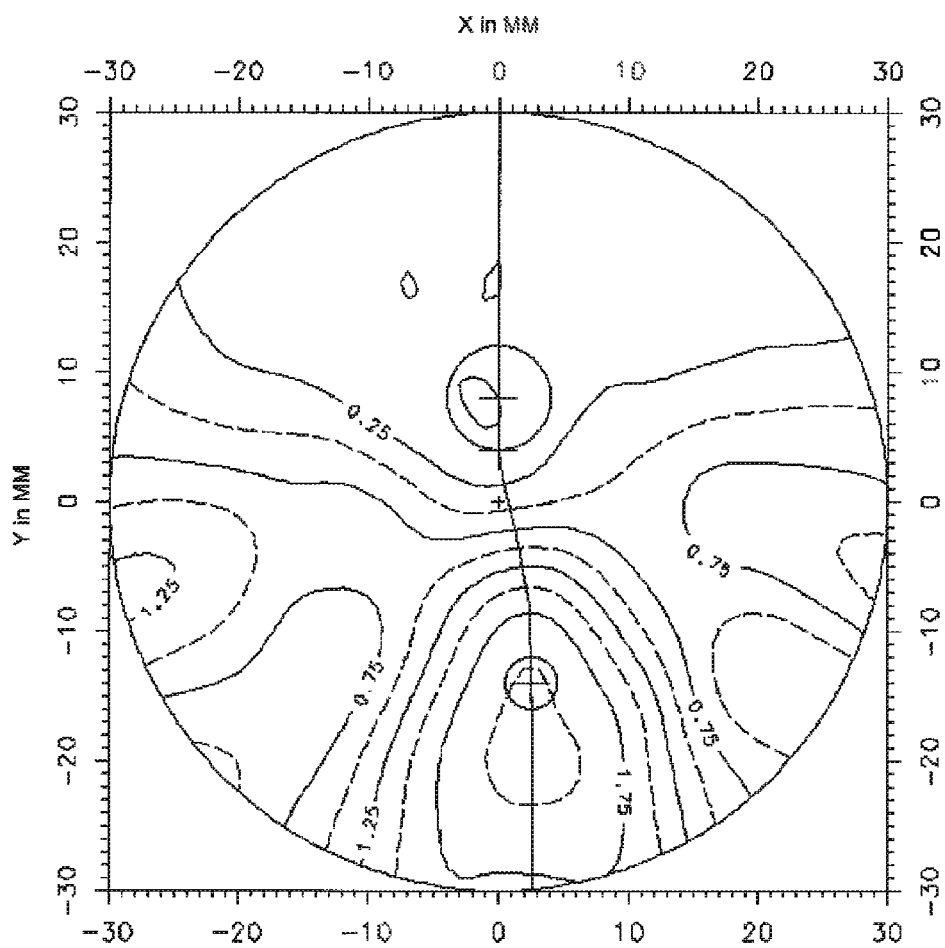
Figure 7:
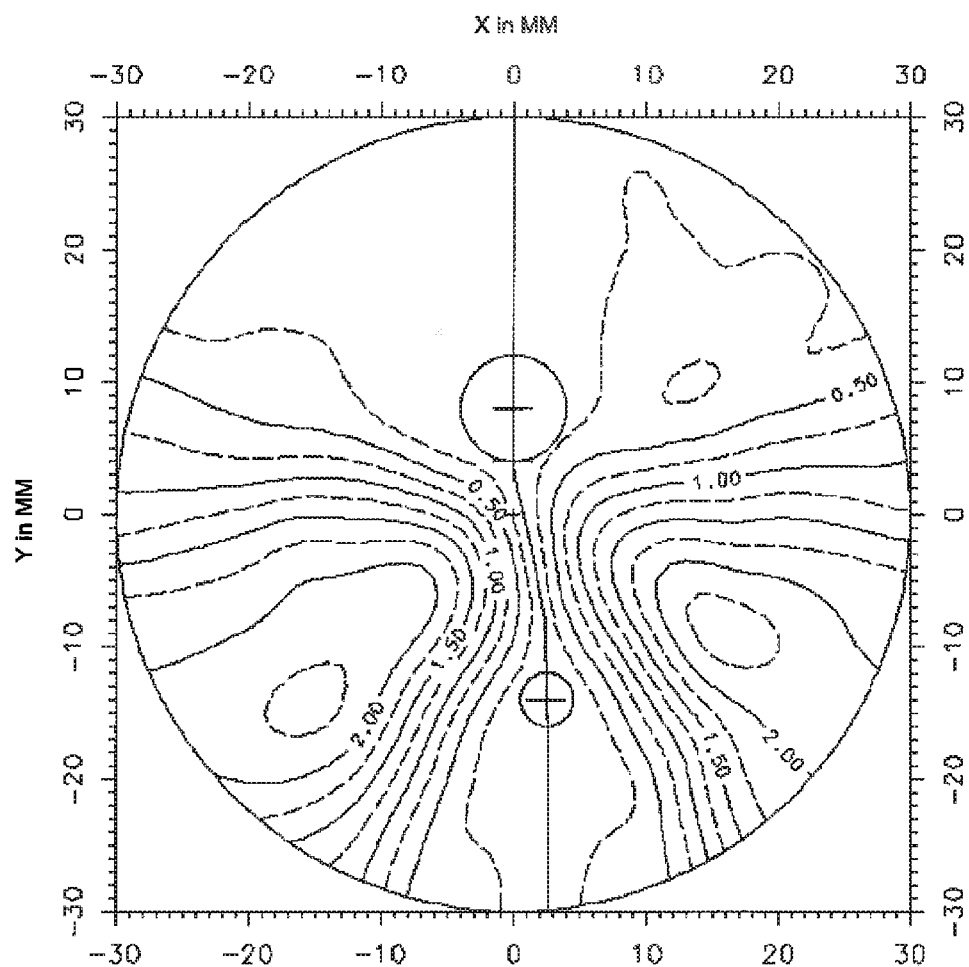
Figure 8:
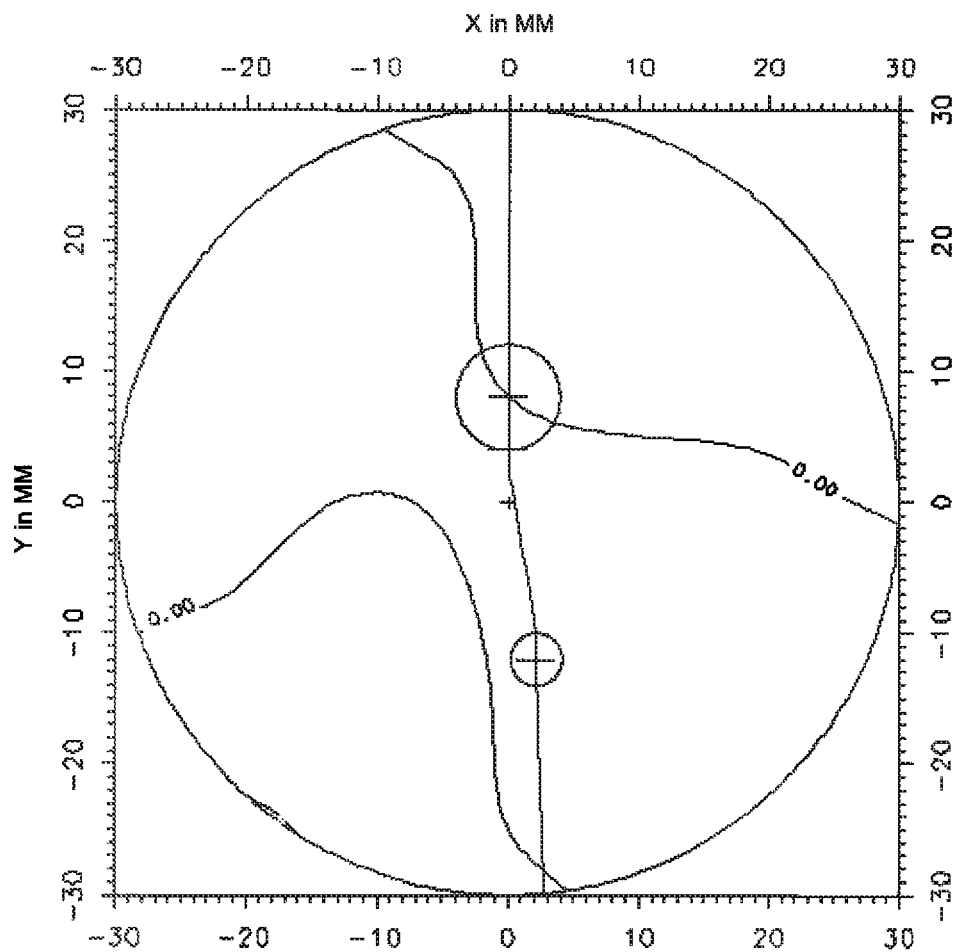
Figure 9:
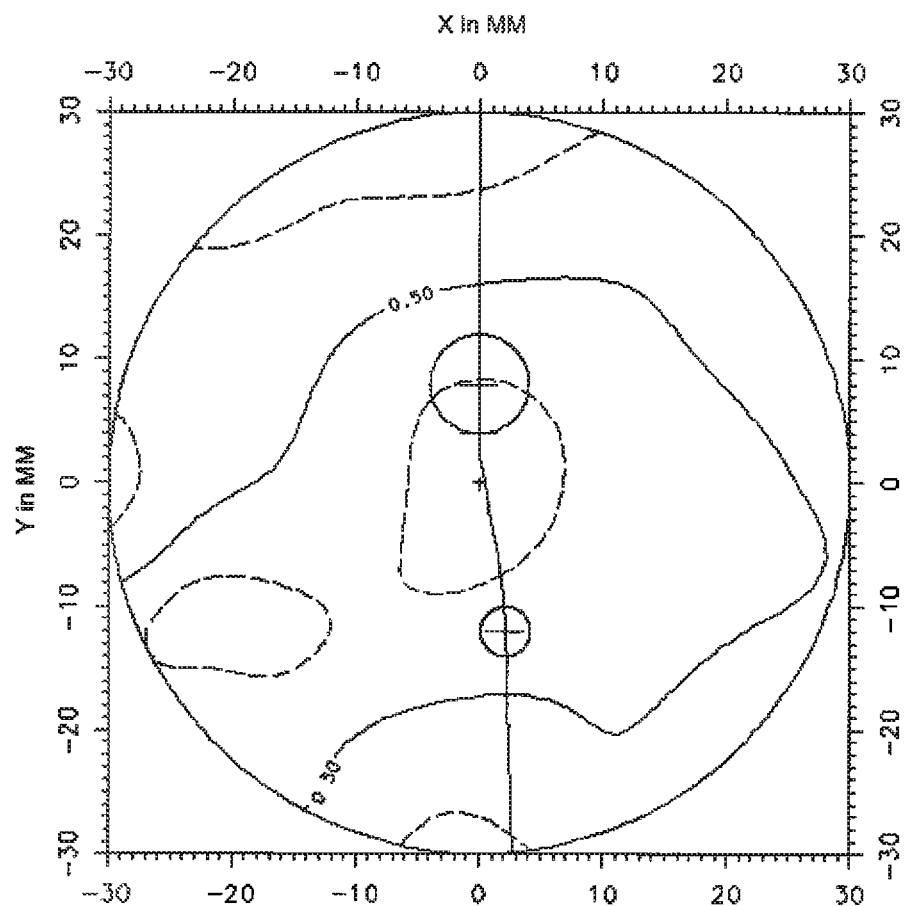
Figure 10:
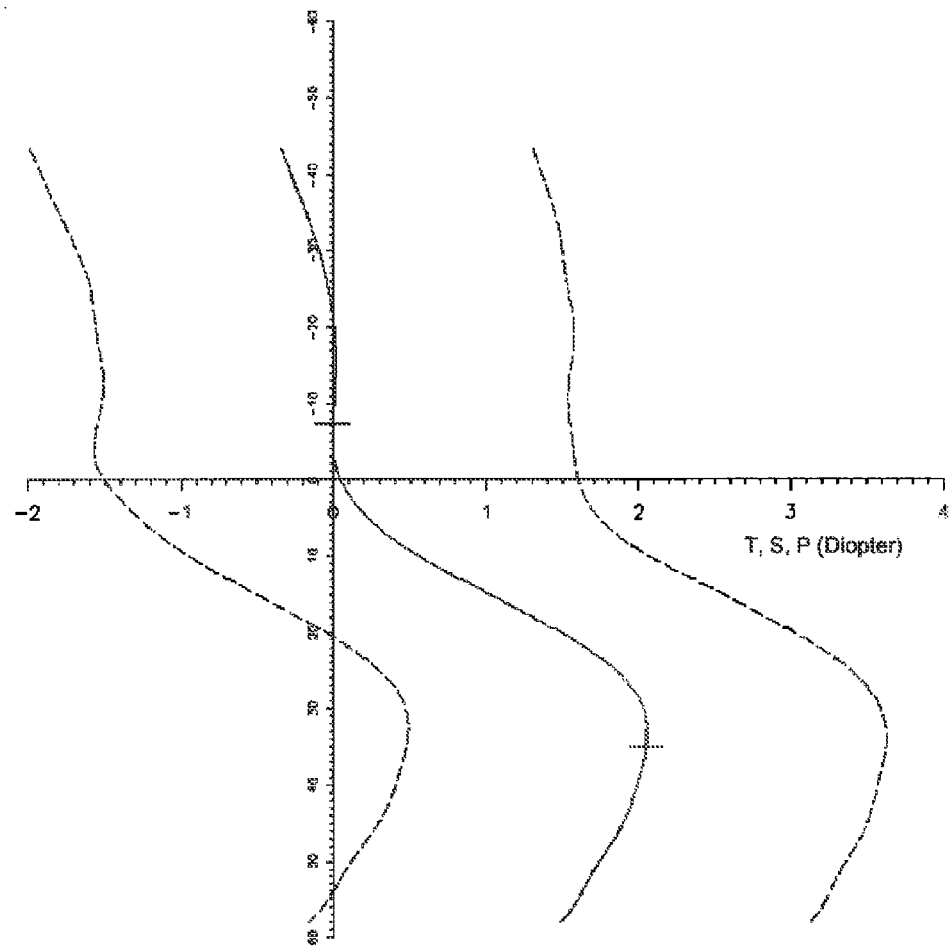
Figure 11:
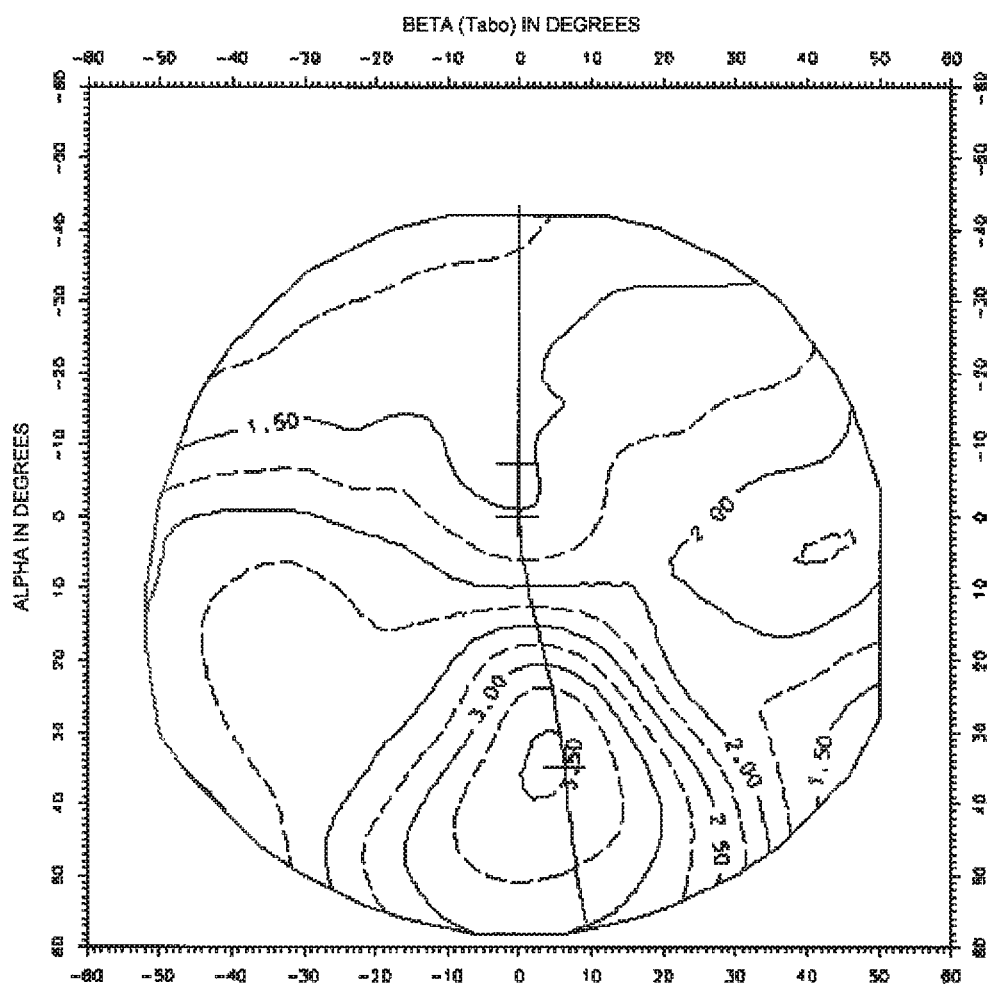
Figure 12:
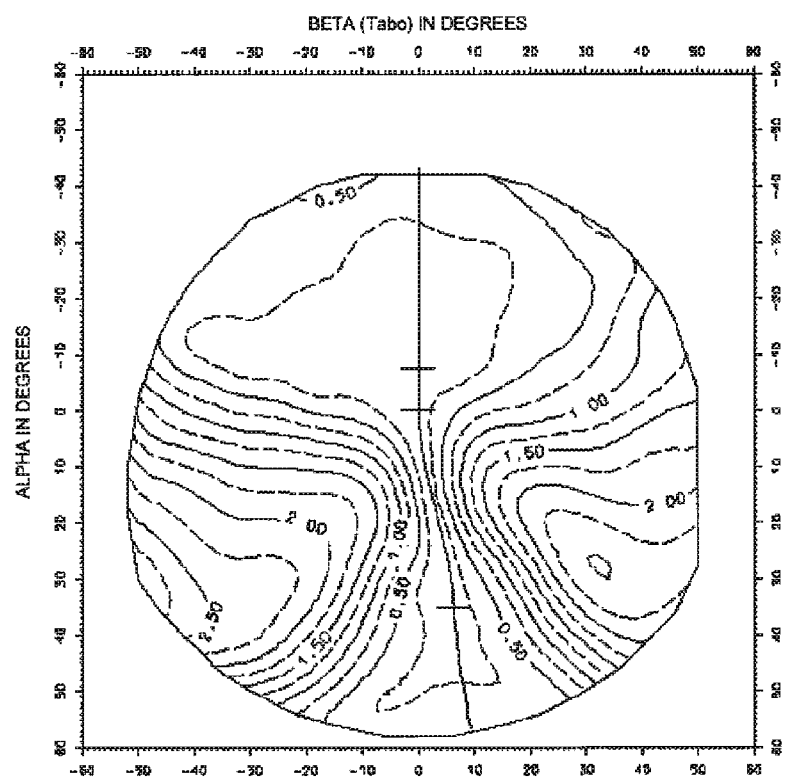
Figure 13:
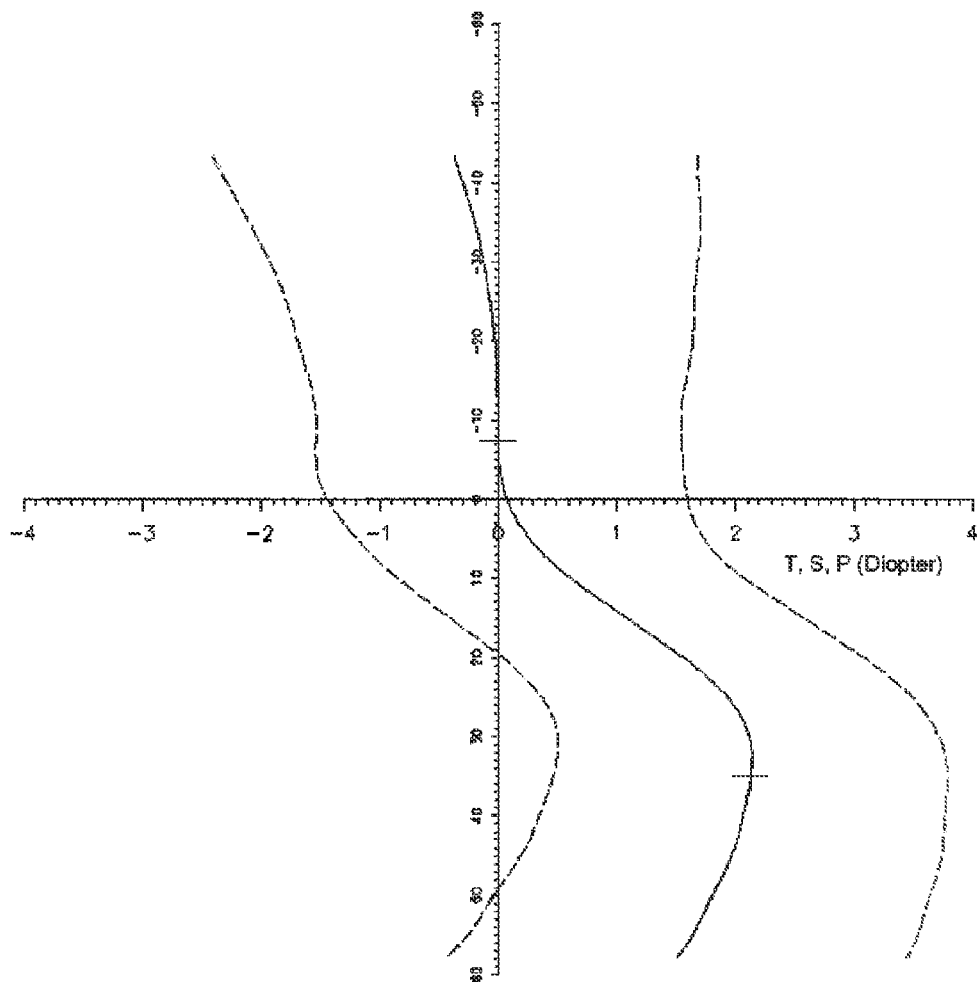
Figure 14:
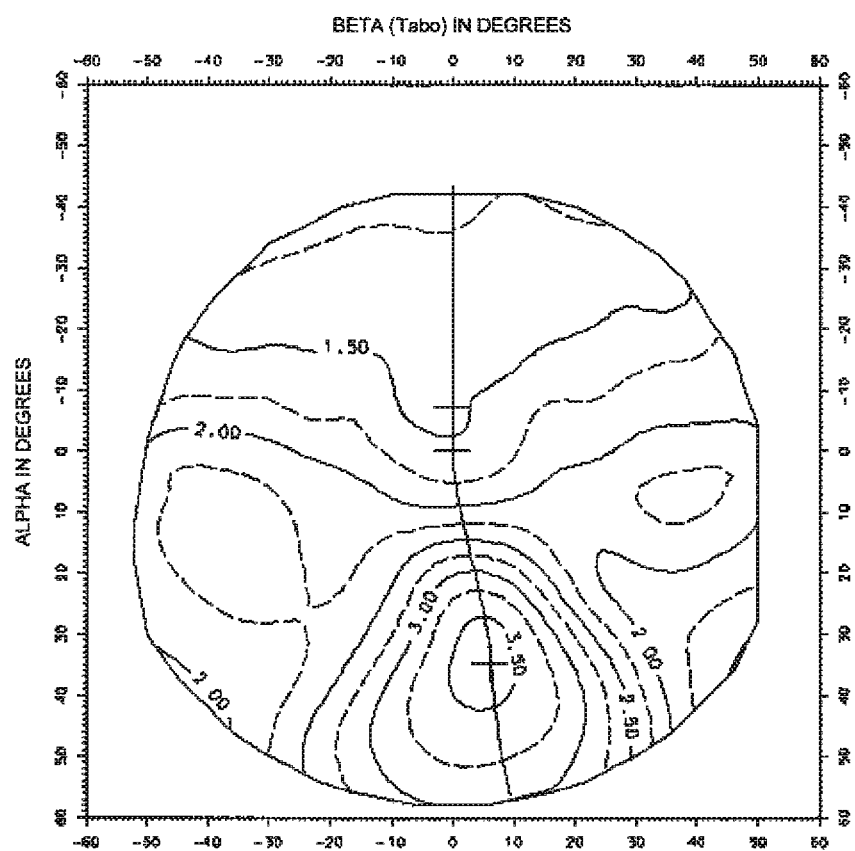
Figure 15:
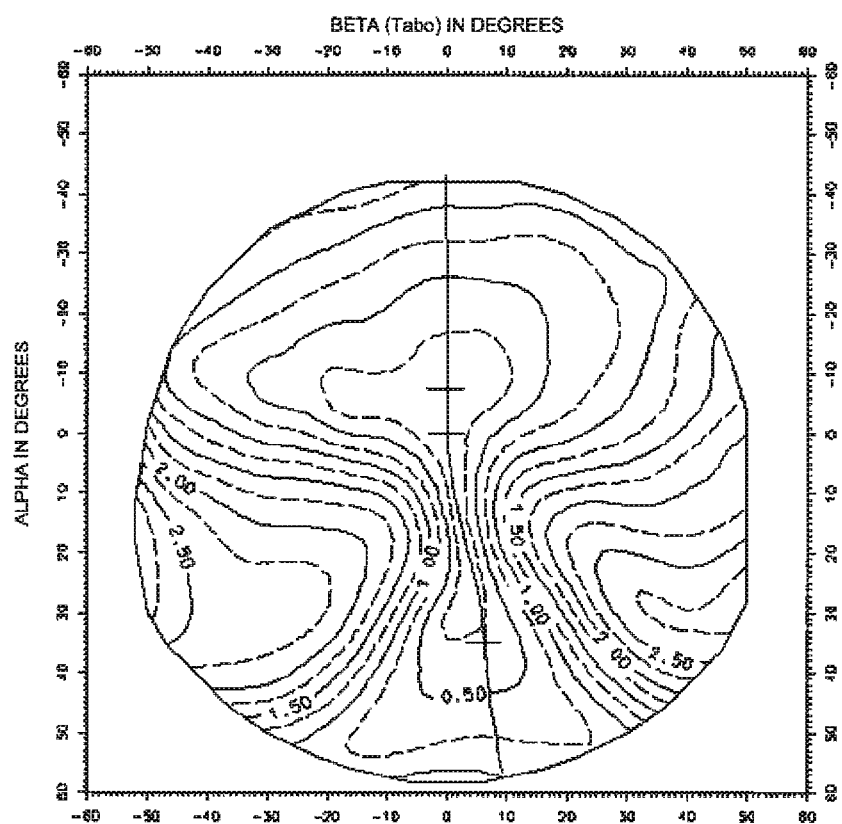
Figure 16:
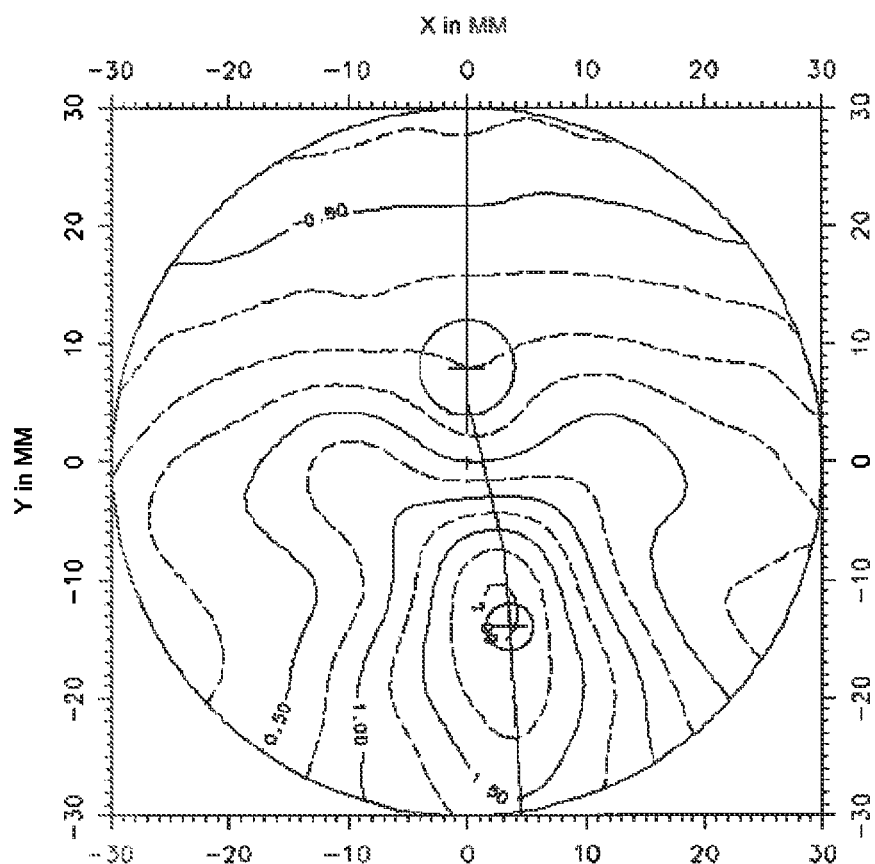
Figure 17:
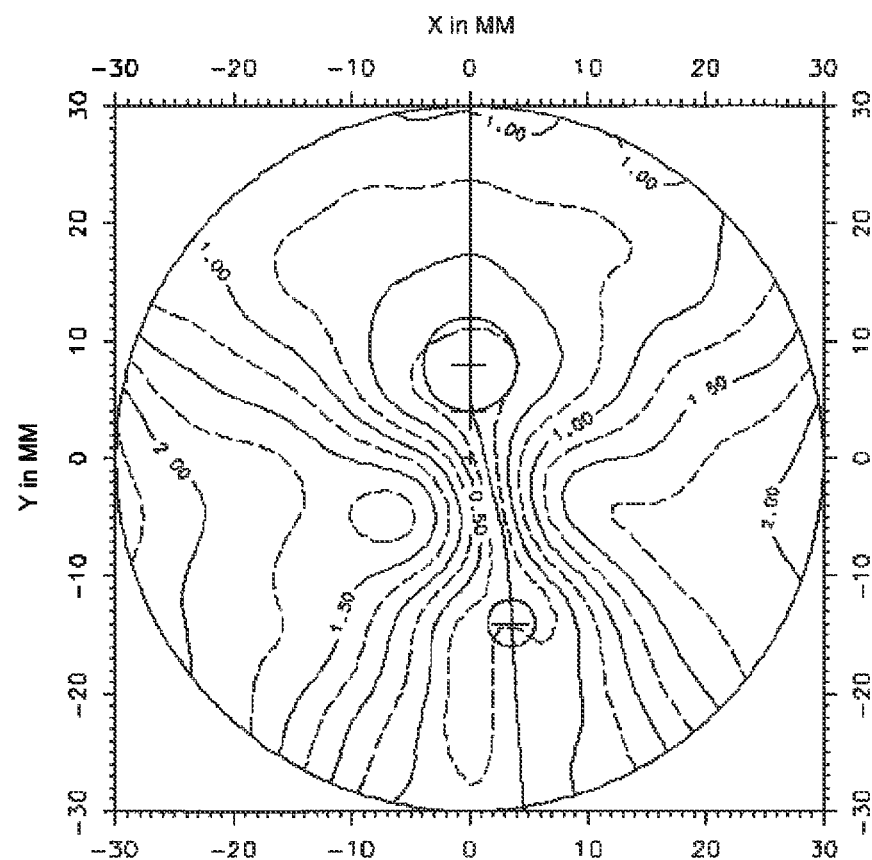
Figure 18:
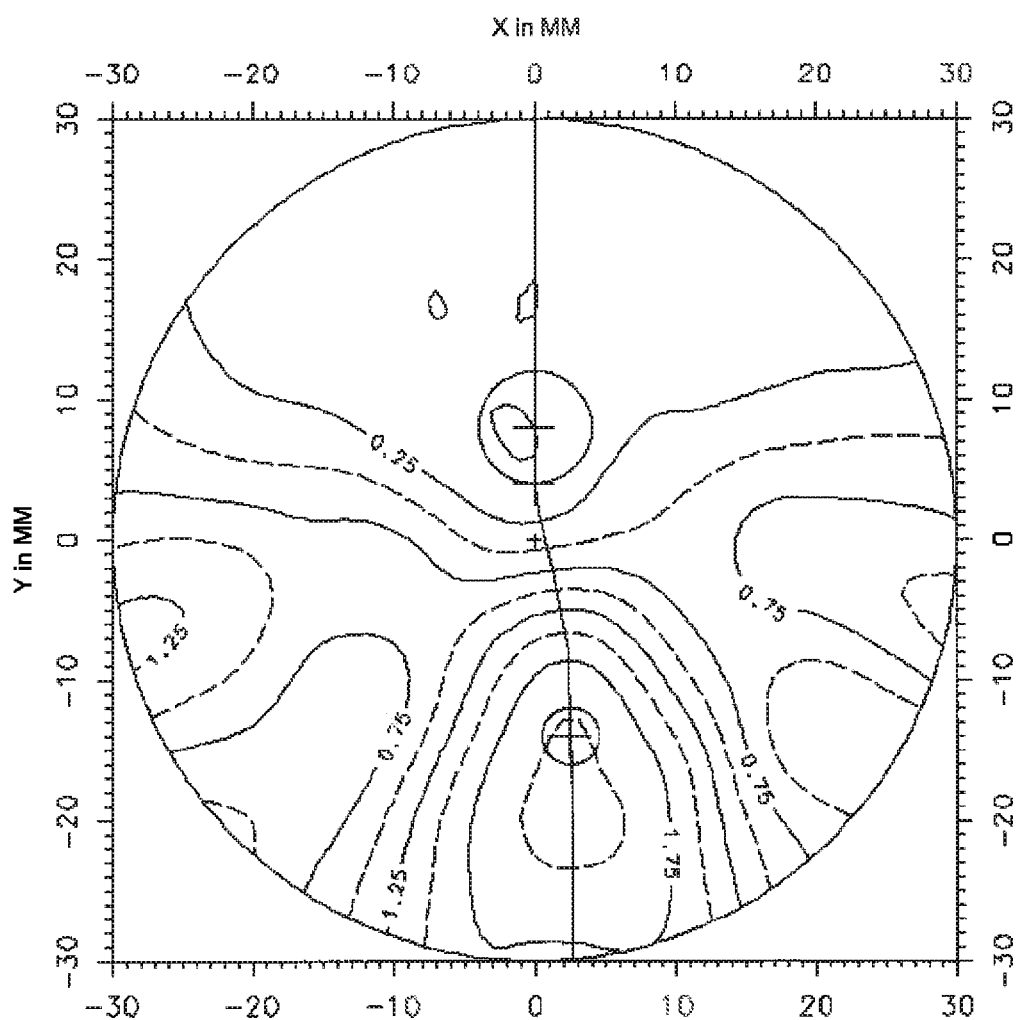
Figure 19:
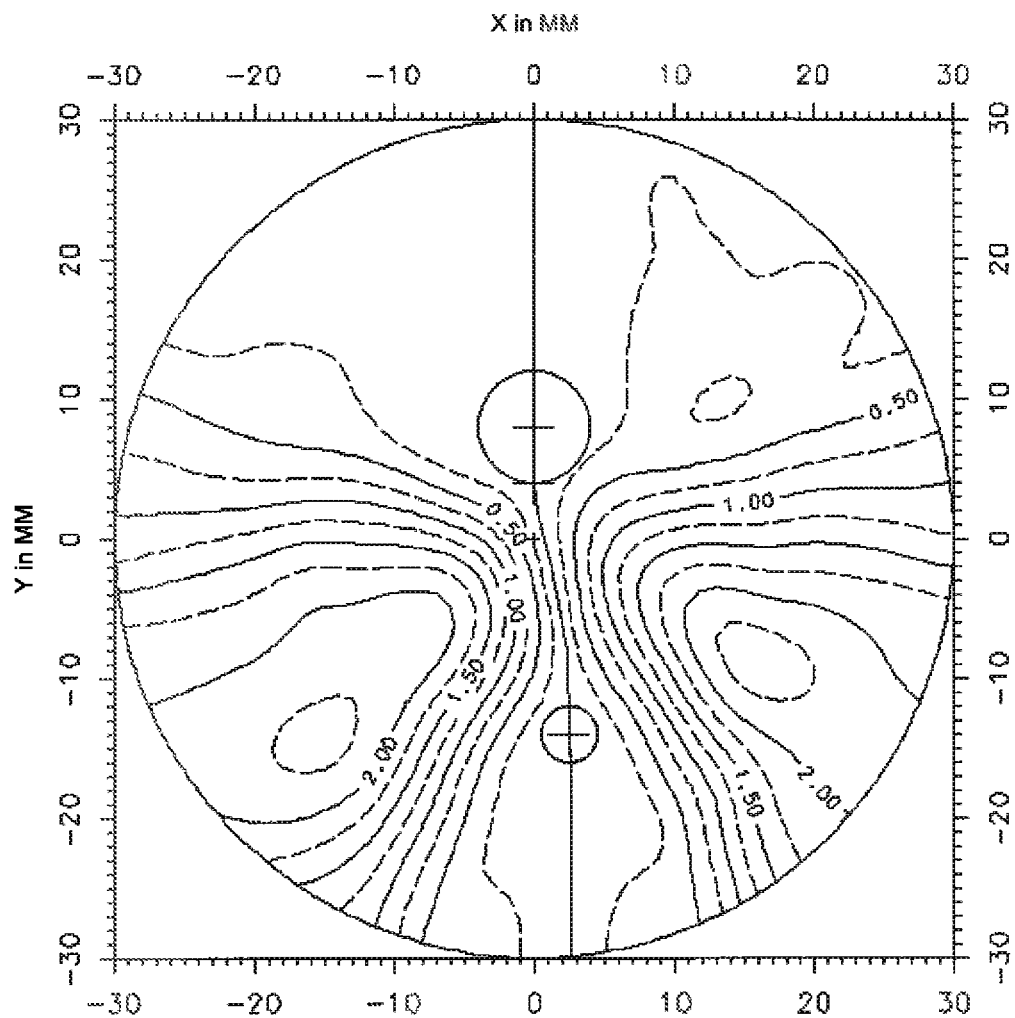
Figure 20:
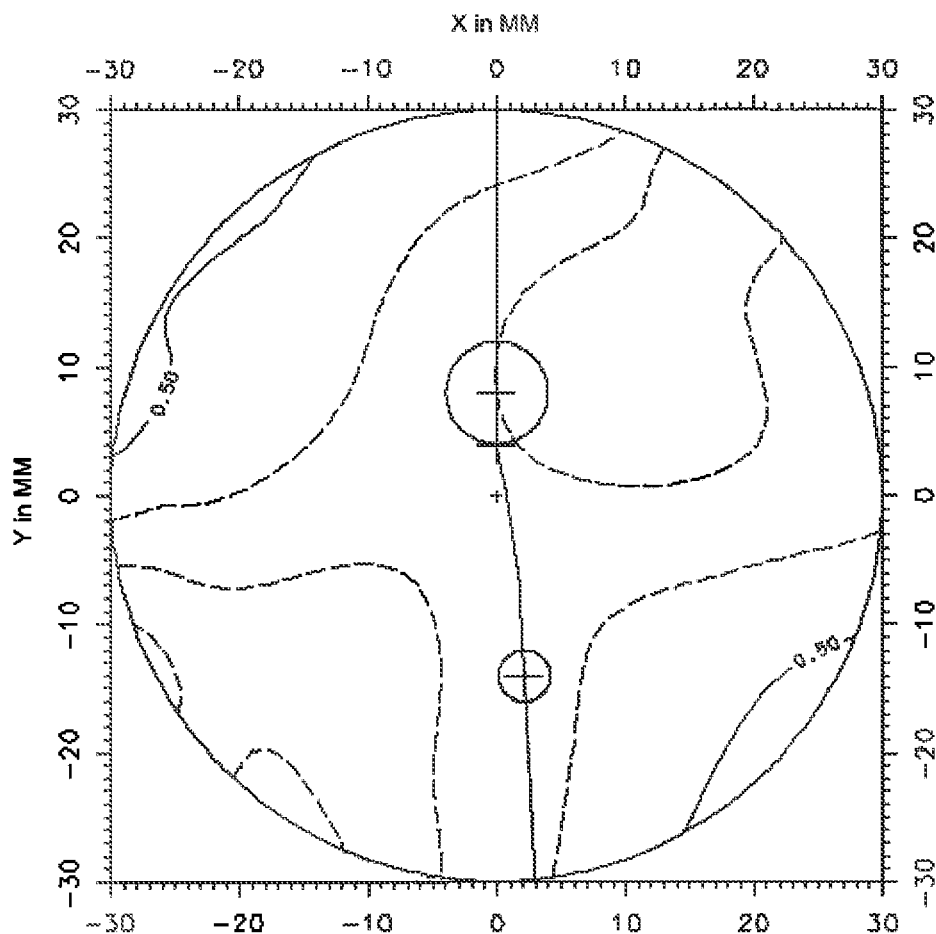
Figure 21:
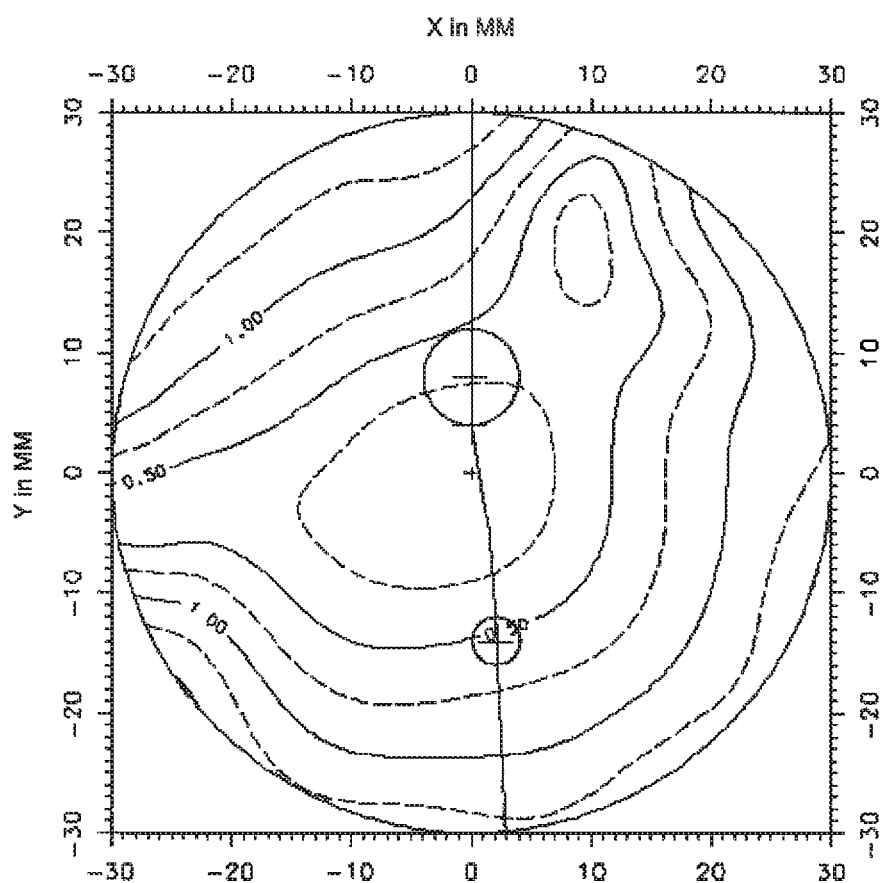
Figure 22:
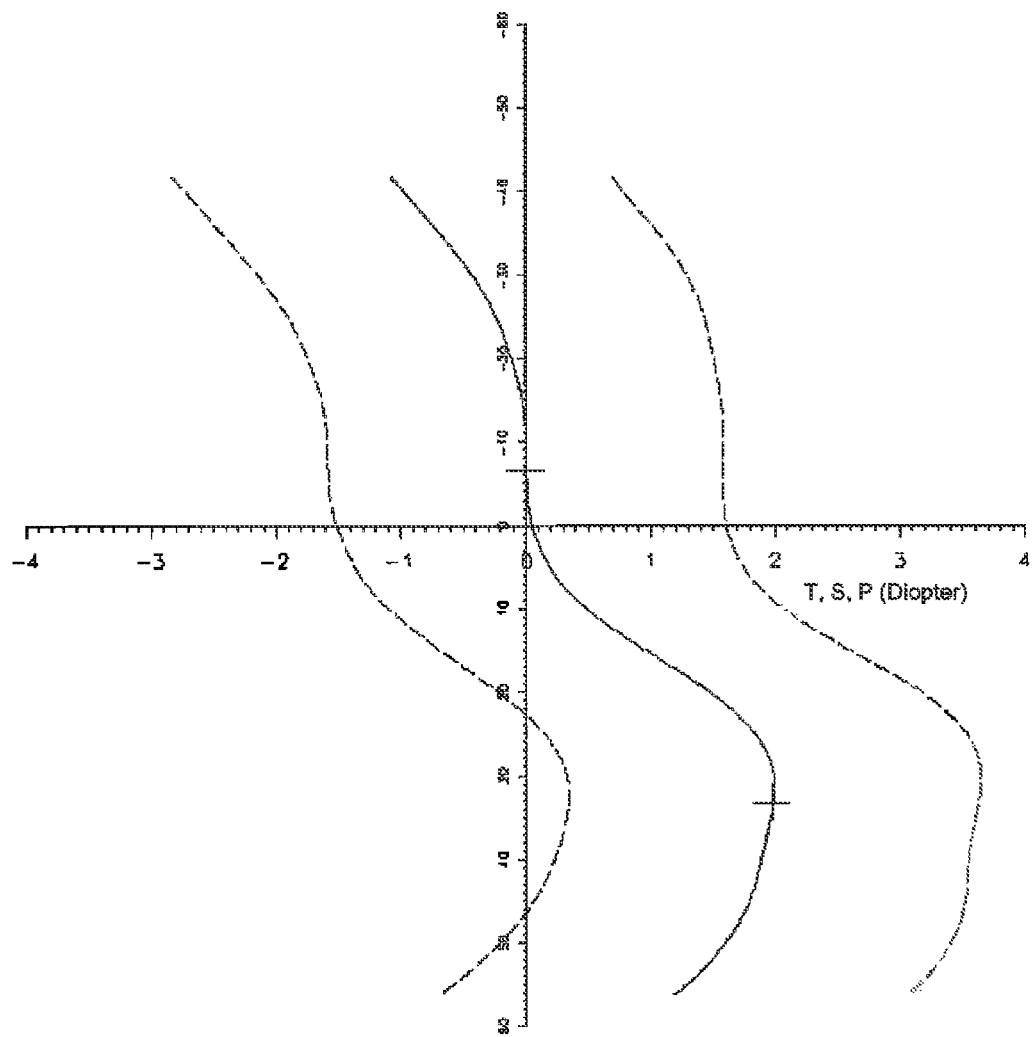
Figure 23:
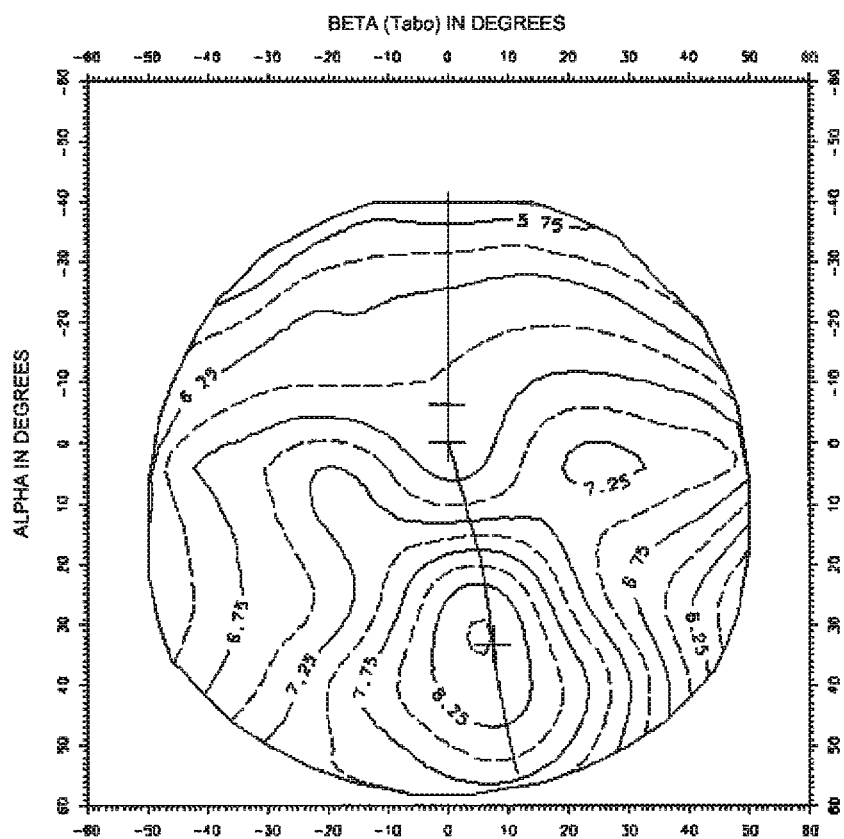
Figure 24:
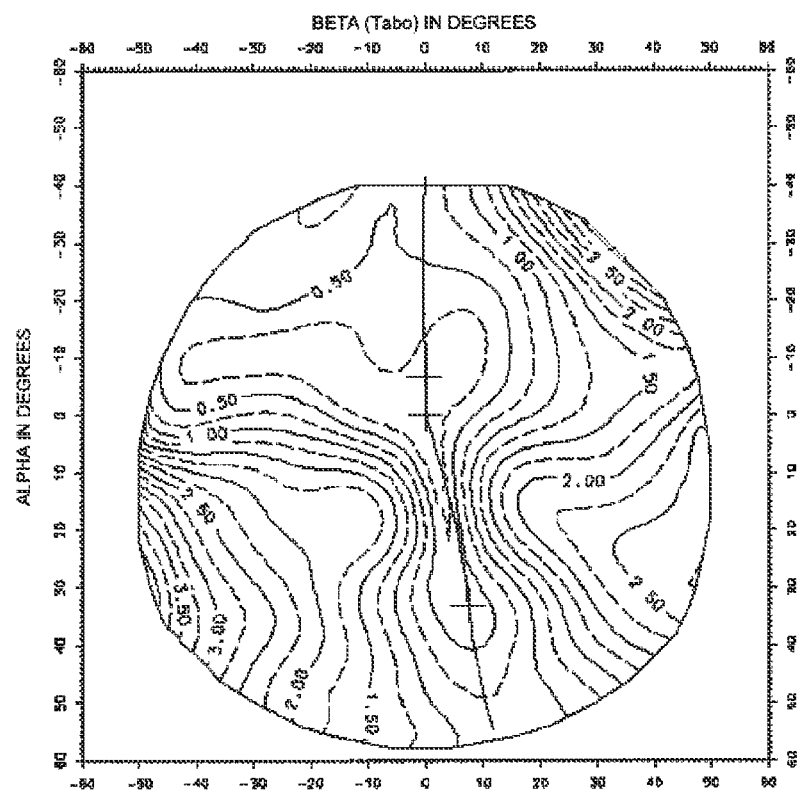
Figure 25:
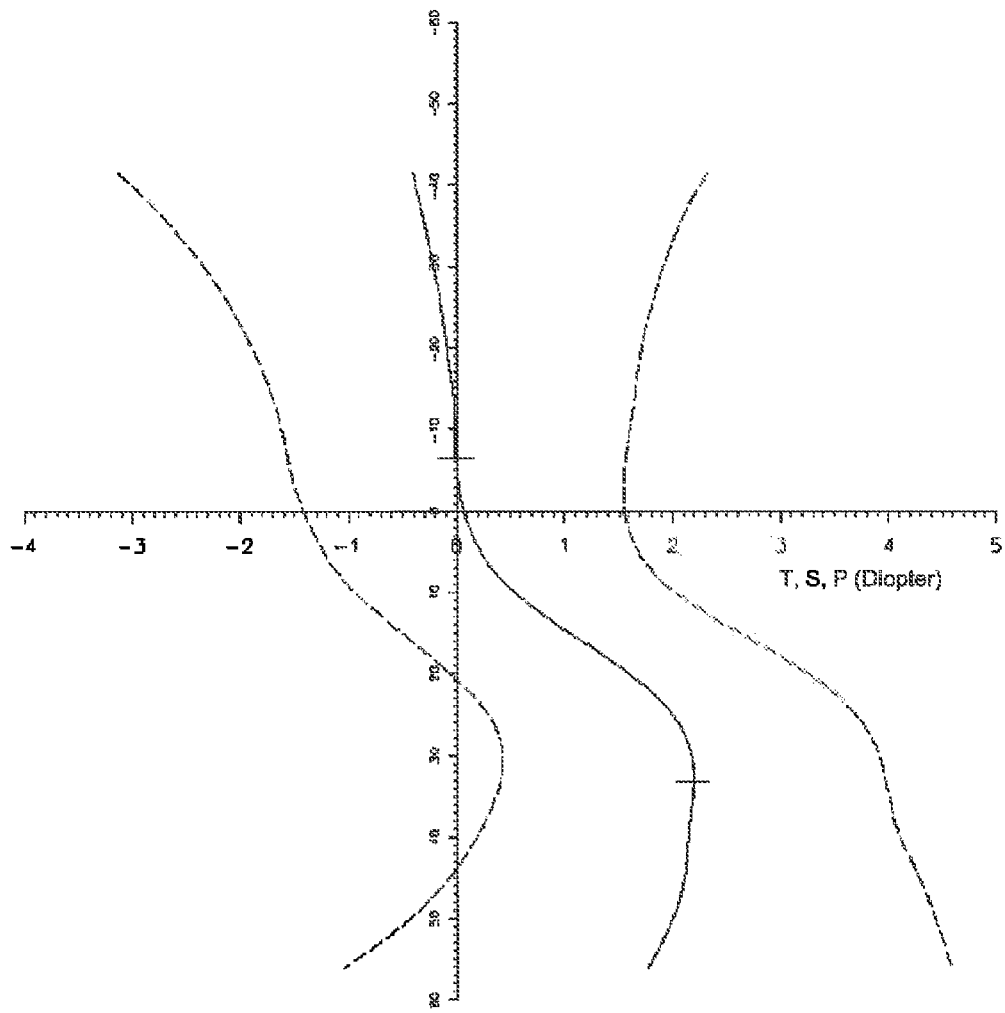
Figure 26:
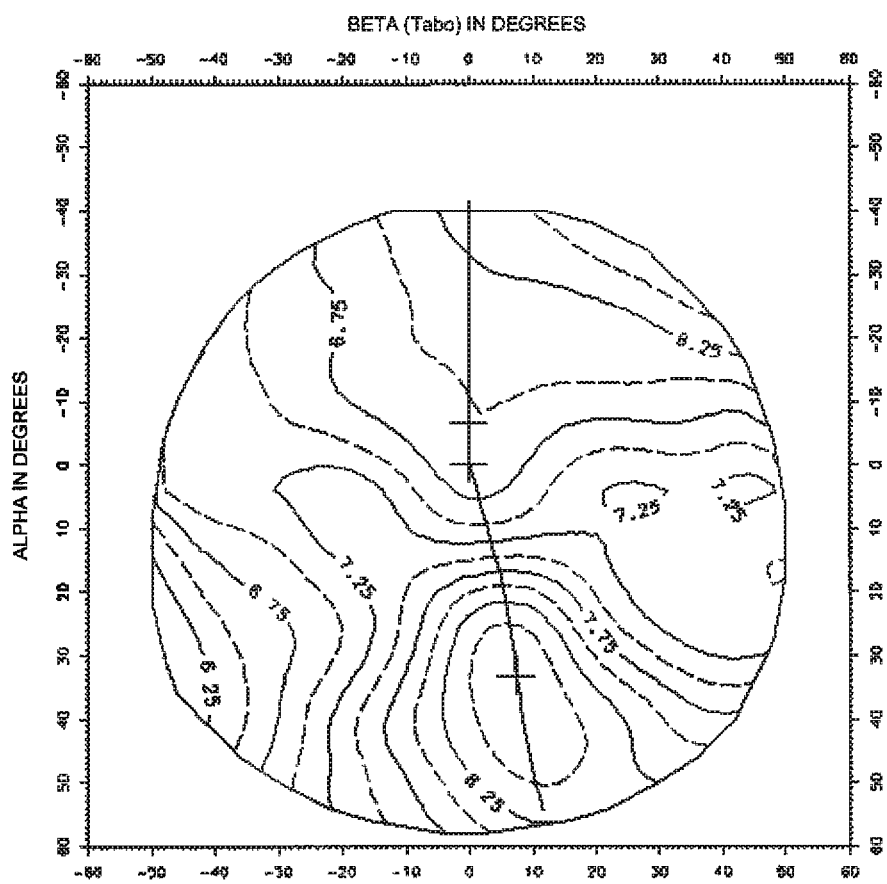
Figure 27:
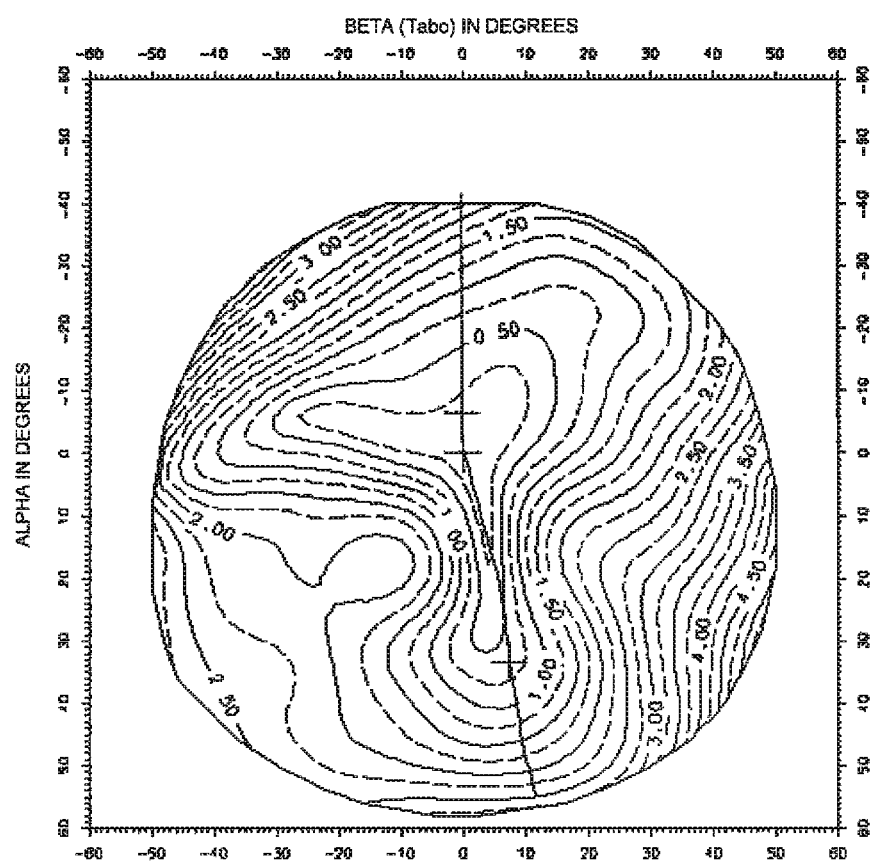
Figure 28:
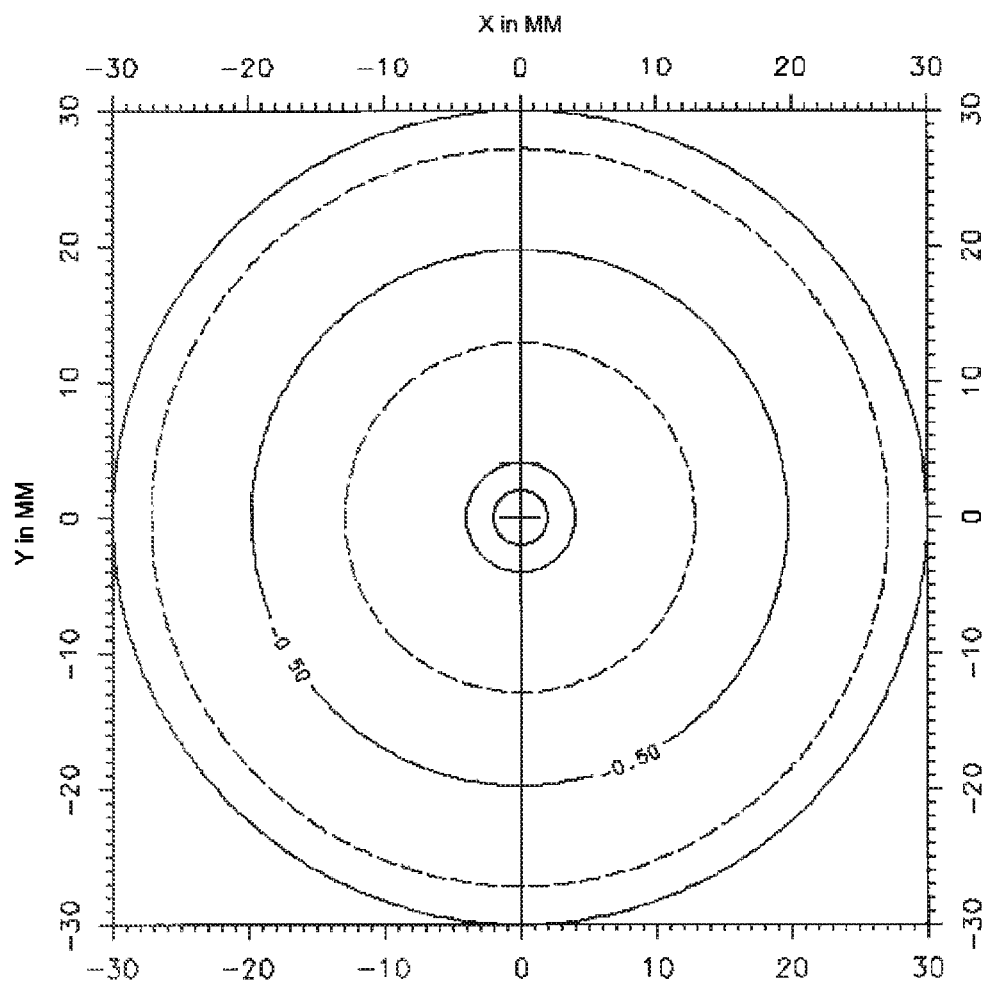
Figure 29:
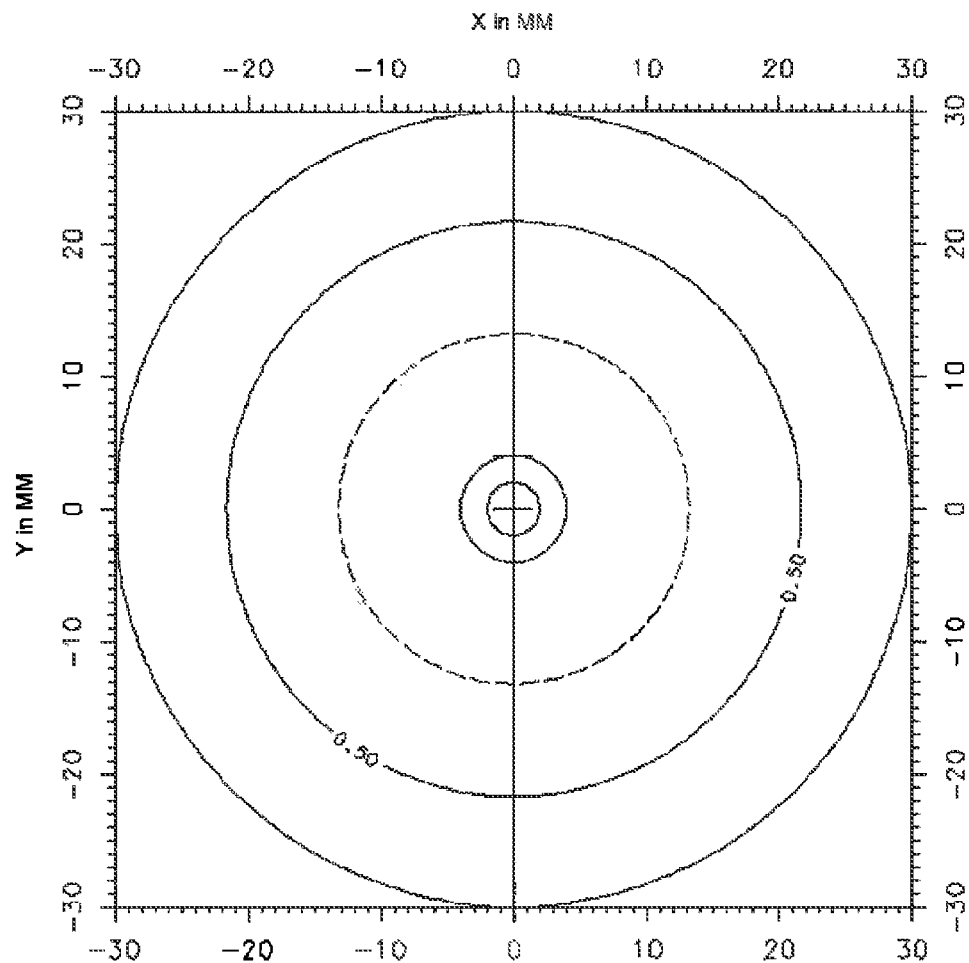
Figure 30:
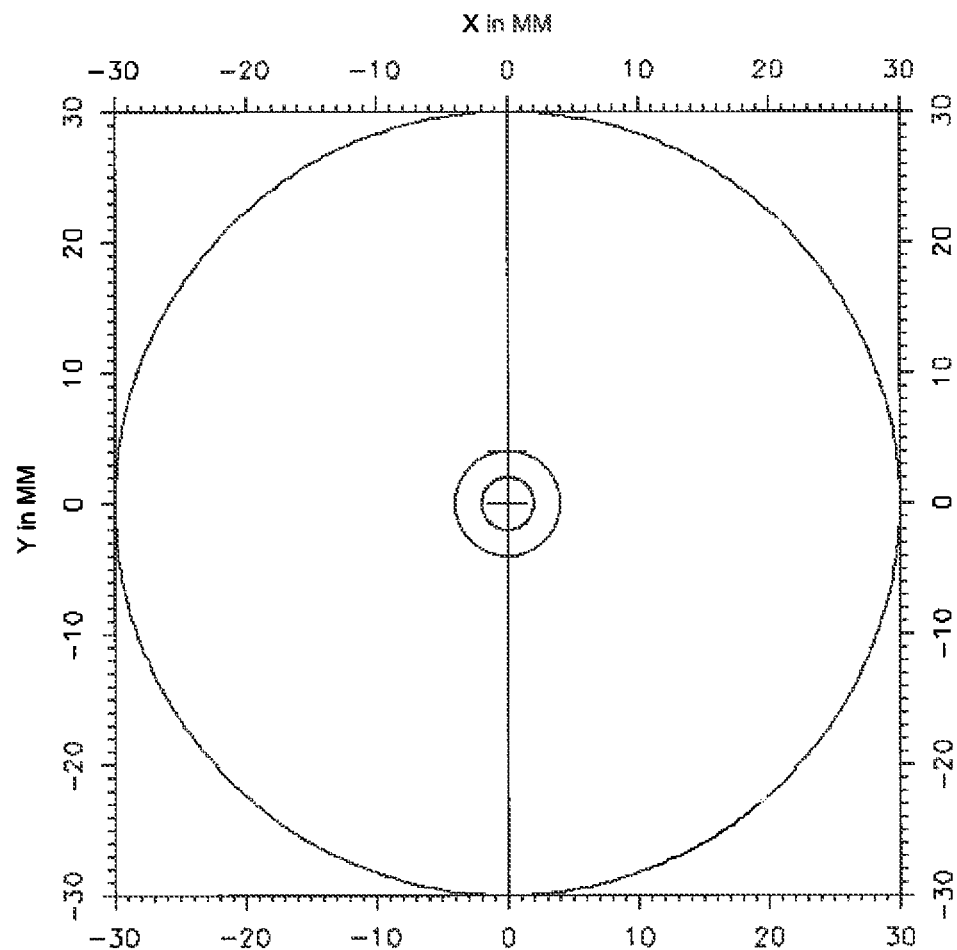
Figure 31:
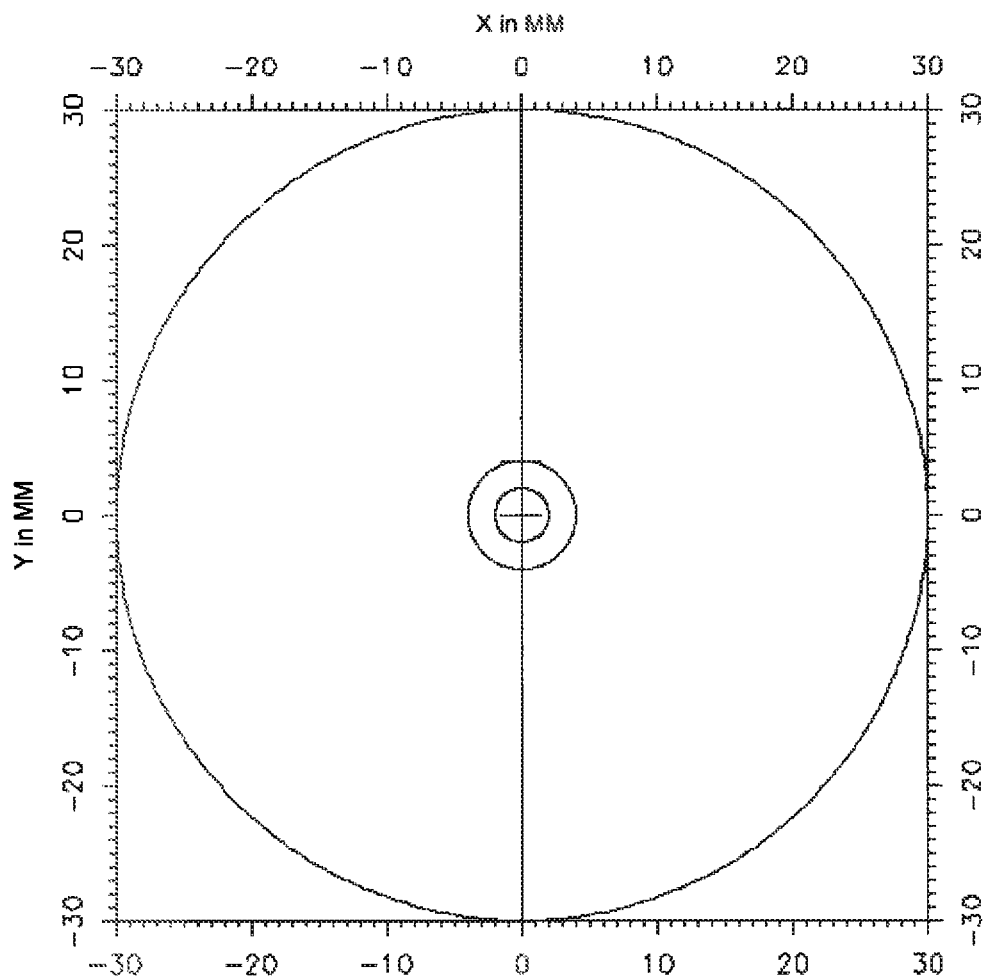
Figure 32:
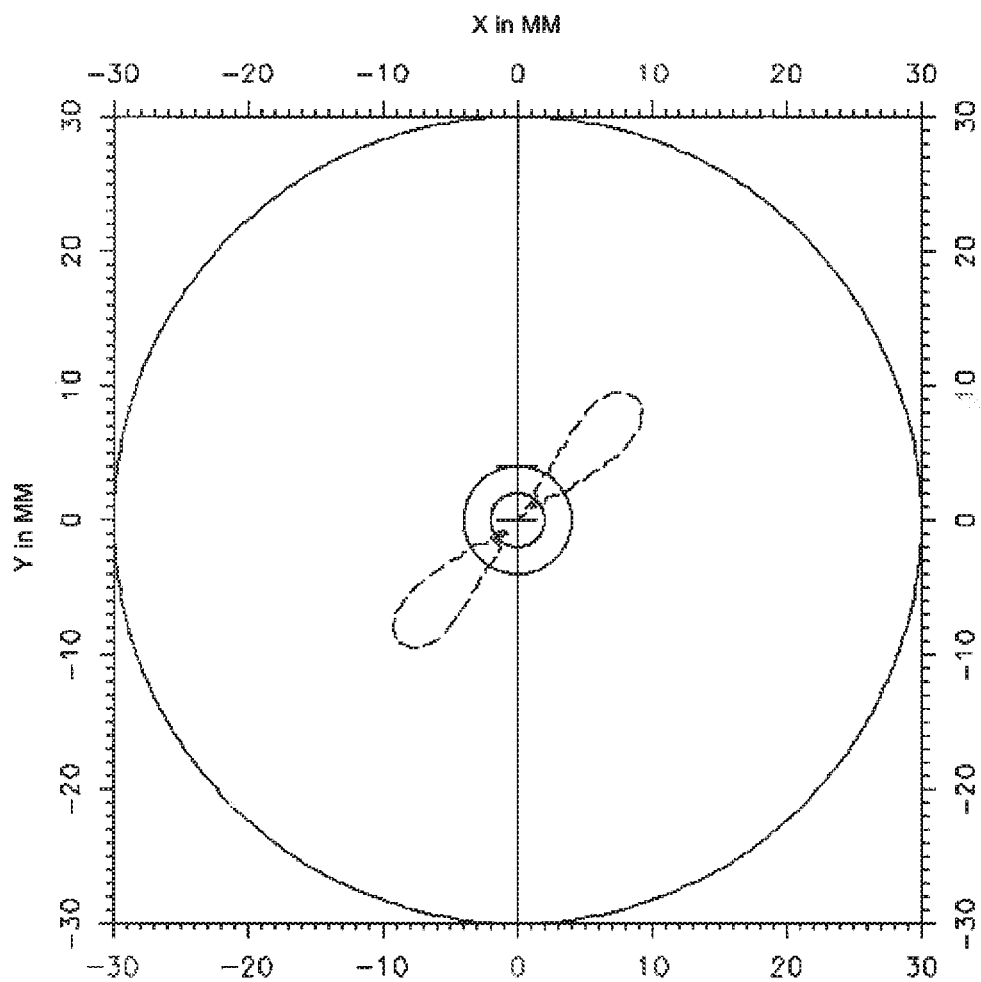
Figure 33:
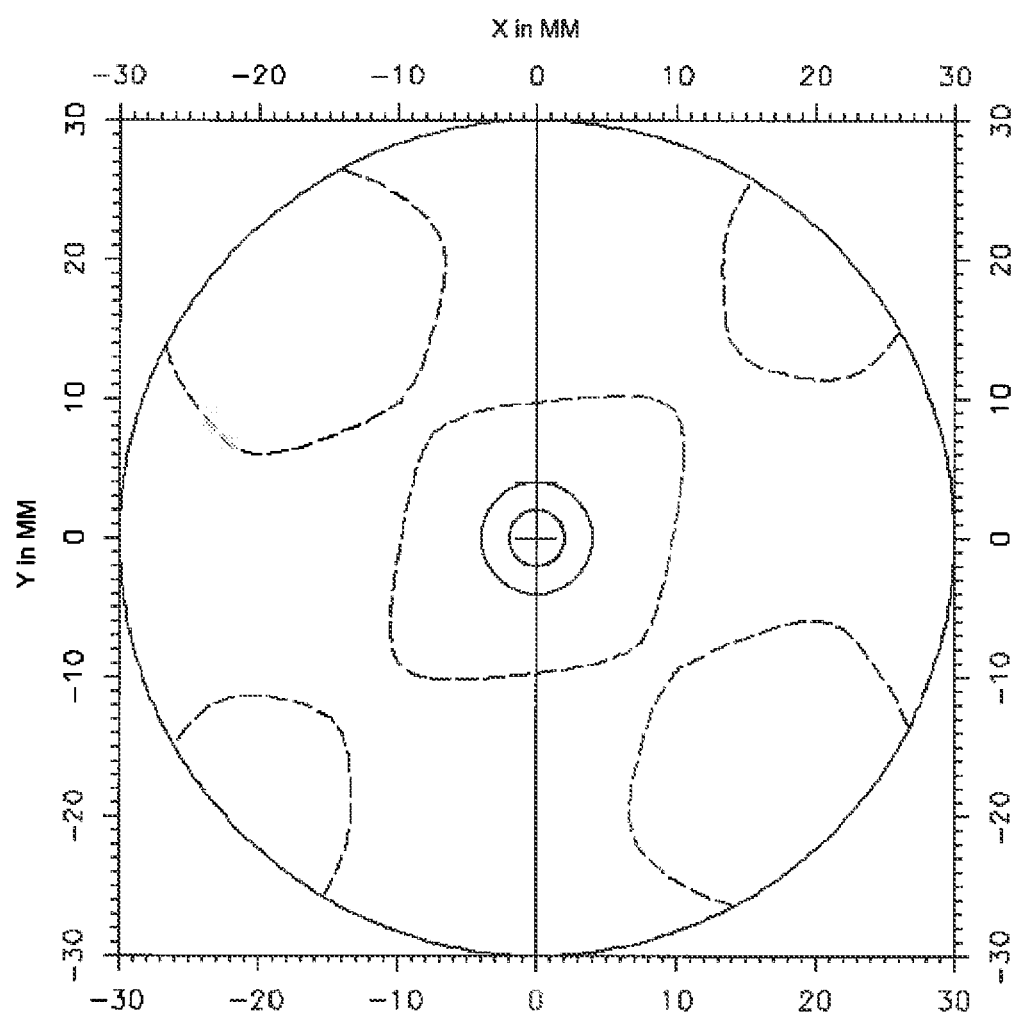
Figure 34:
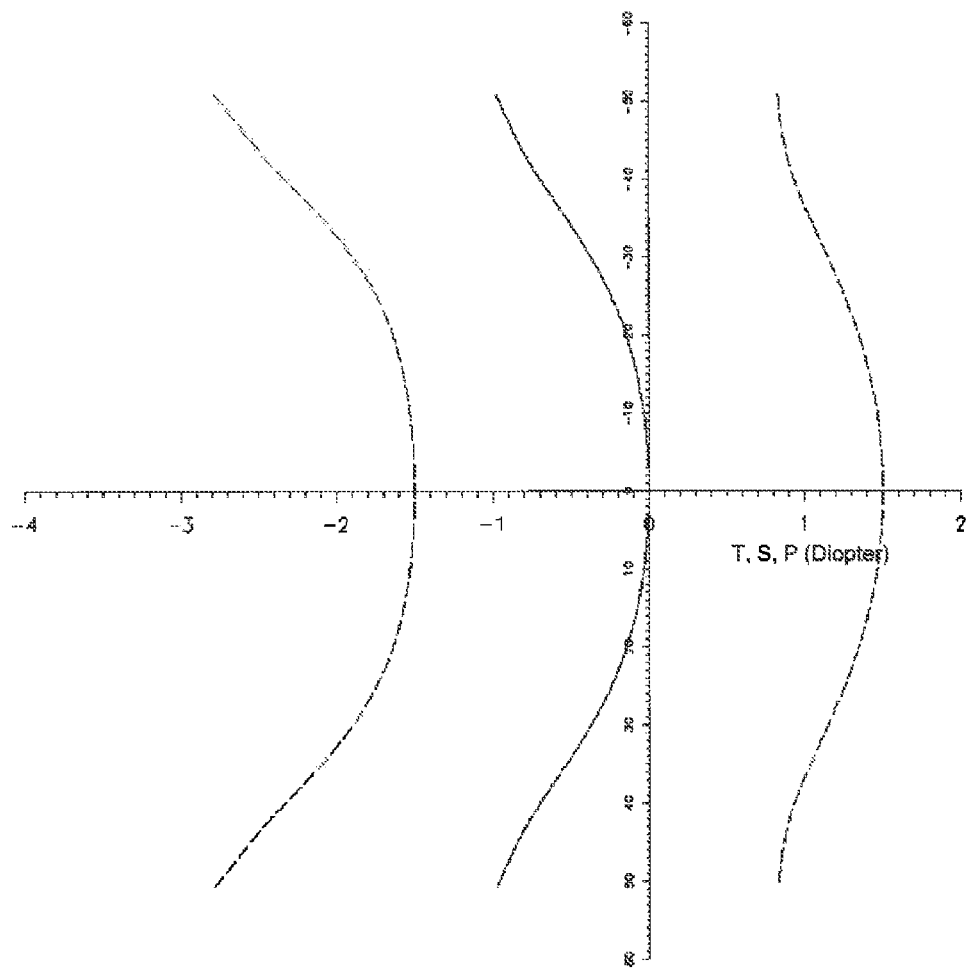
Figure 35:
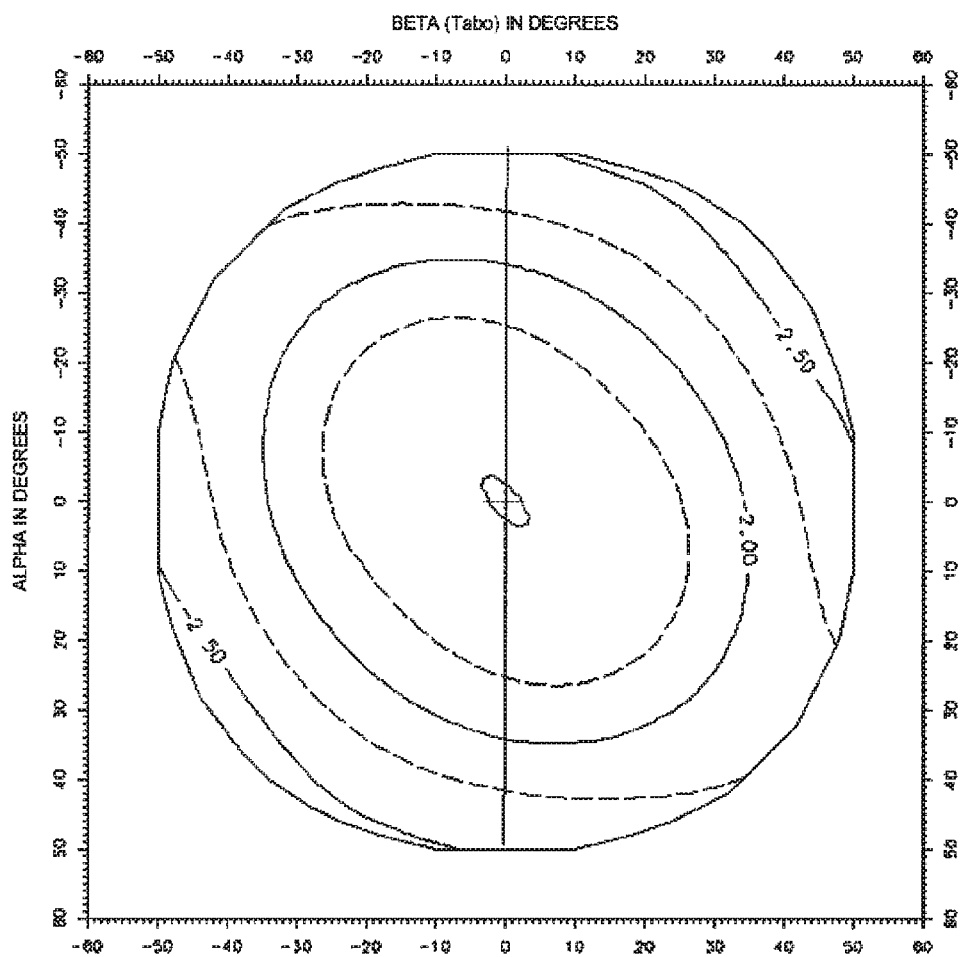
Figure 36:
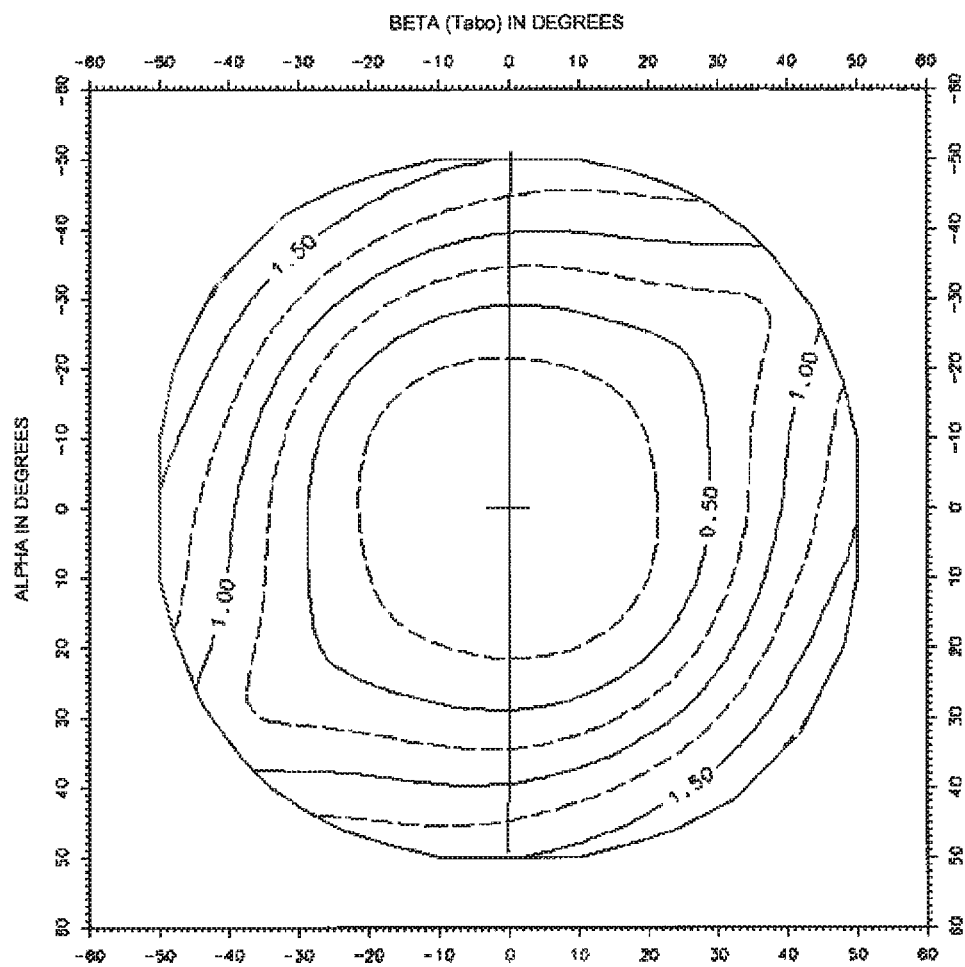
Figure 37:
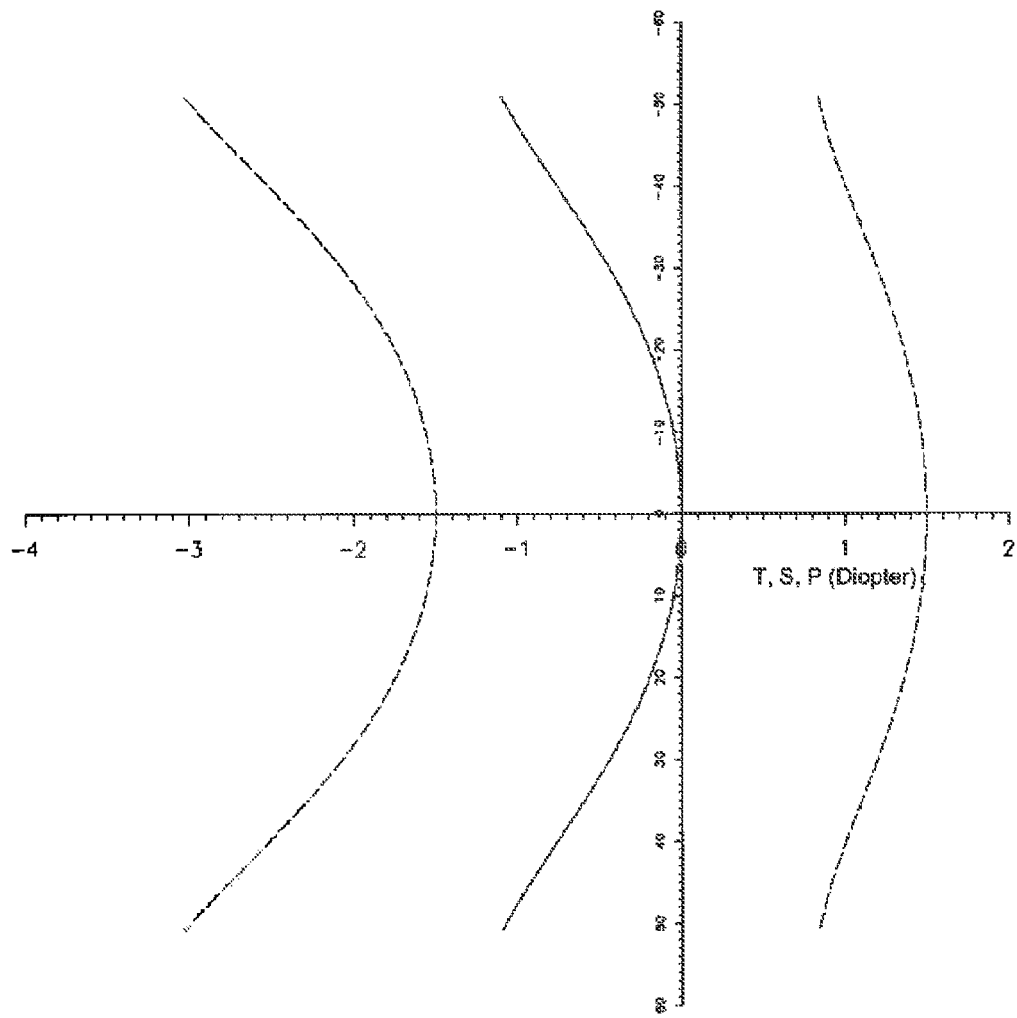
Figure 38:
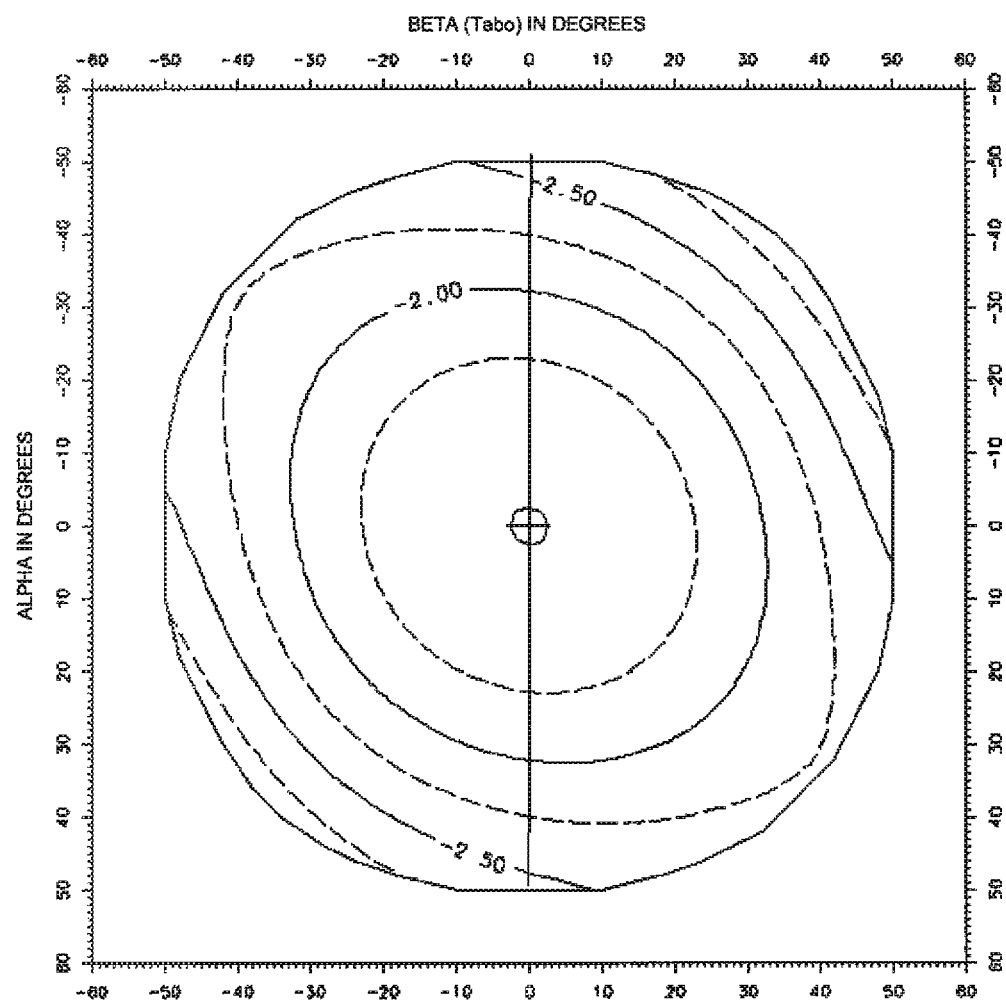
Figure 39:
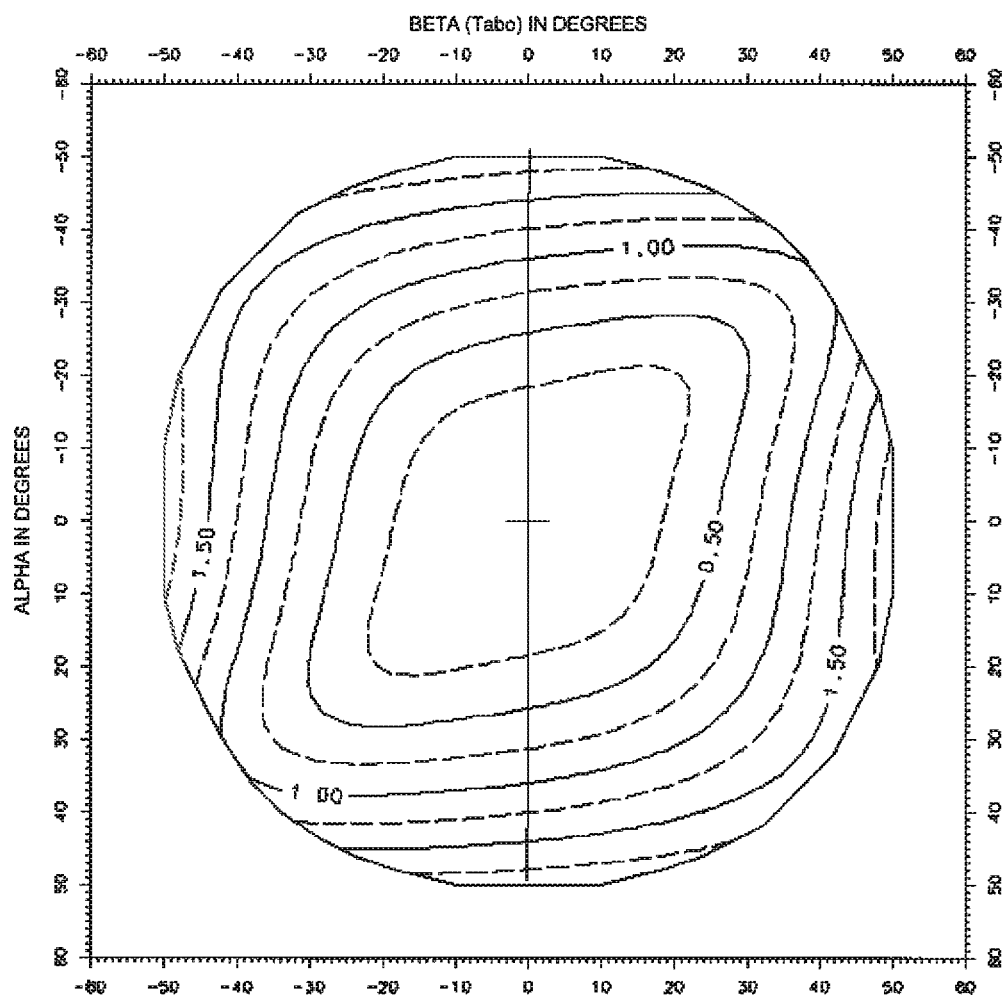
Figure 40:
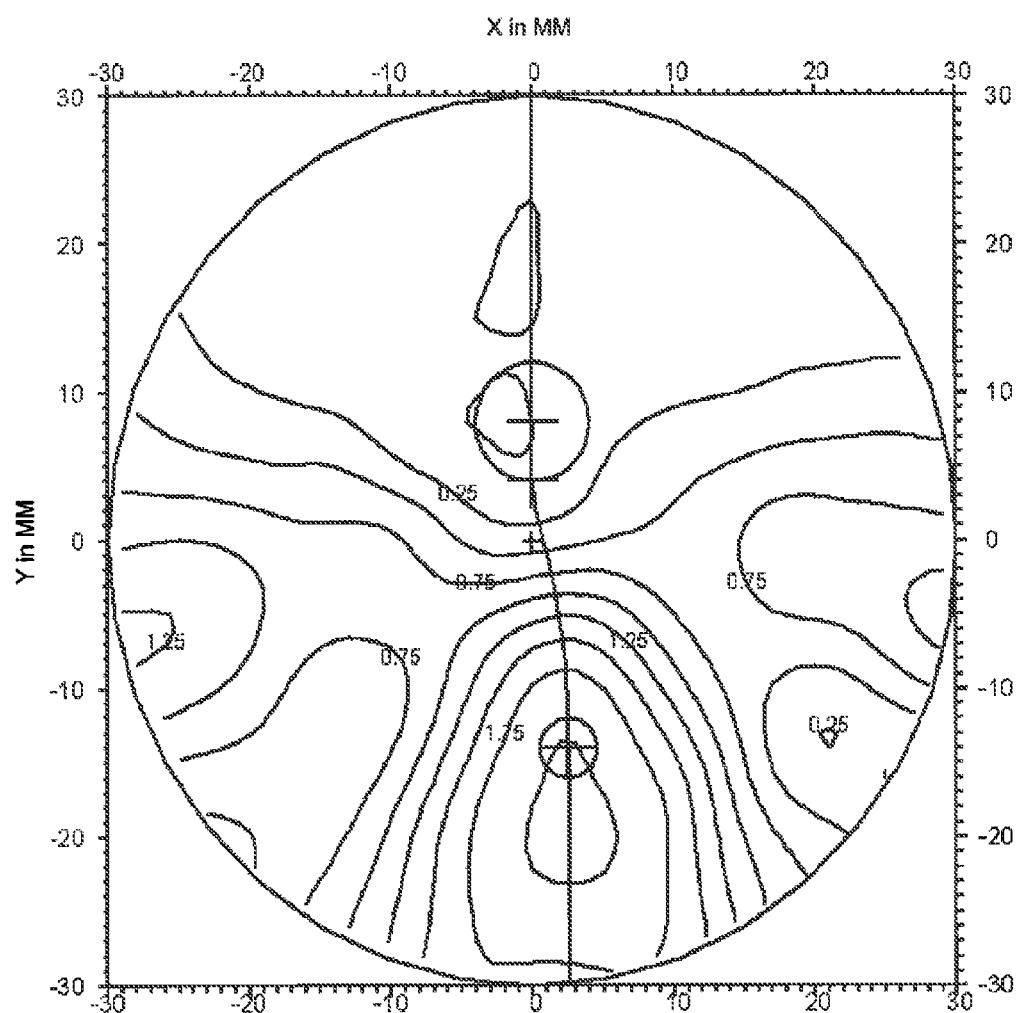
Figure 41:
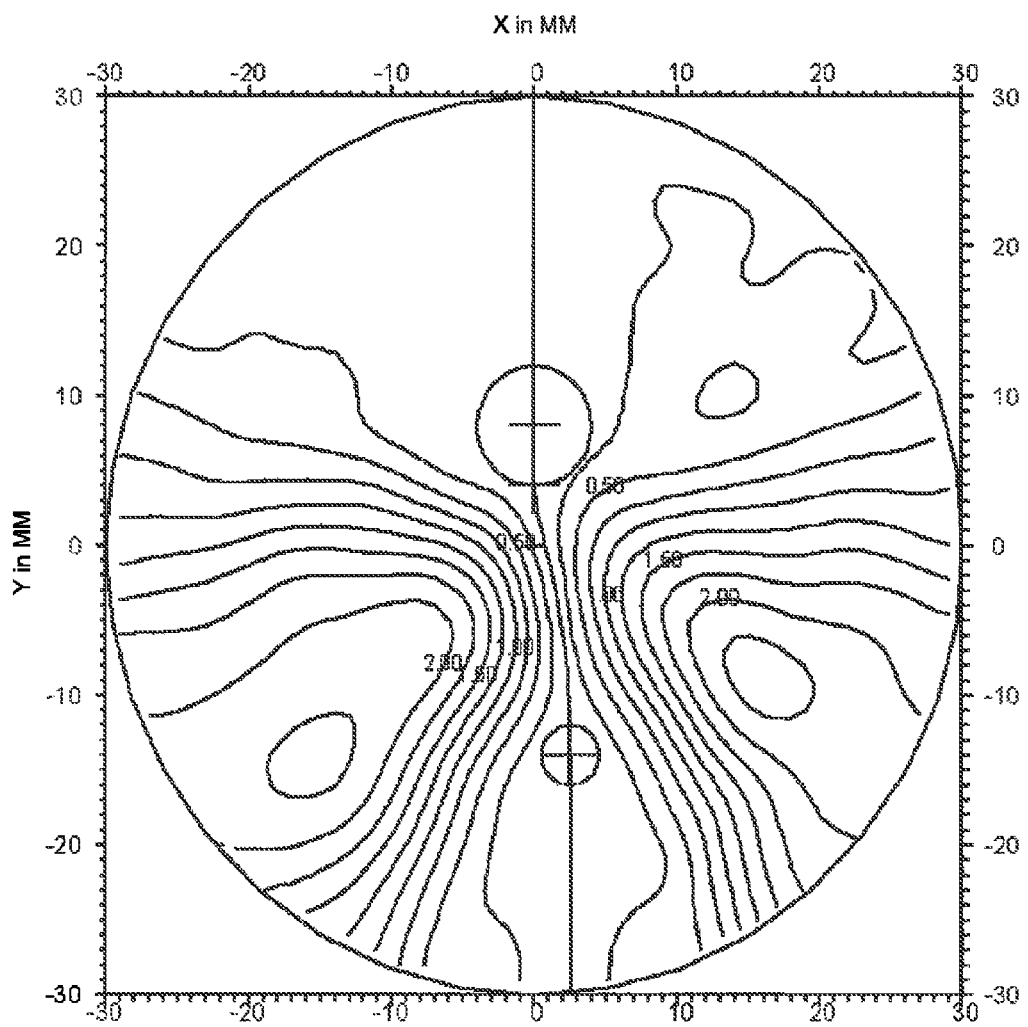
Figure 42:
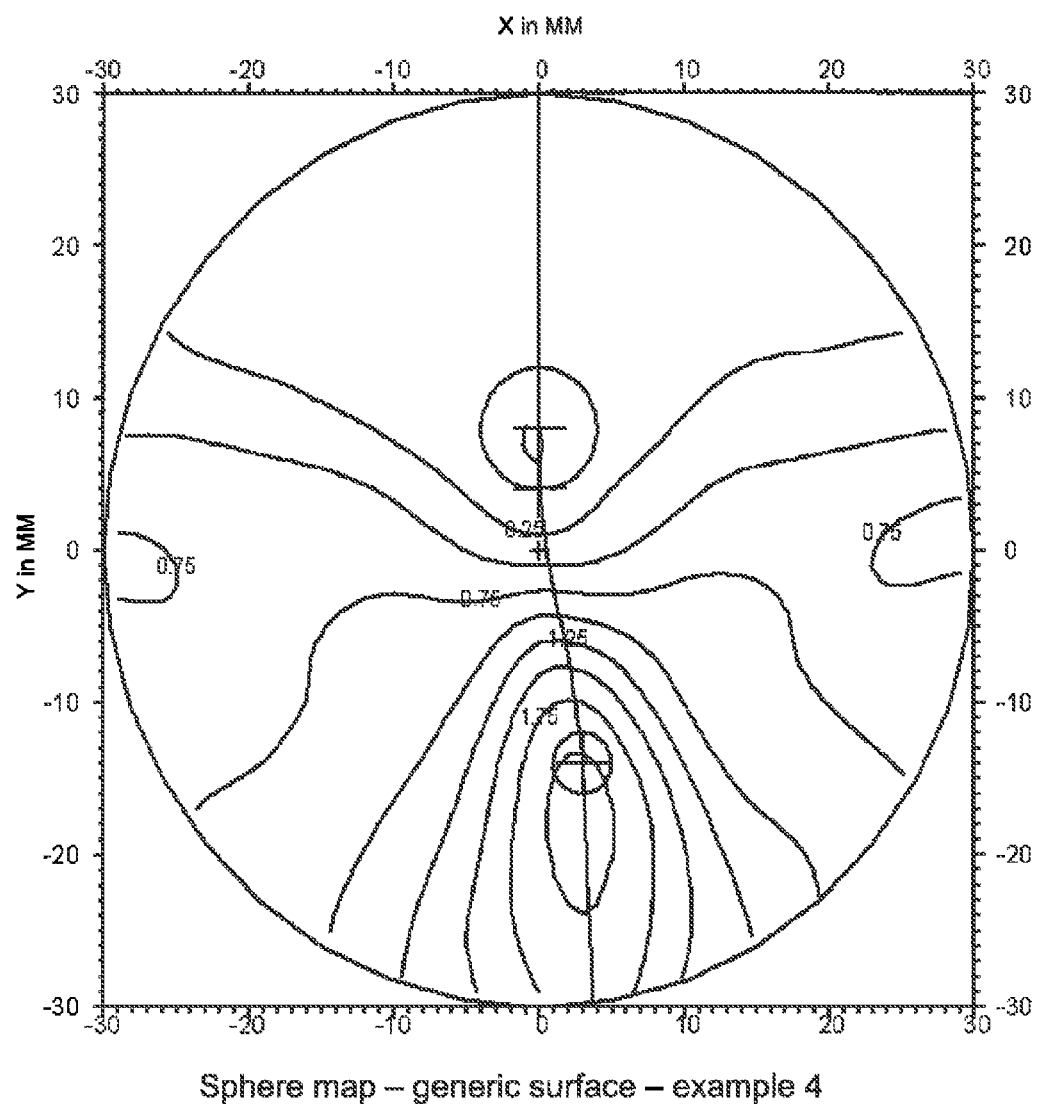
Figure 43:
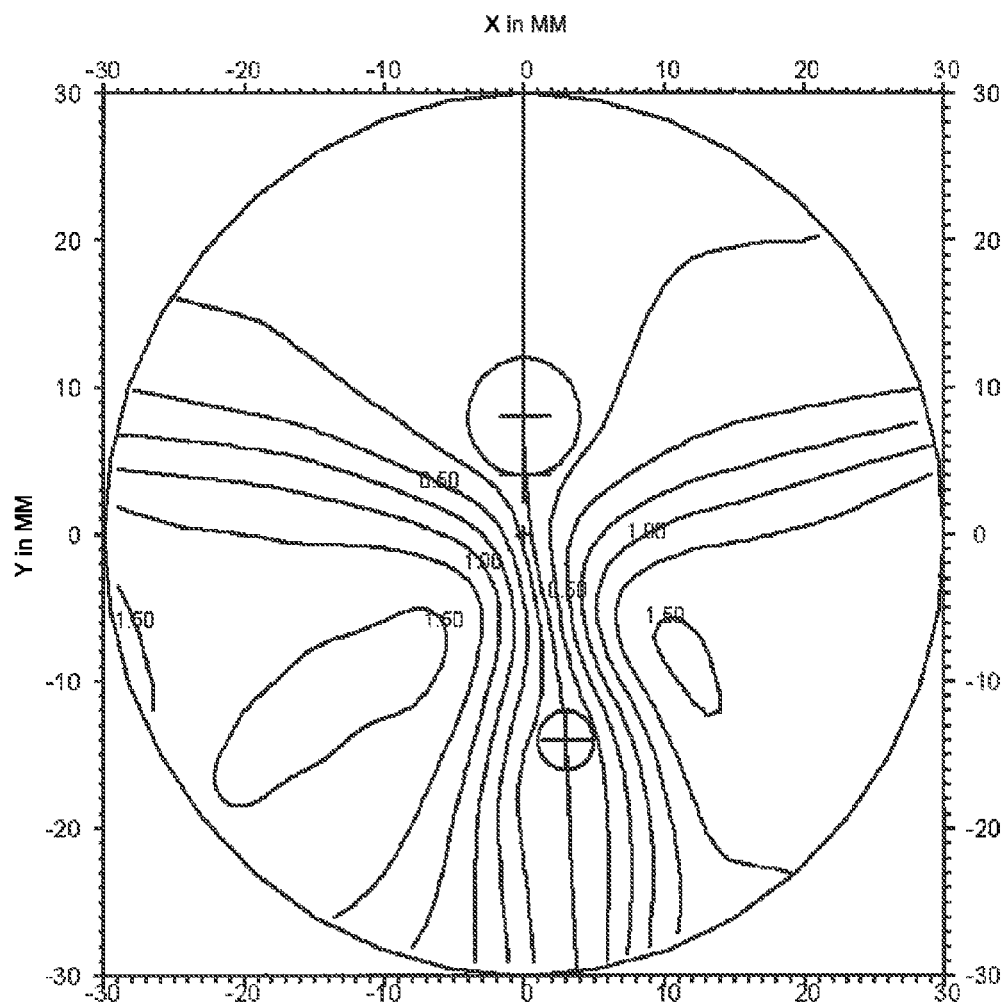
Figure 44:
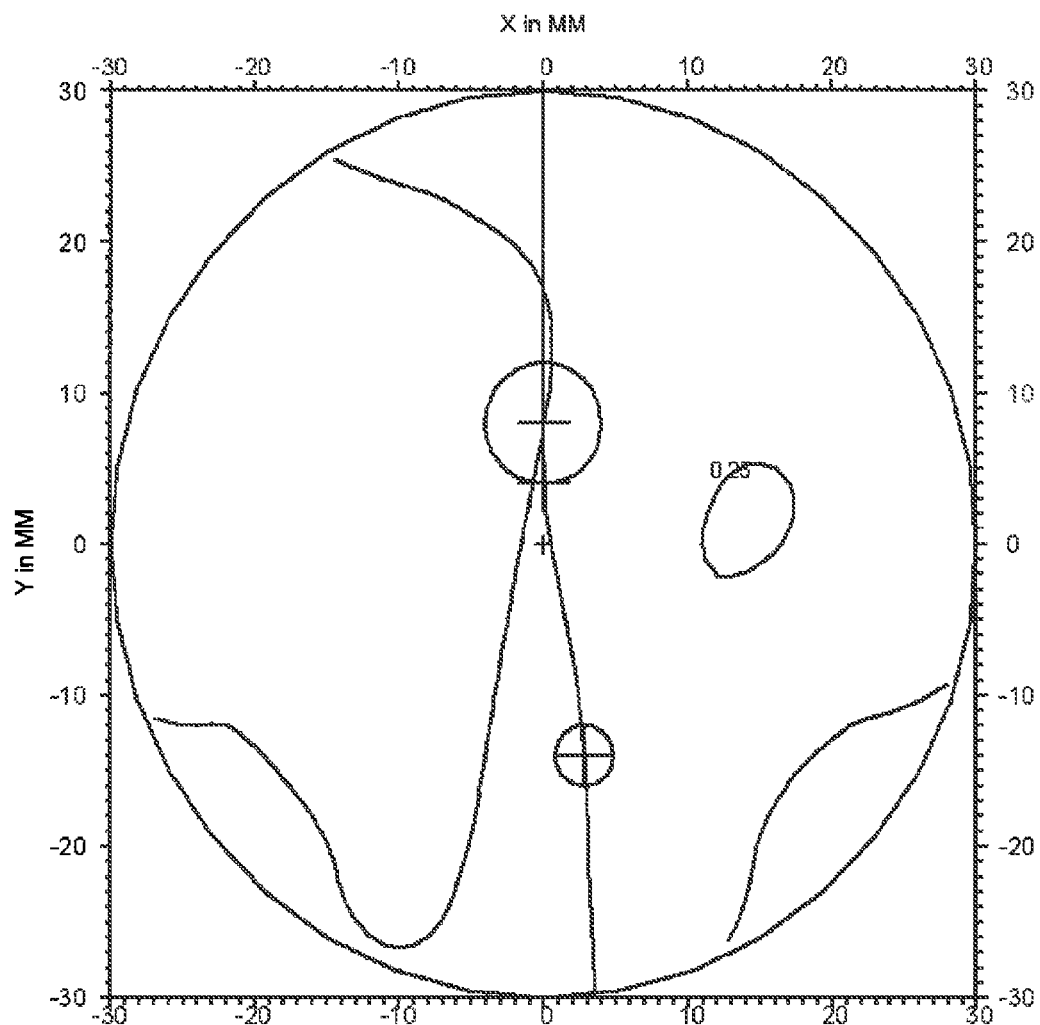
Figure 45:
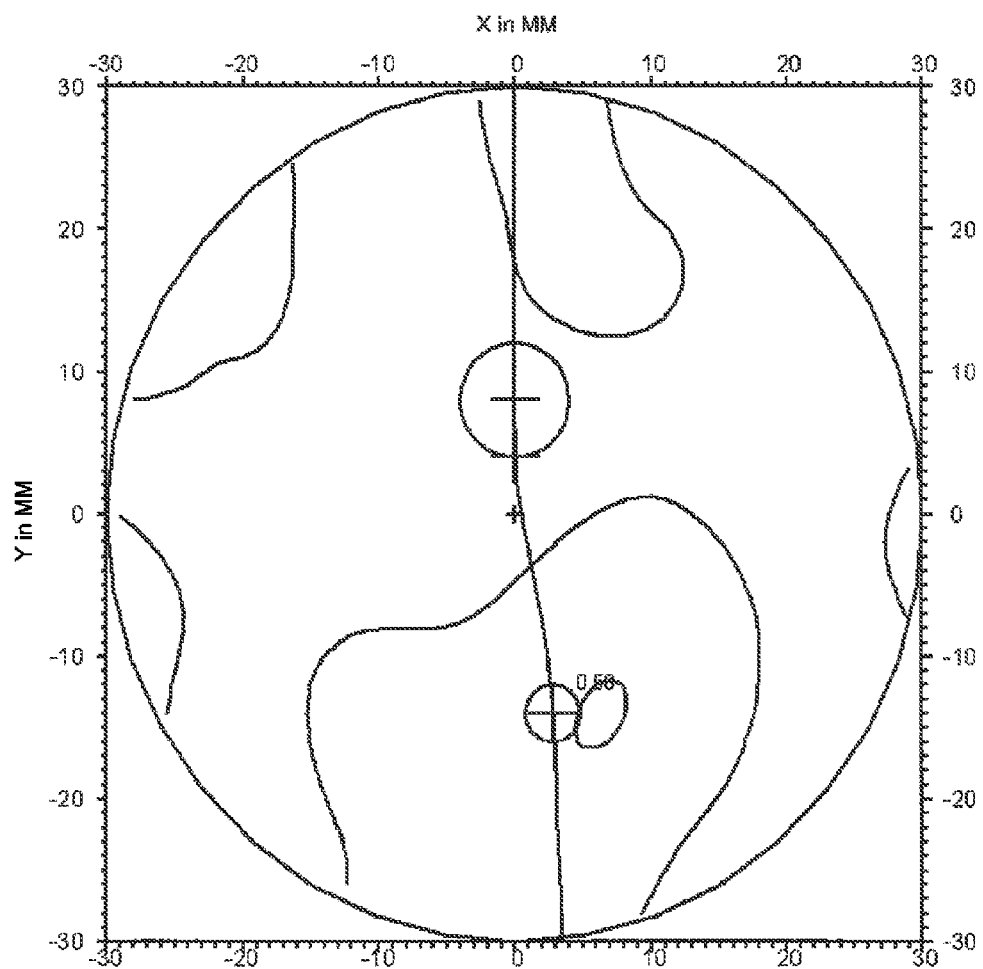
Figure 46:
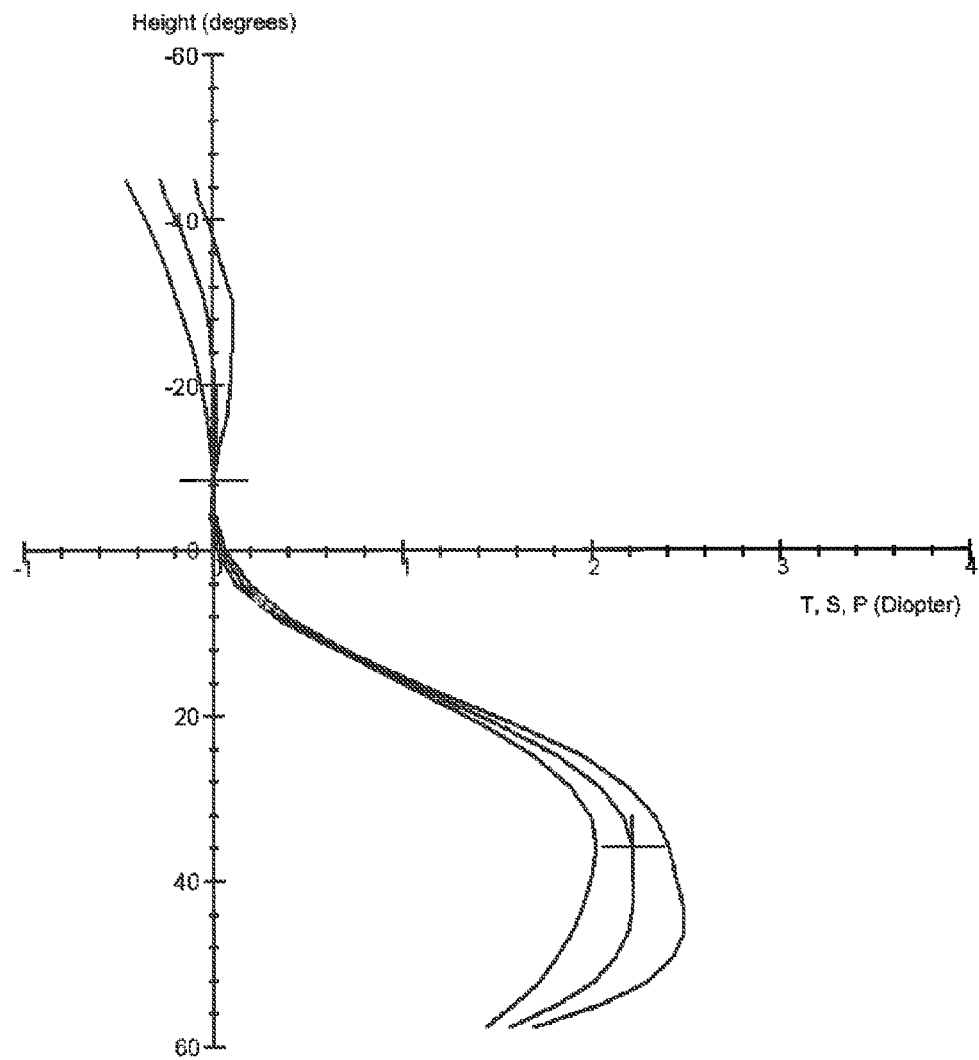
Figure 47:
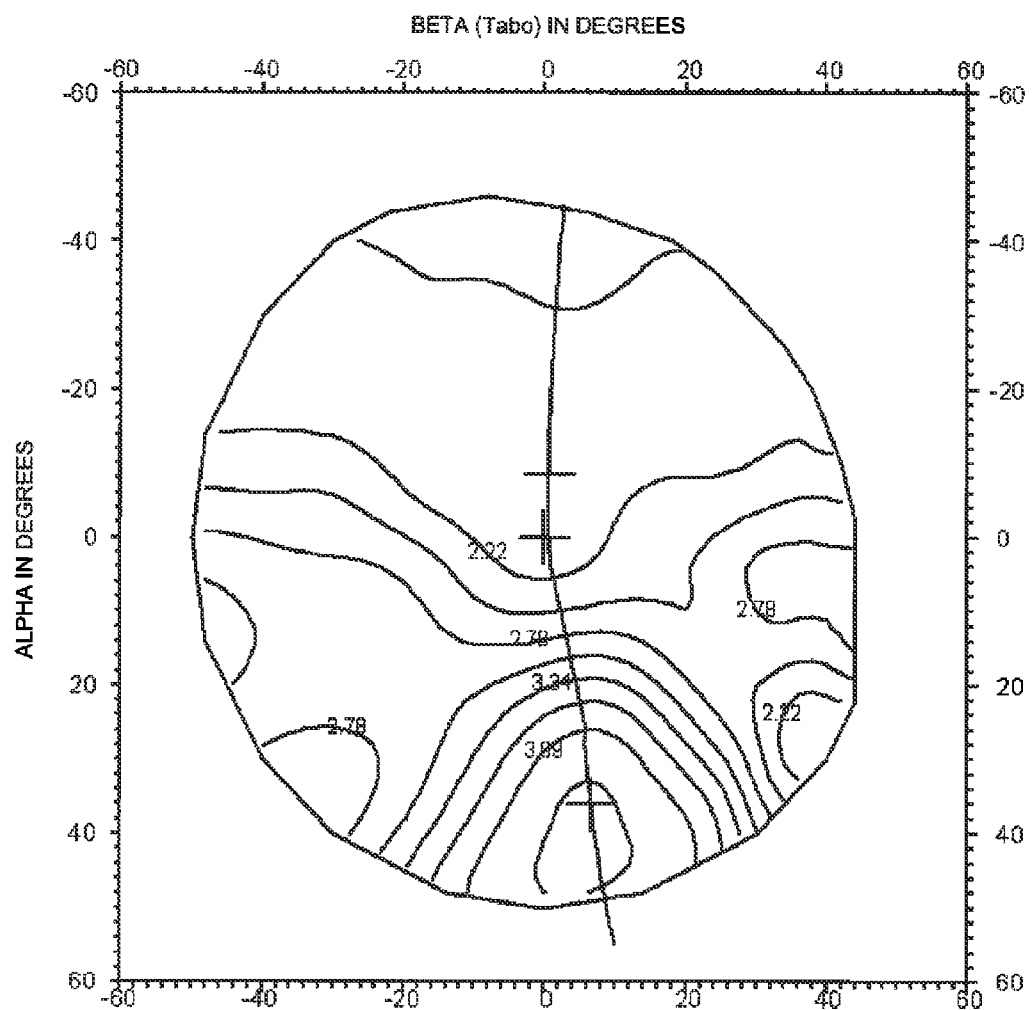
Figure 48:
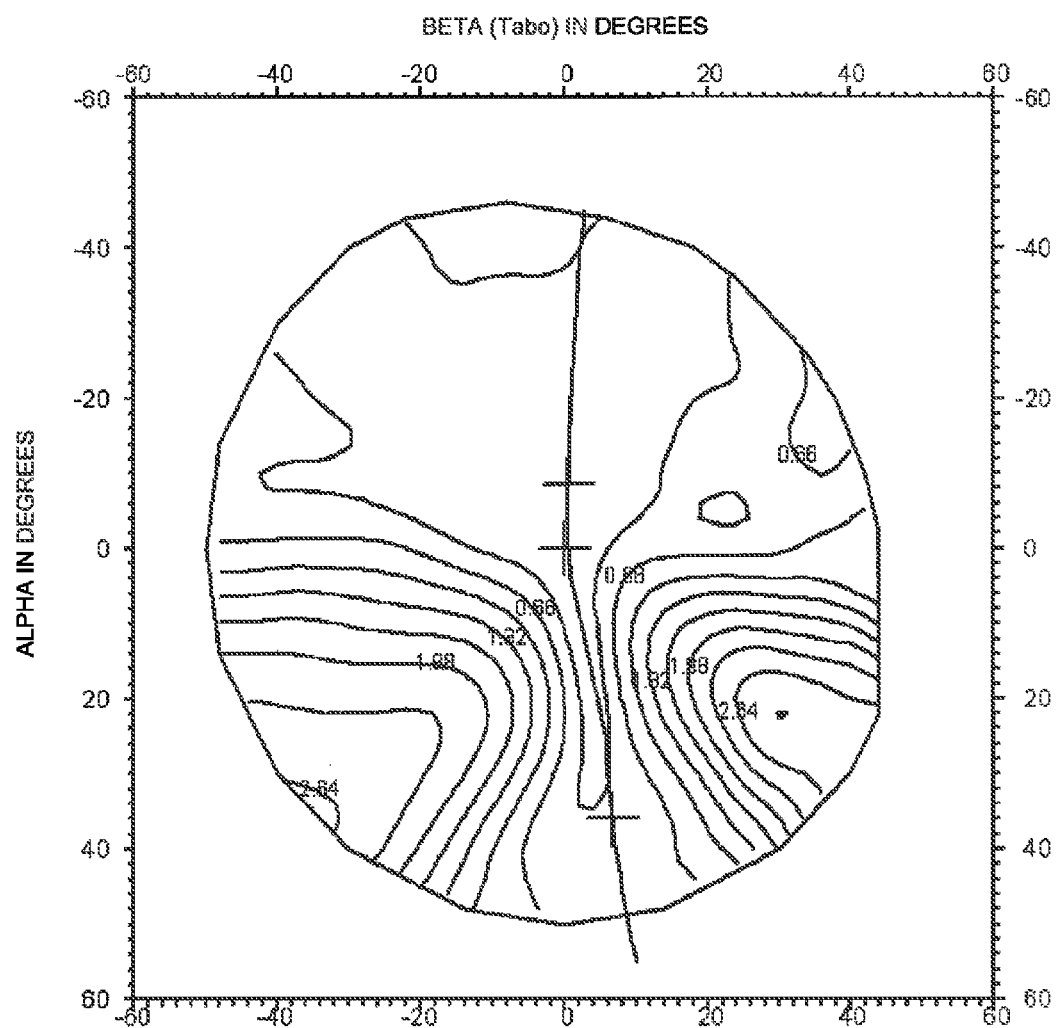
Figure 49:
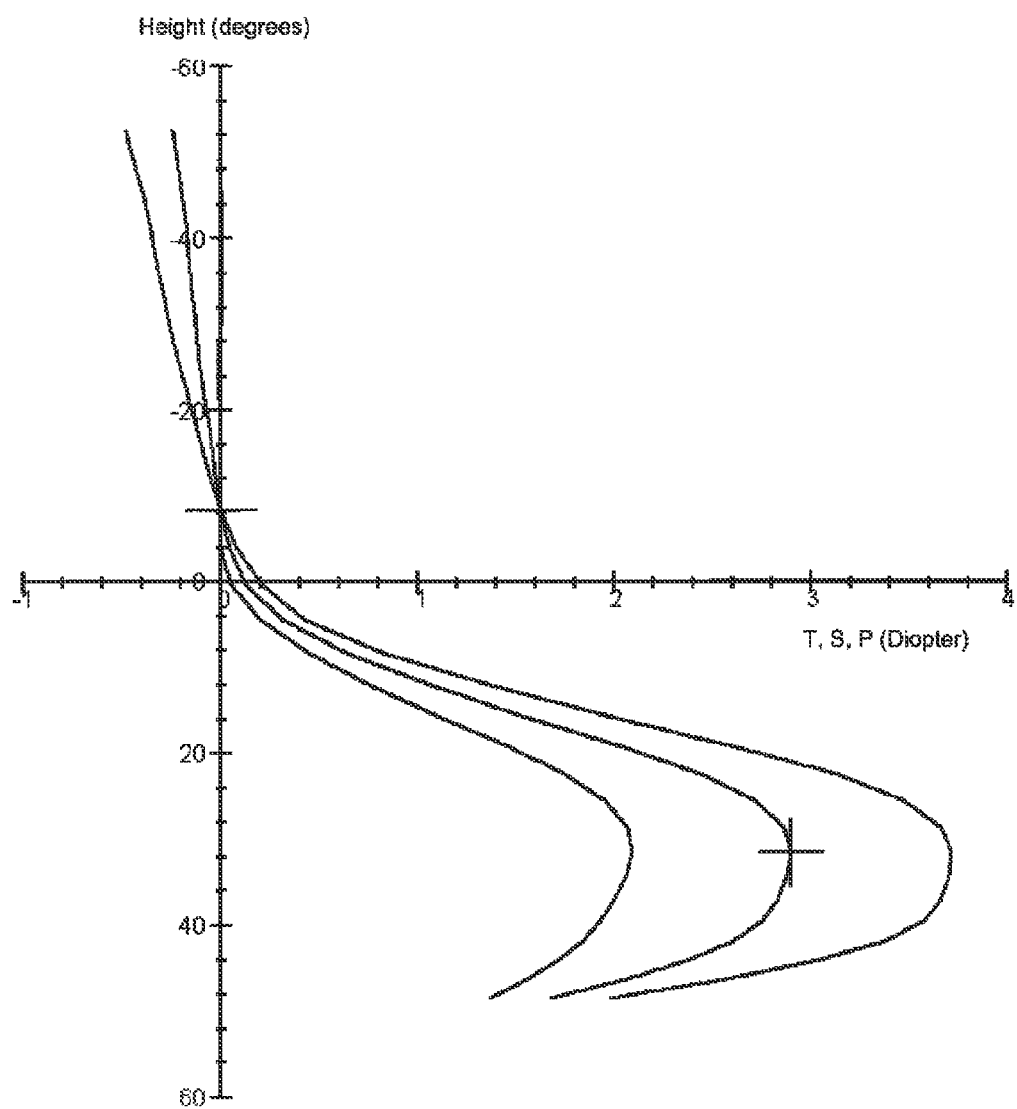
Figure 50:
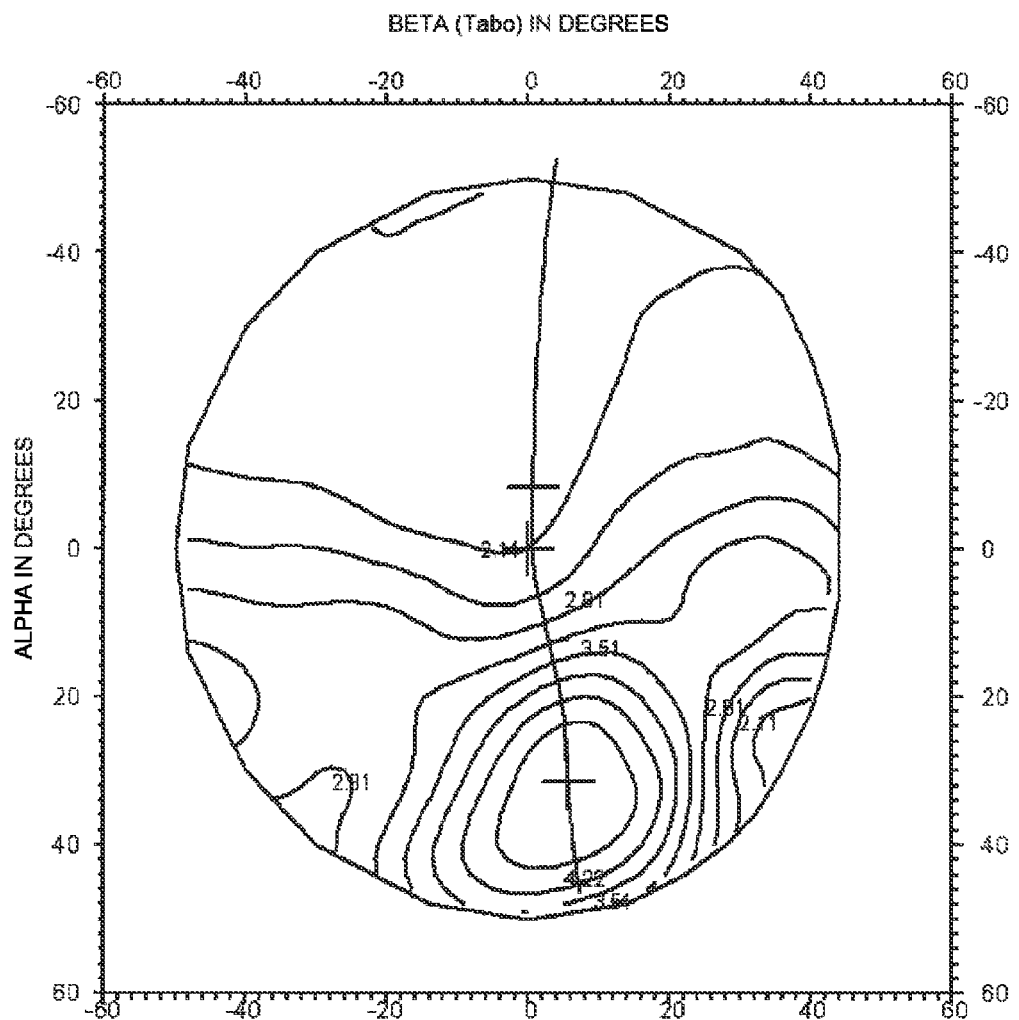
Figure 51:
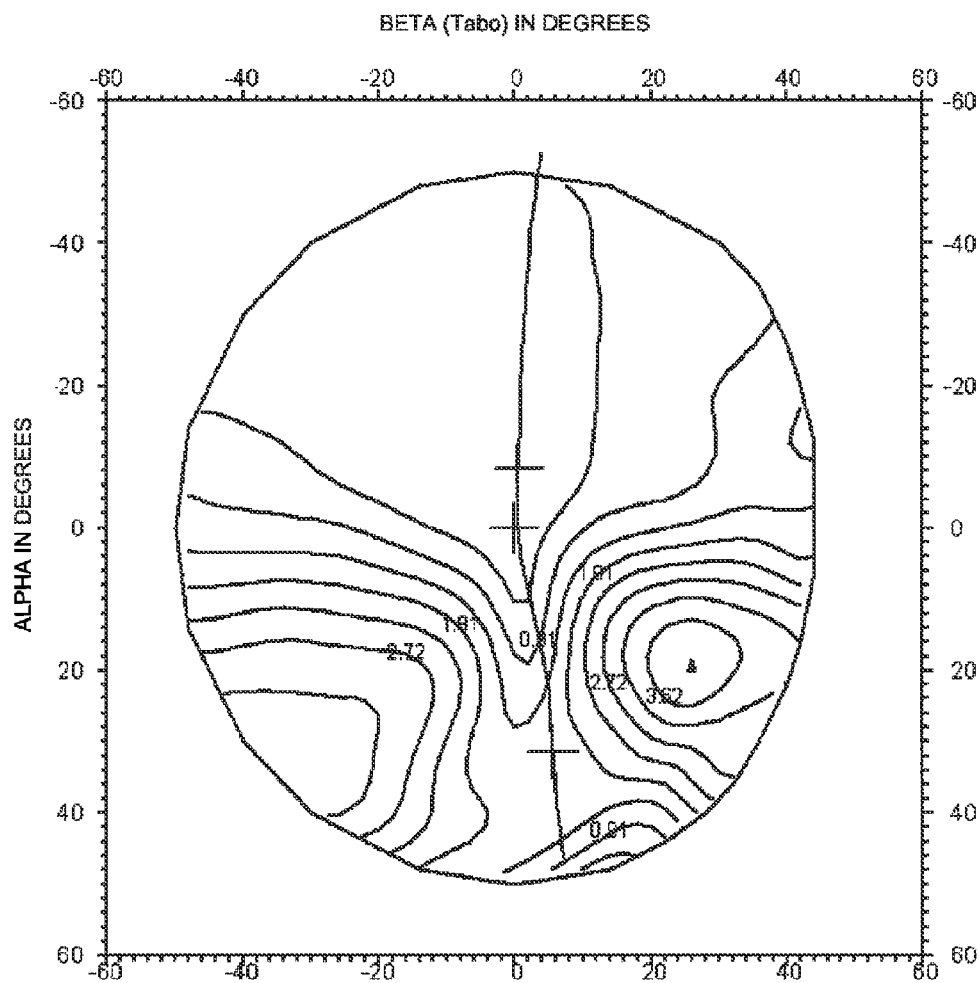
Figure 52:
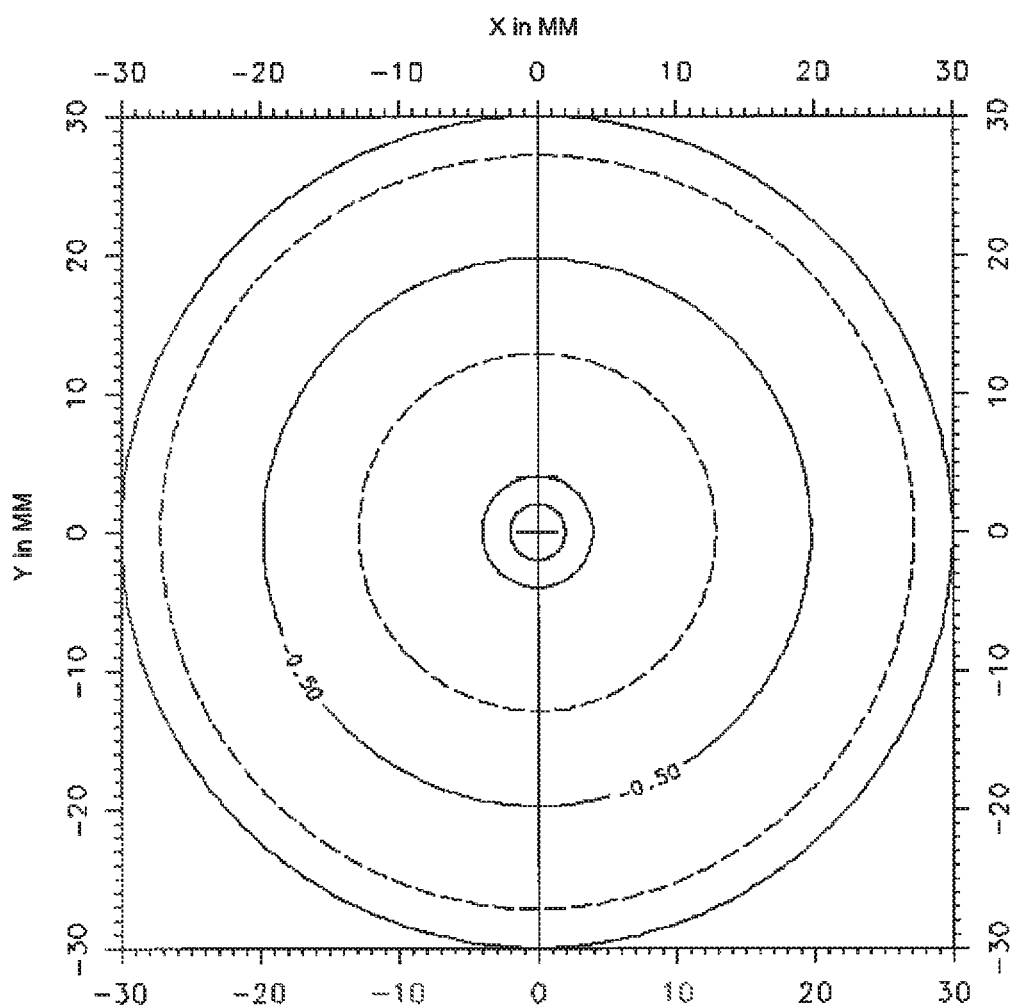
Figure 53:
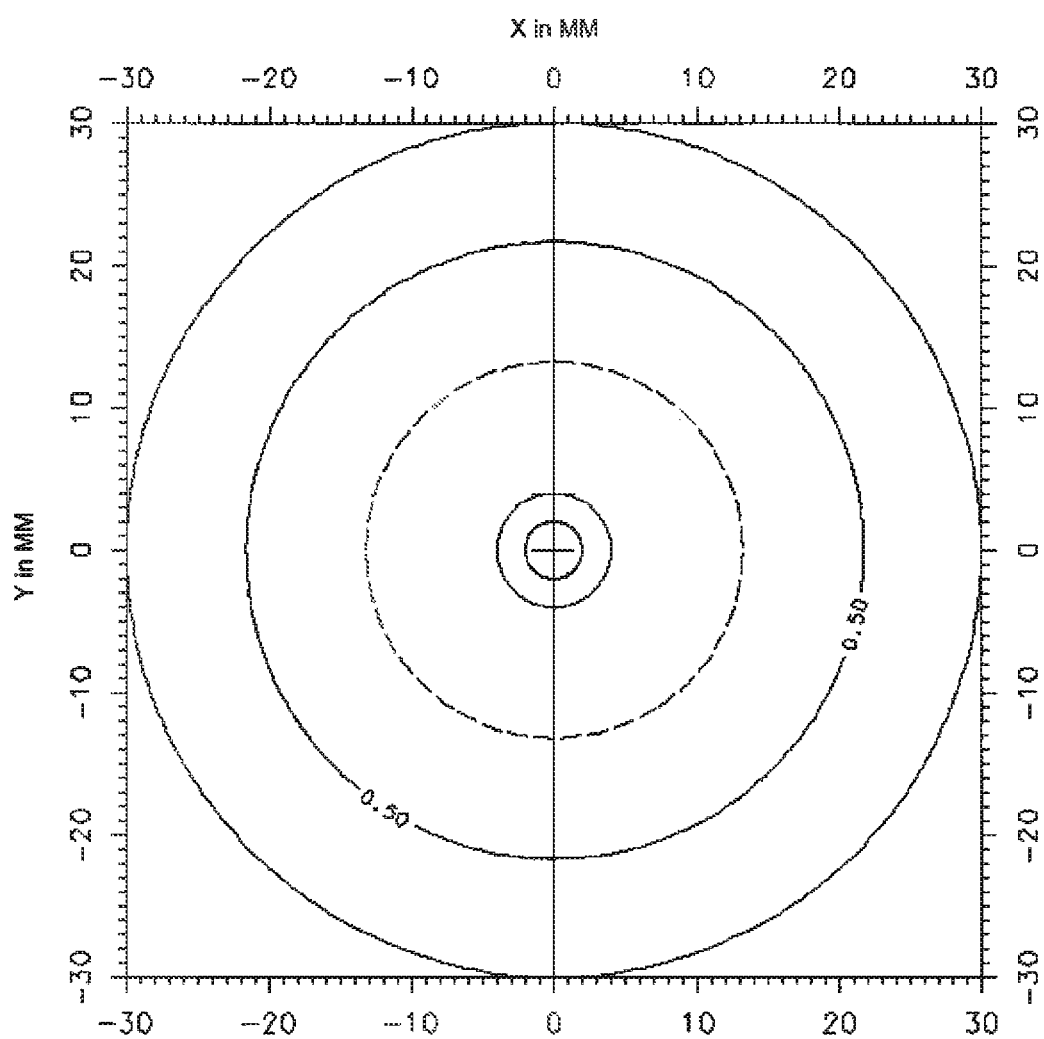
Figure 54:
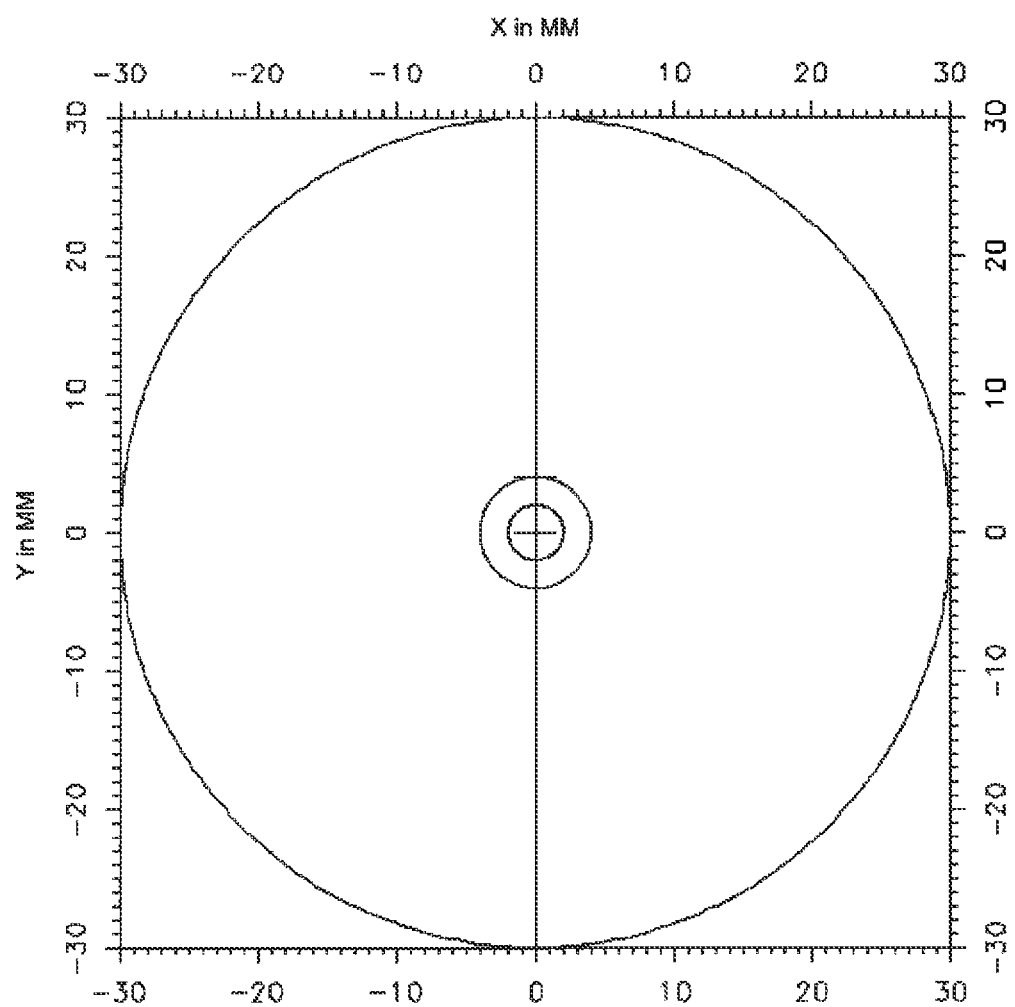
Figure 55:
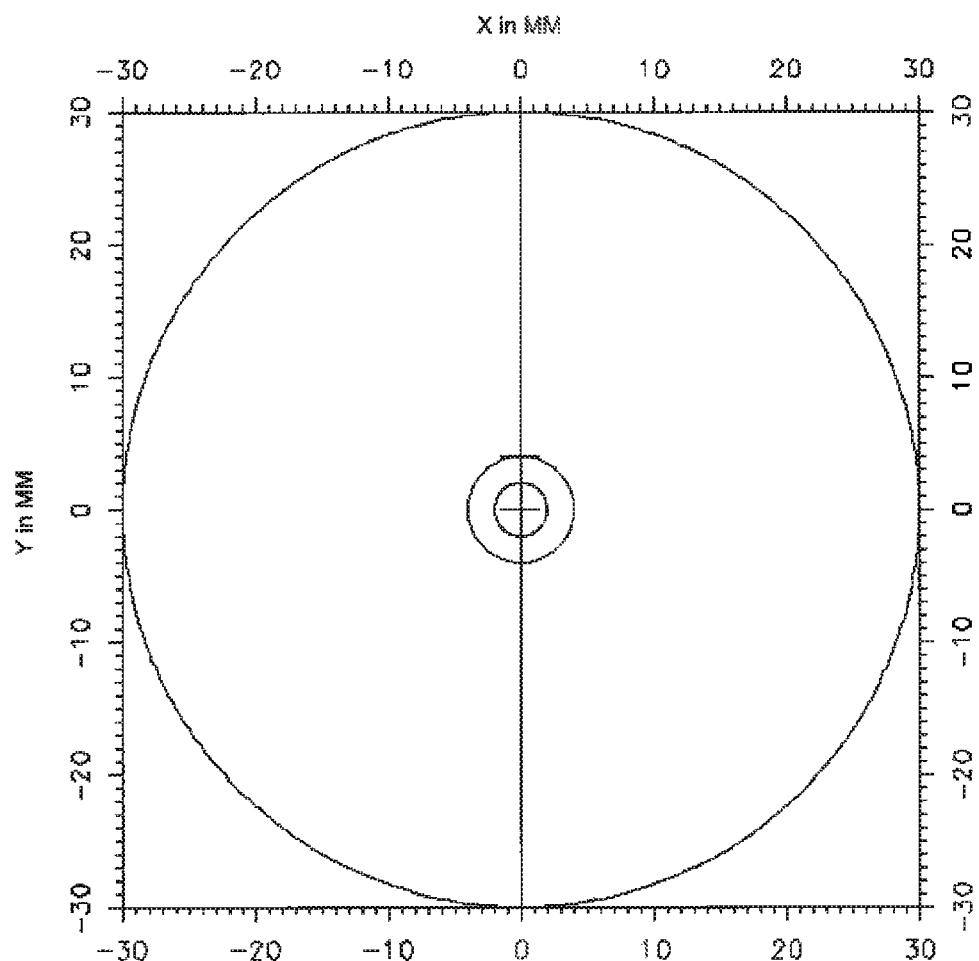
Figure 56:
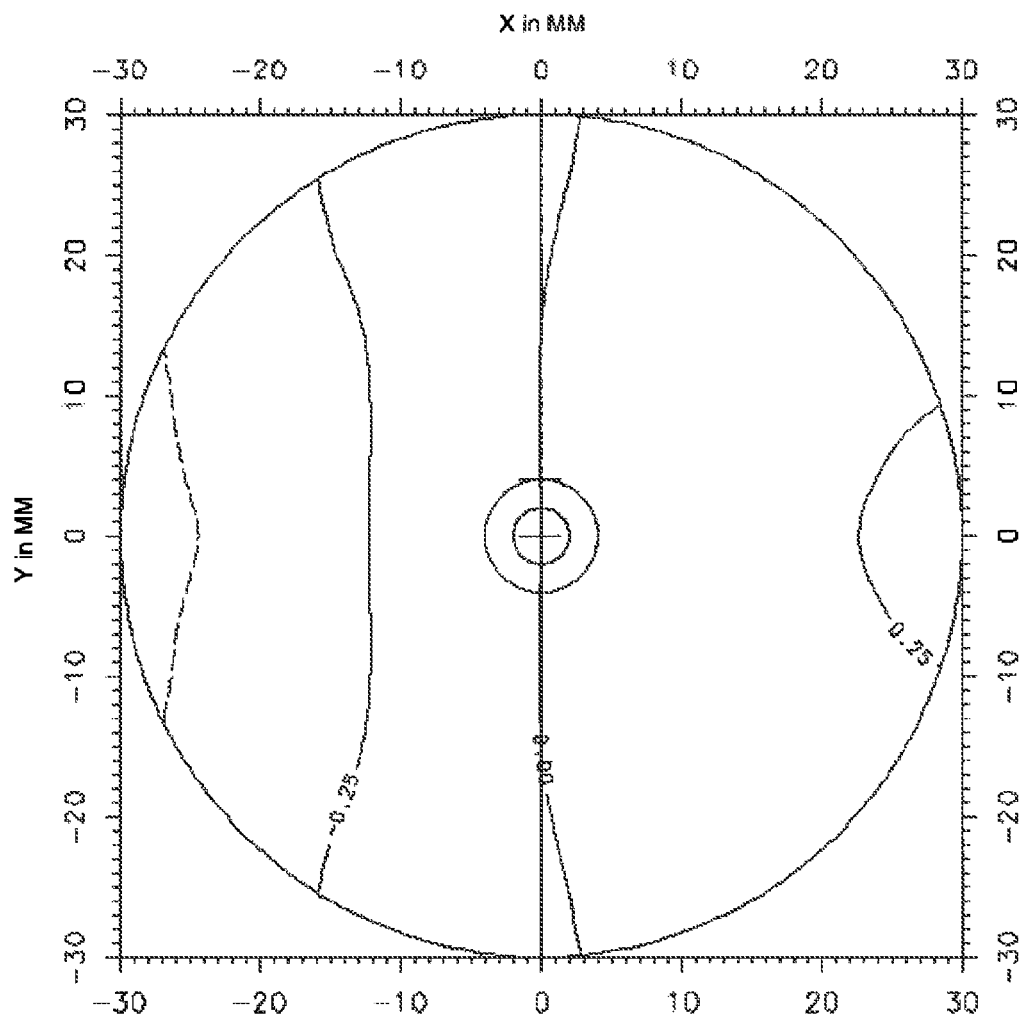
Figure 57:
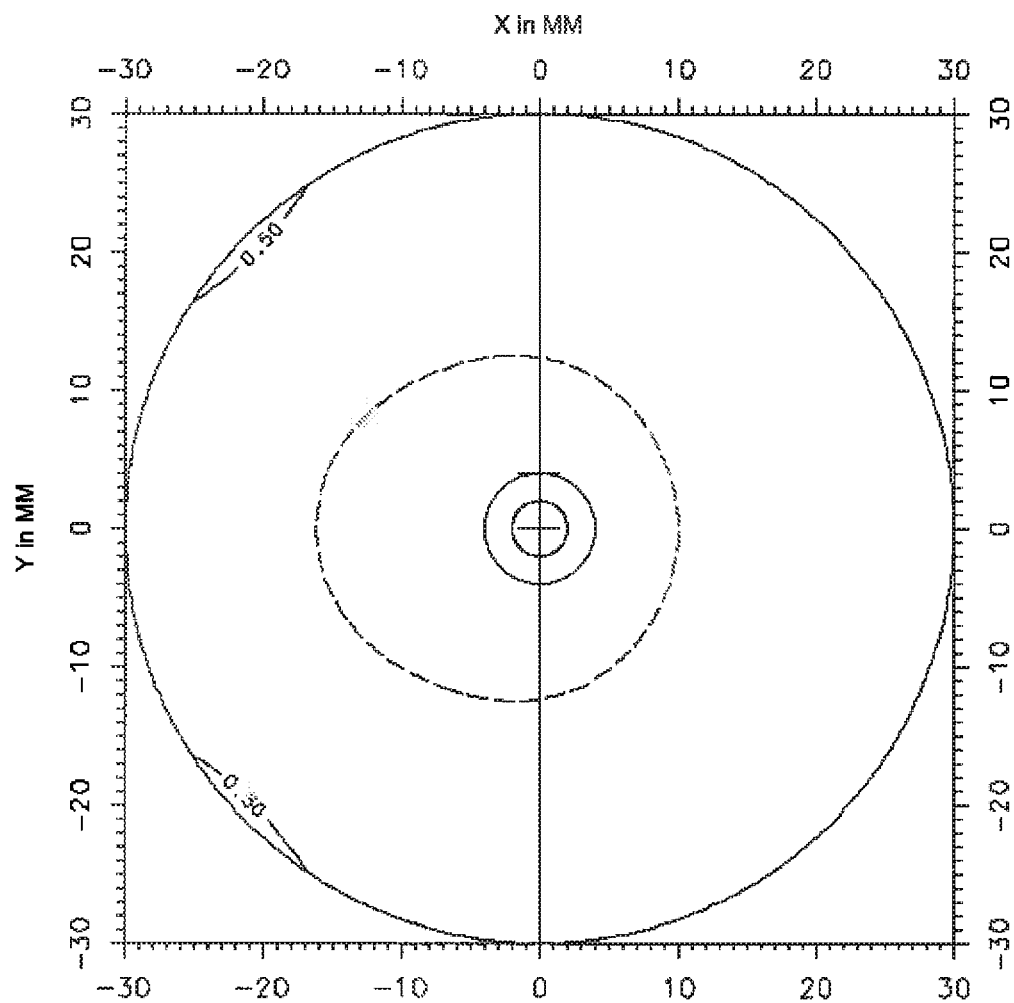
Figure 58:
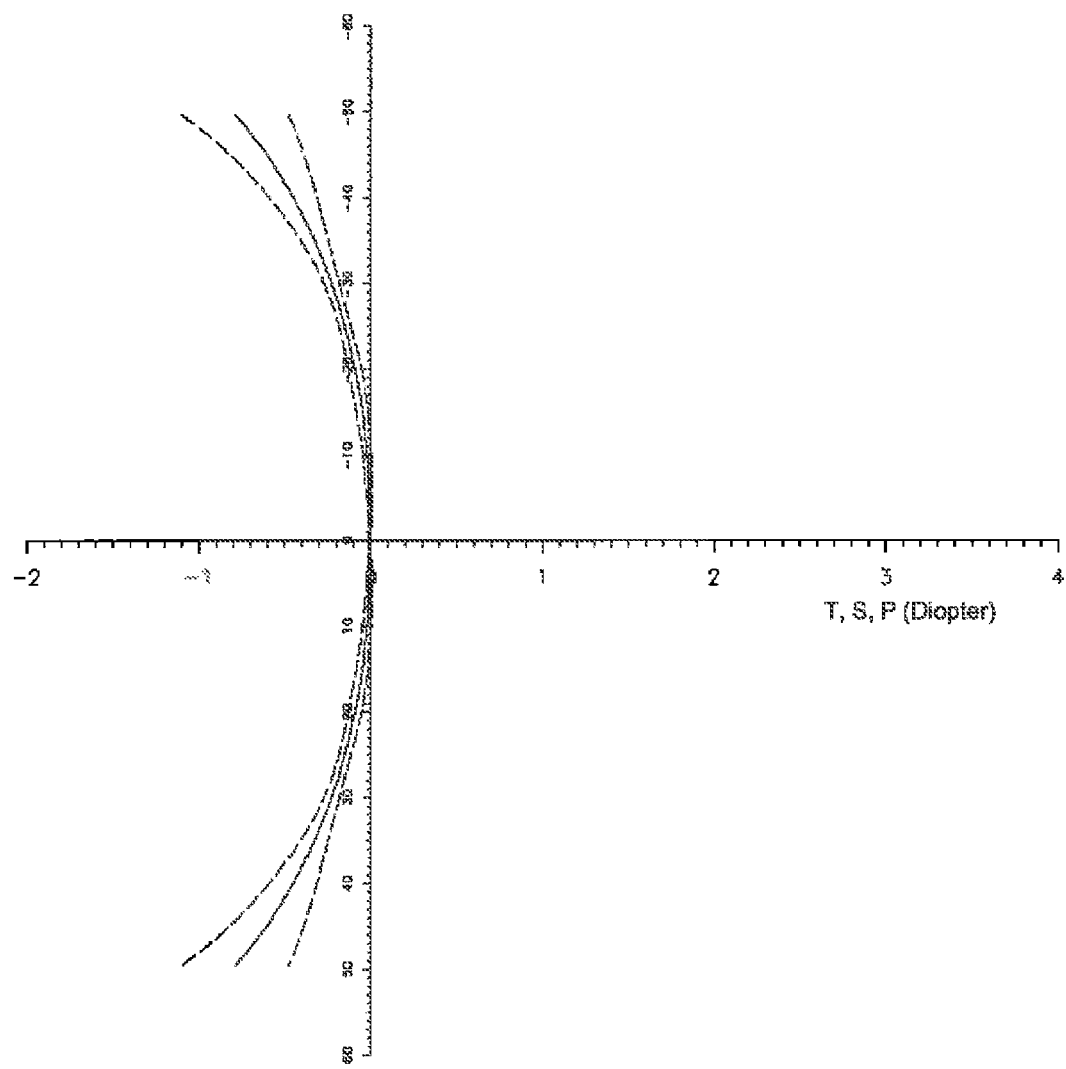
Figure 59:
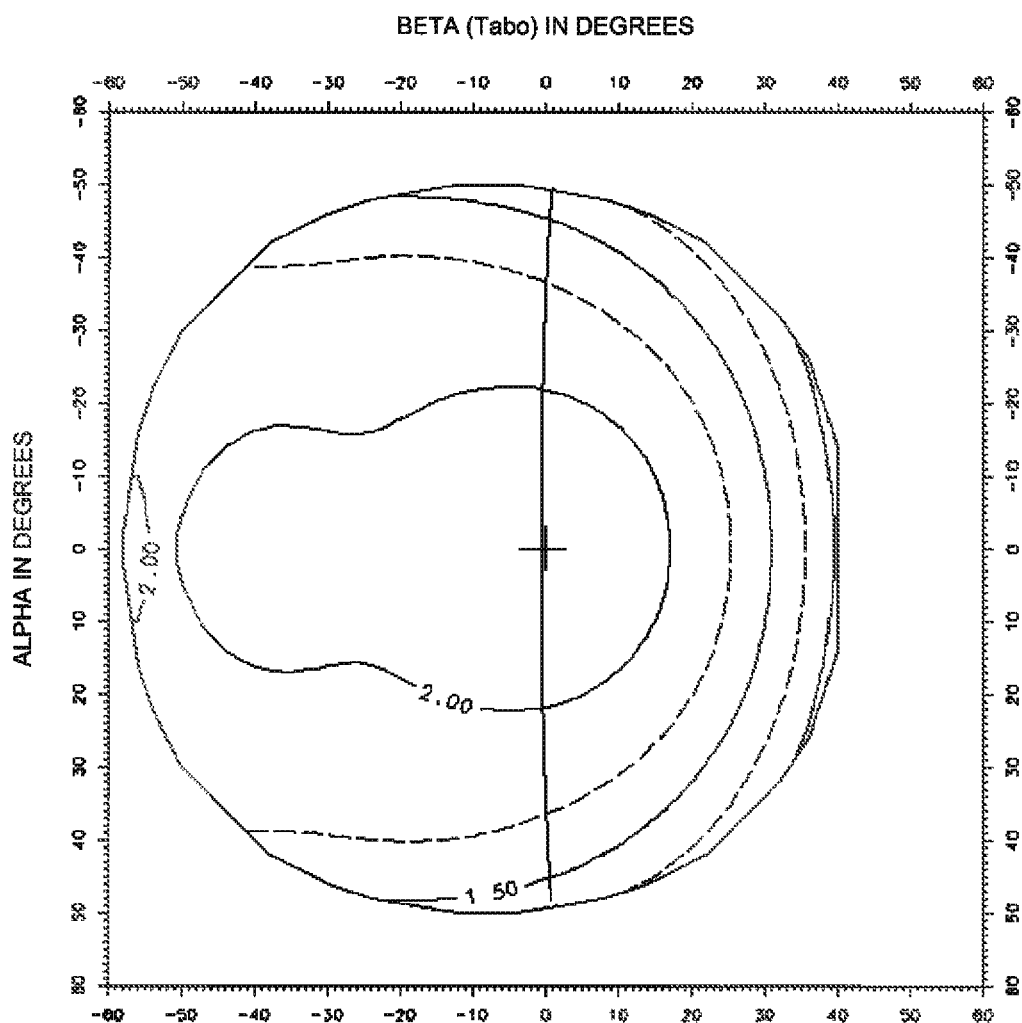
Figure 60:
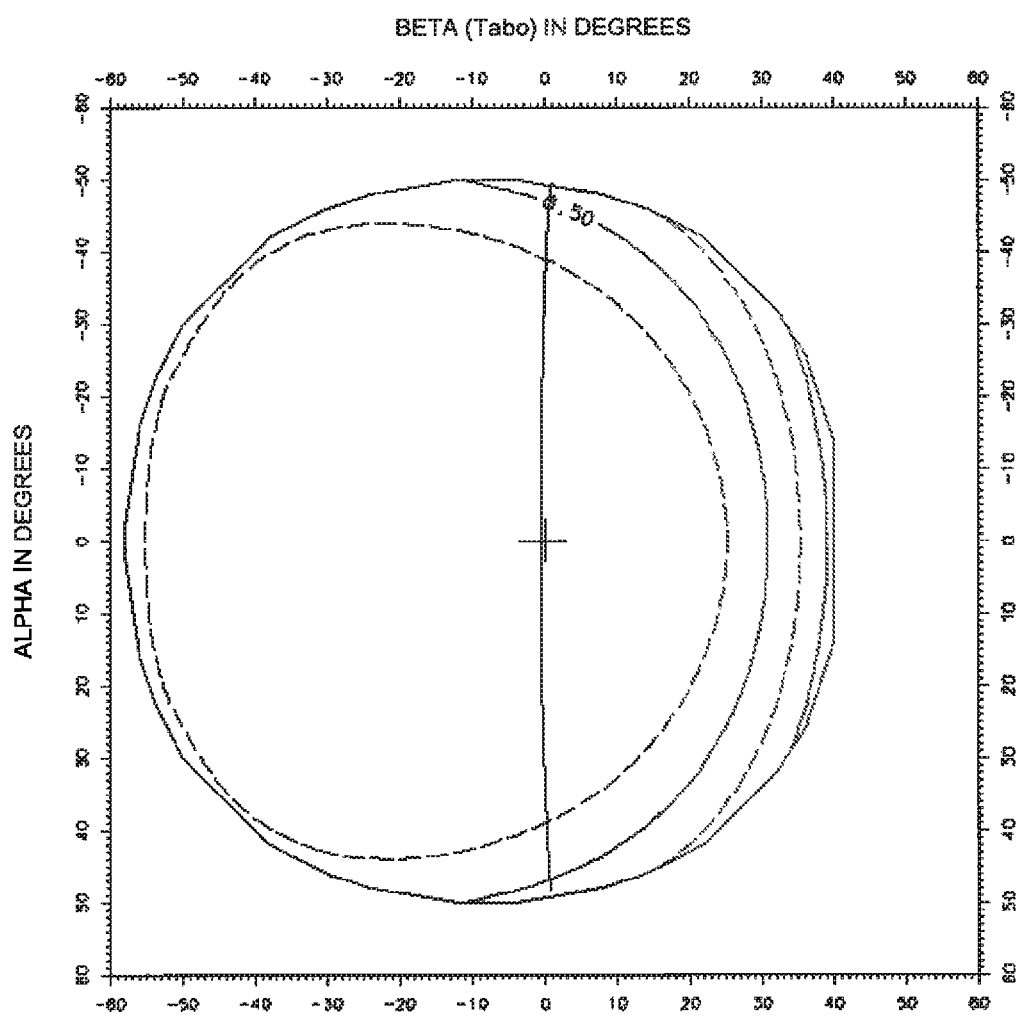
Figure 61:
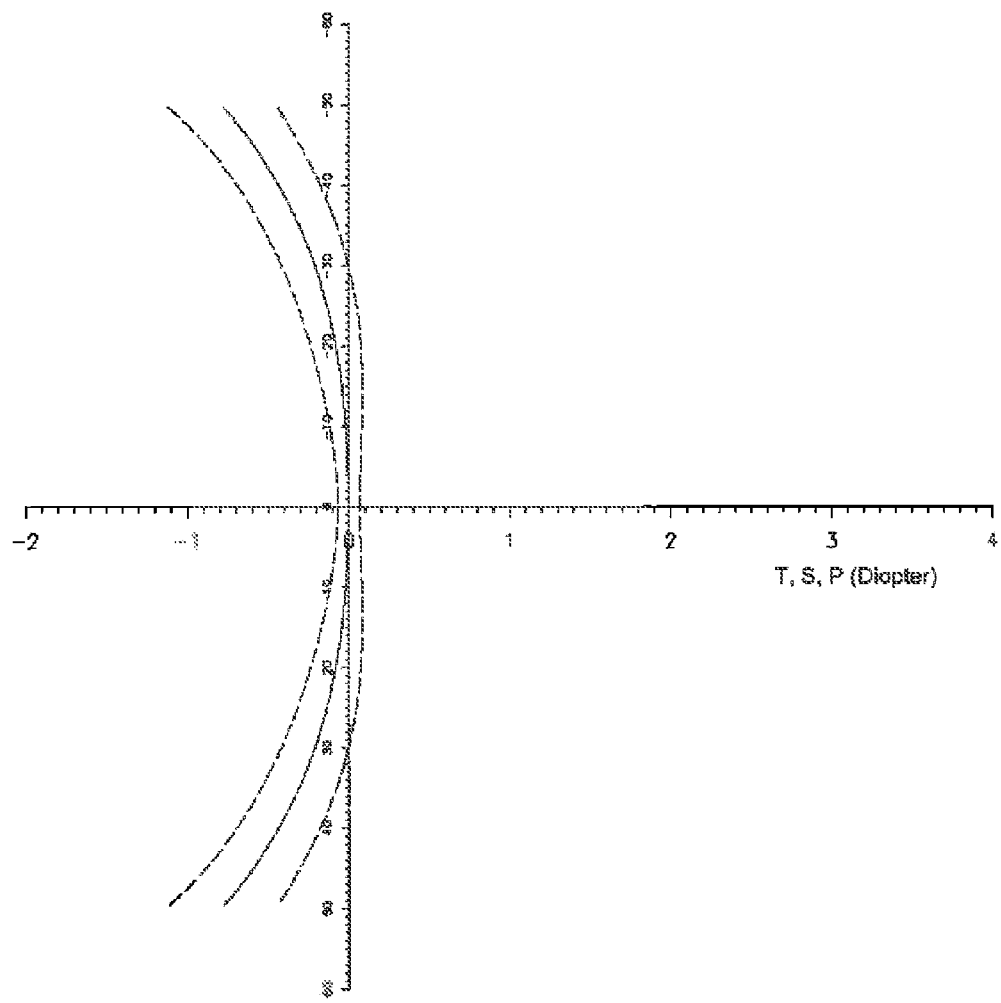
Figure 62:
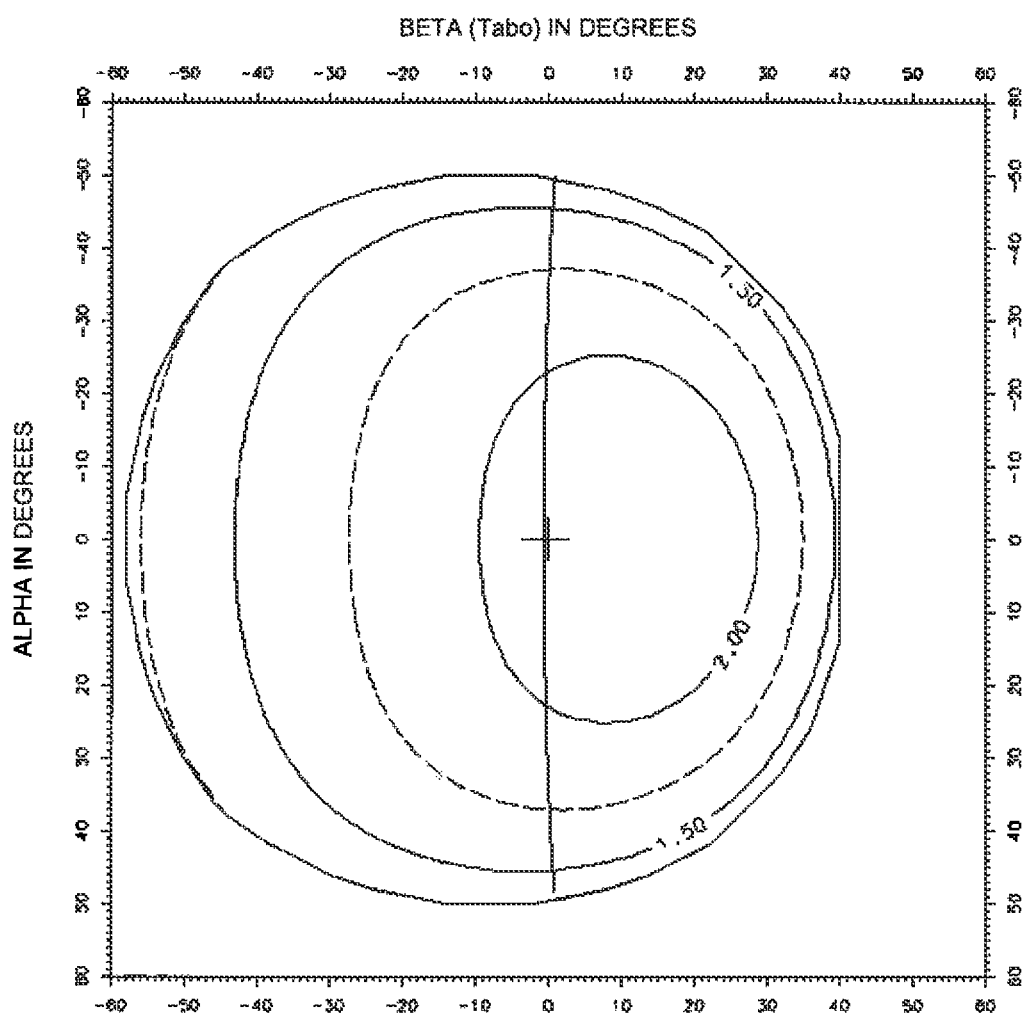
Figure 63:
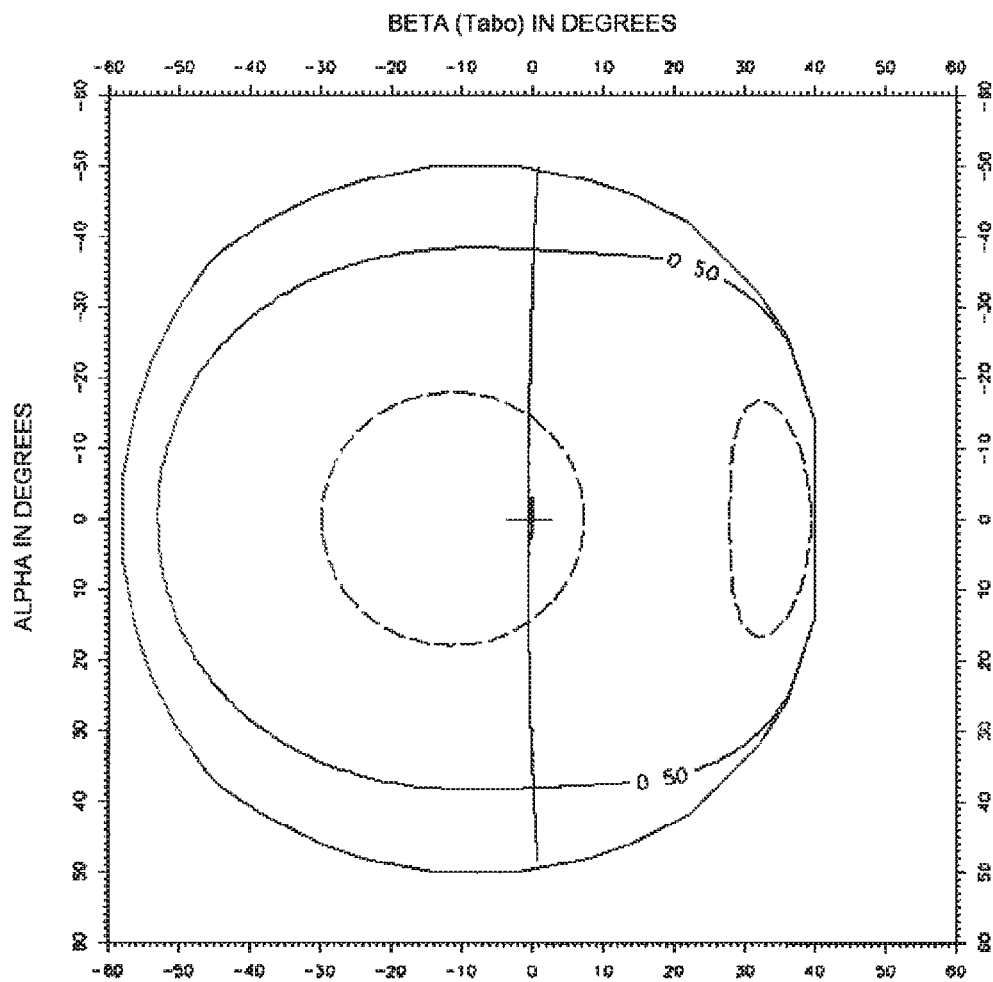
Figure 64:
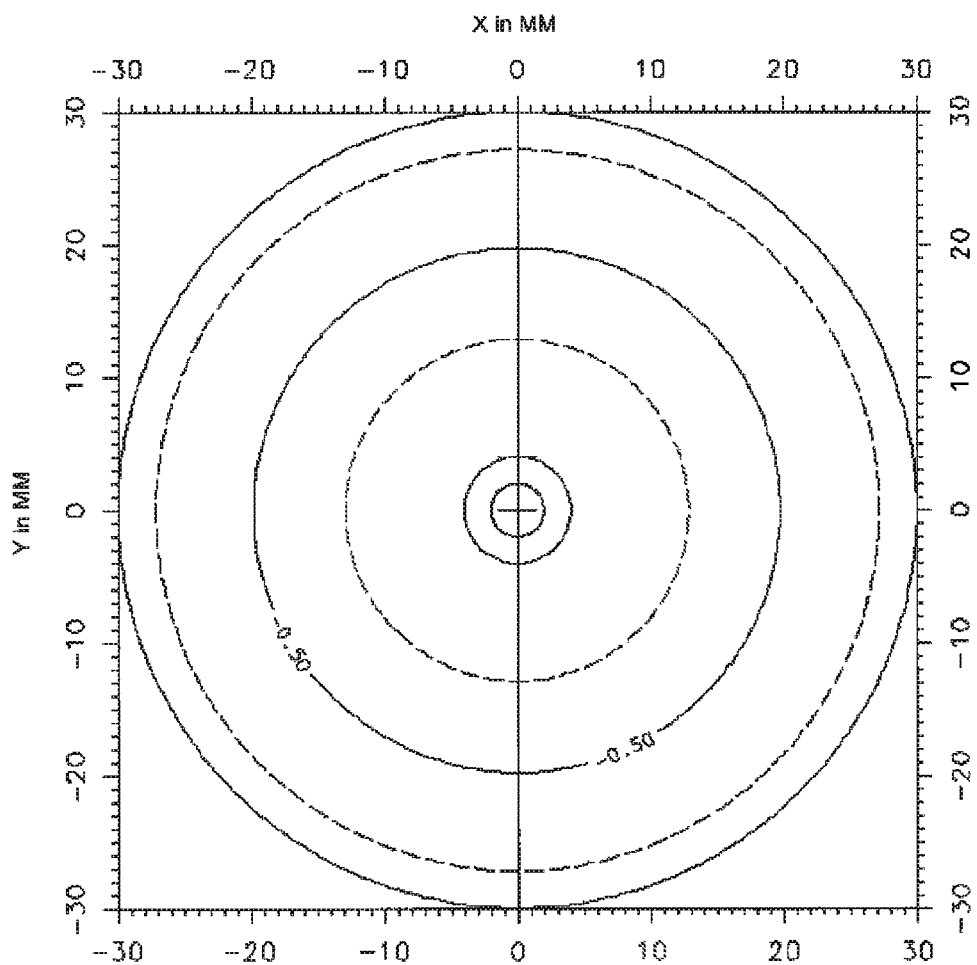
Figure 65:
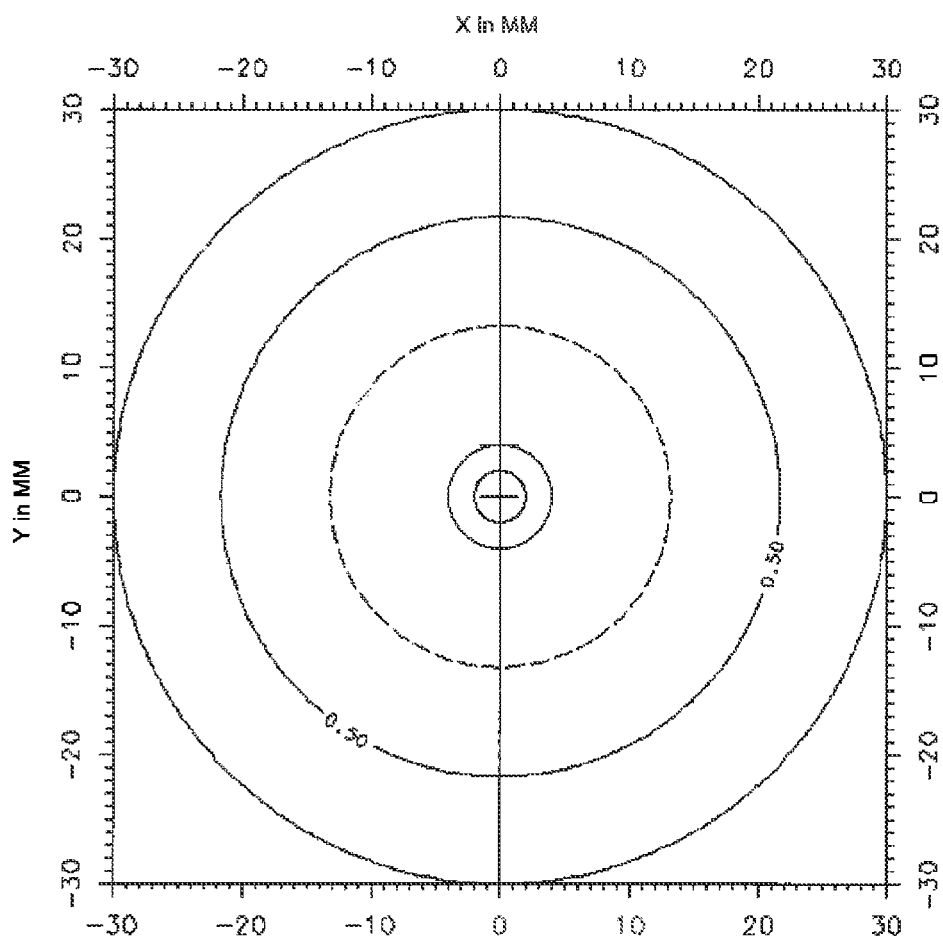
Figure 66:
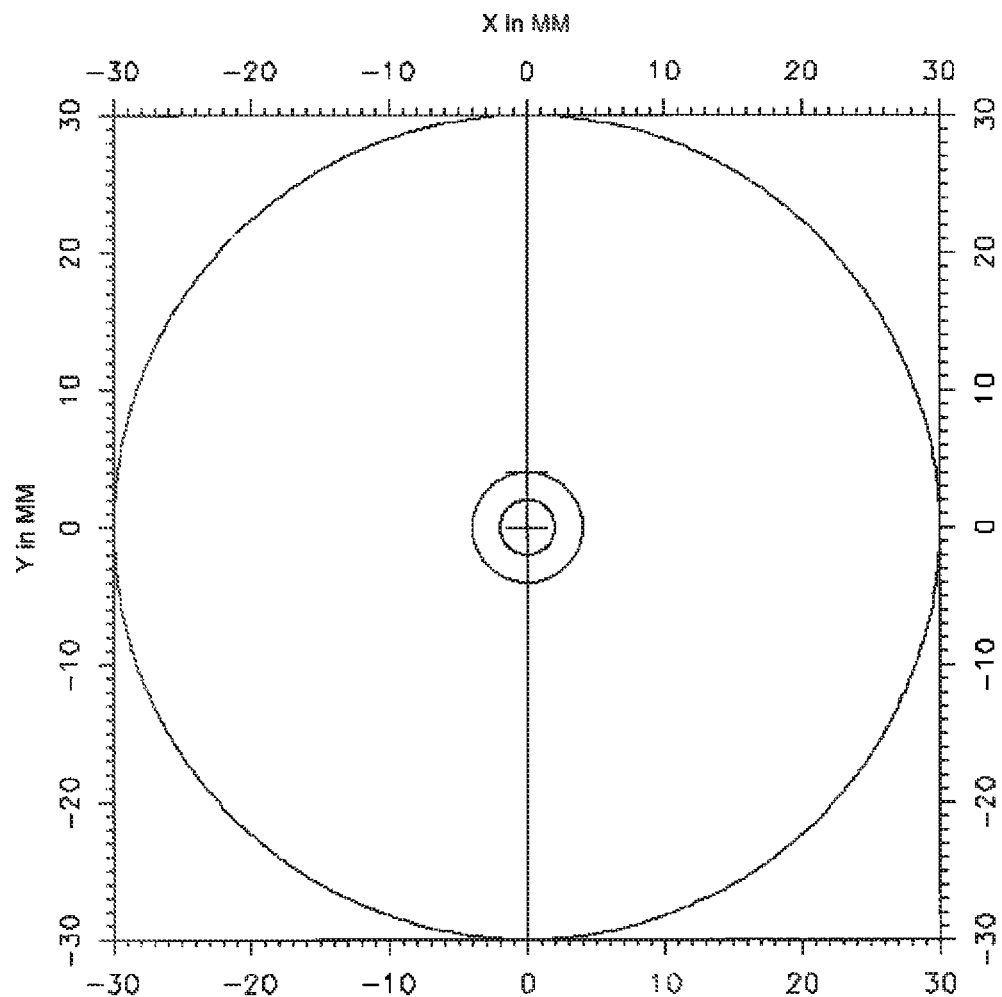
Figure 67:
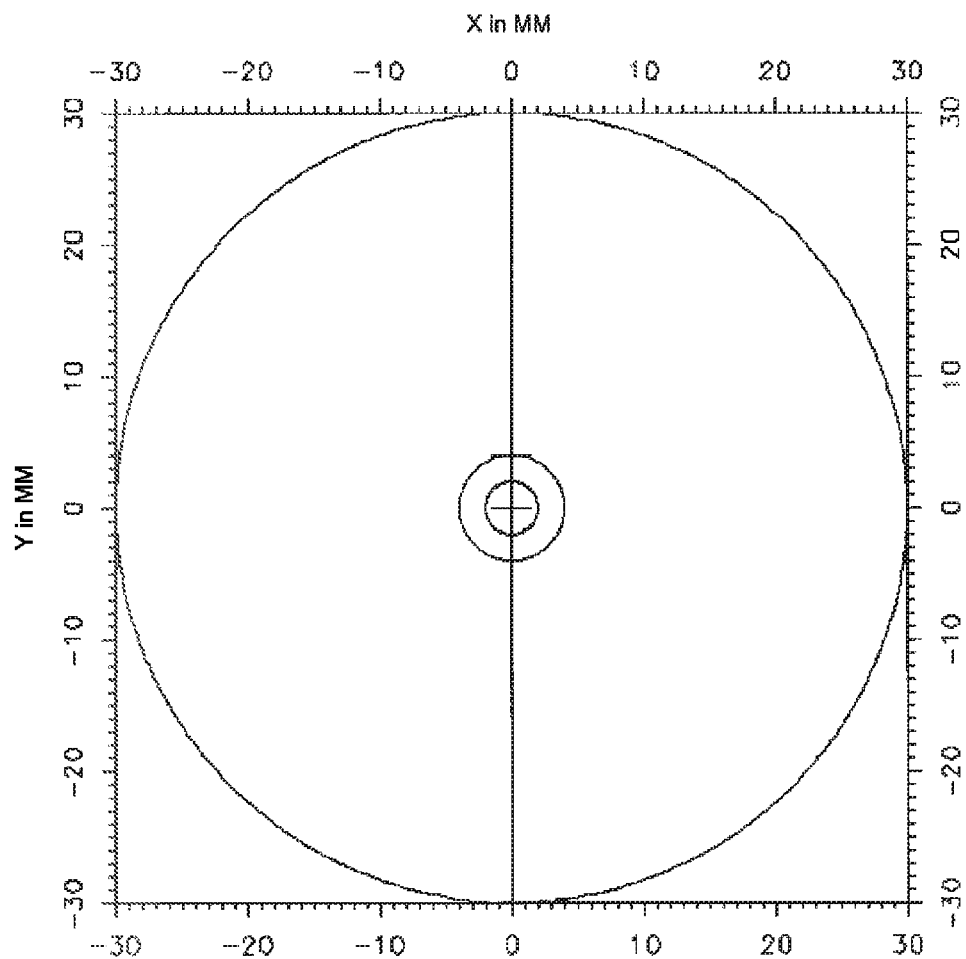
Figure 68:
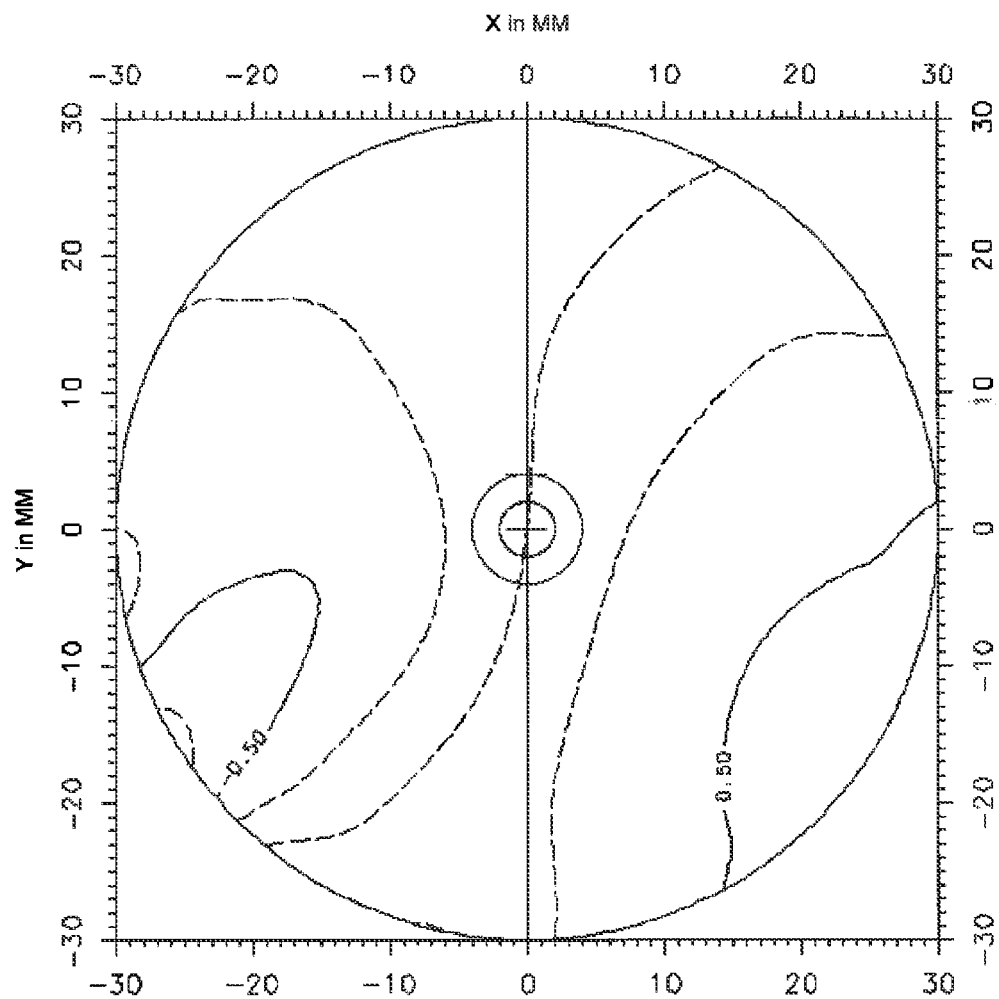
Figure 69:
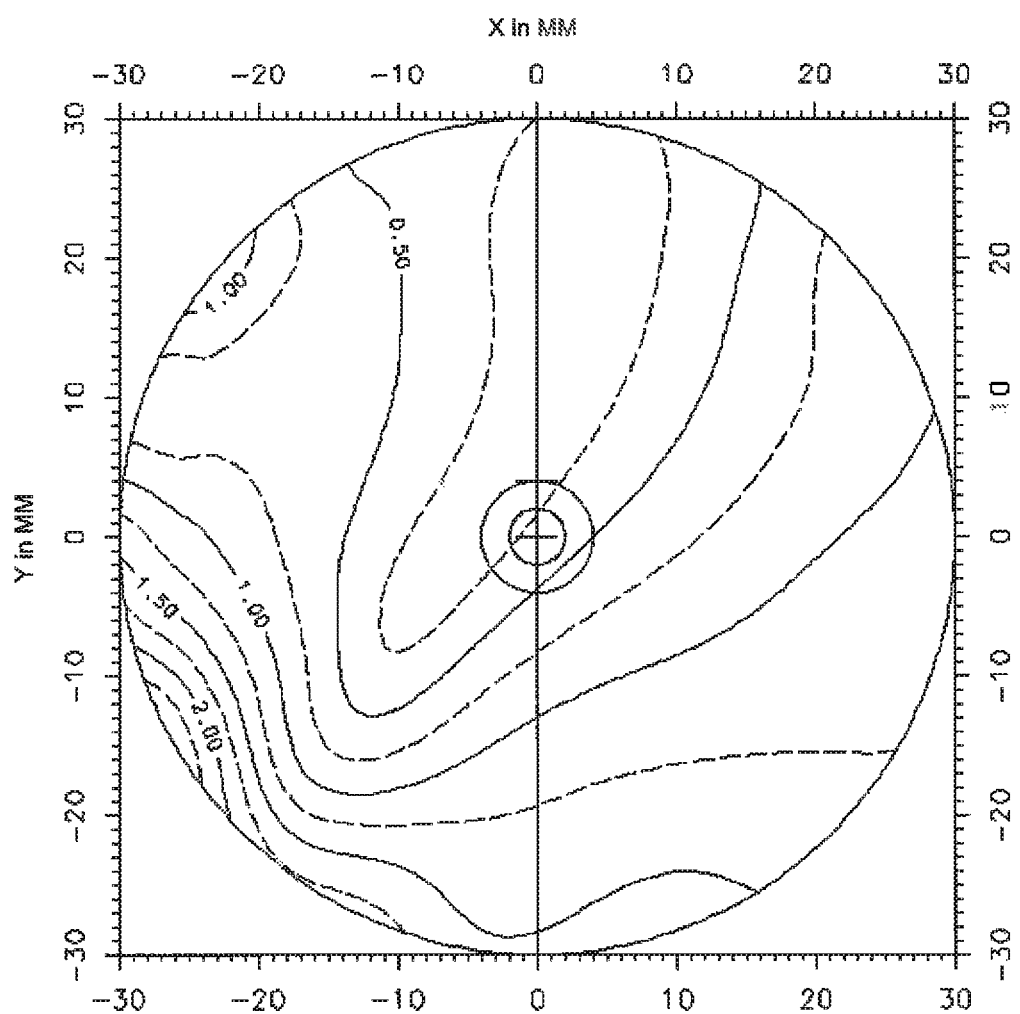
Figure 70:
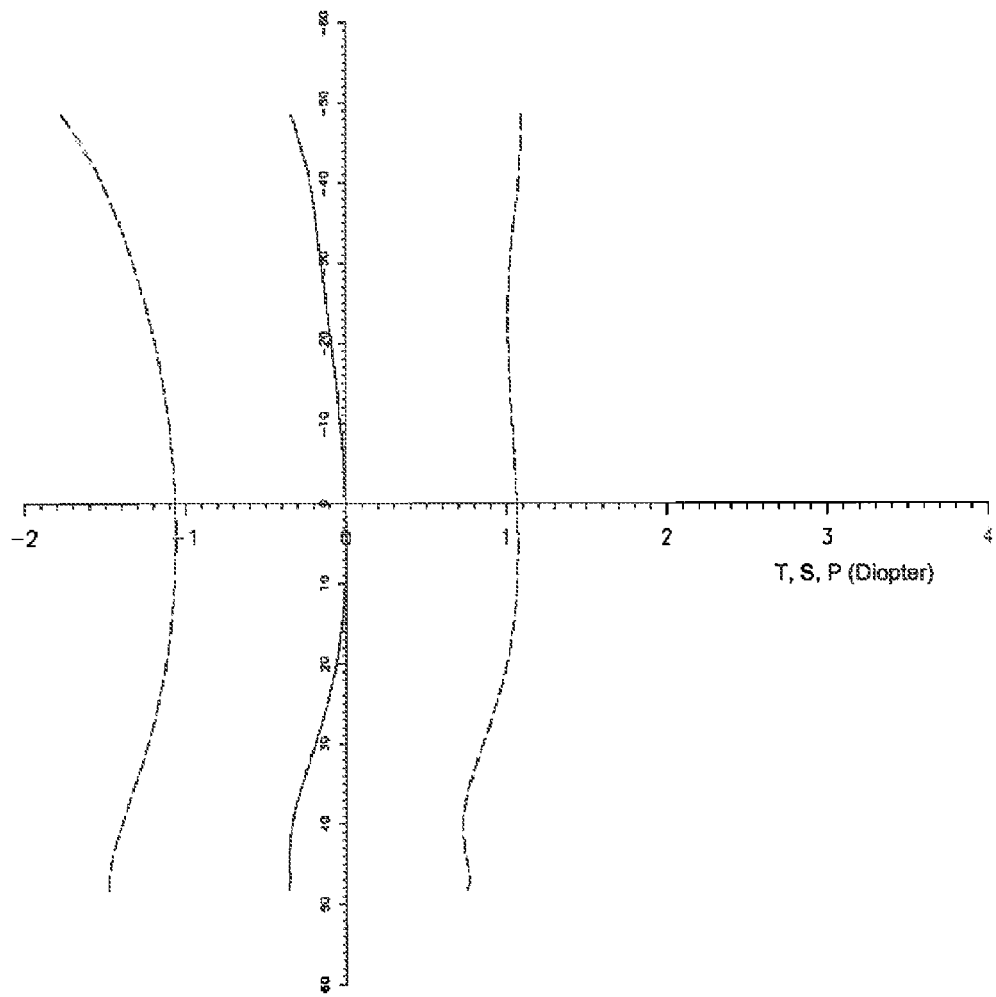
Figure 71:
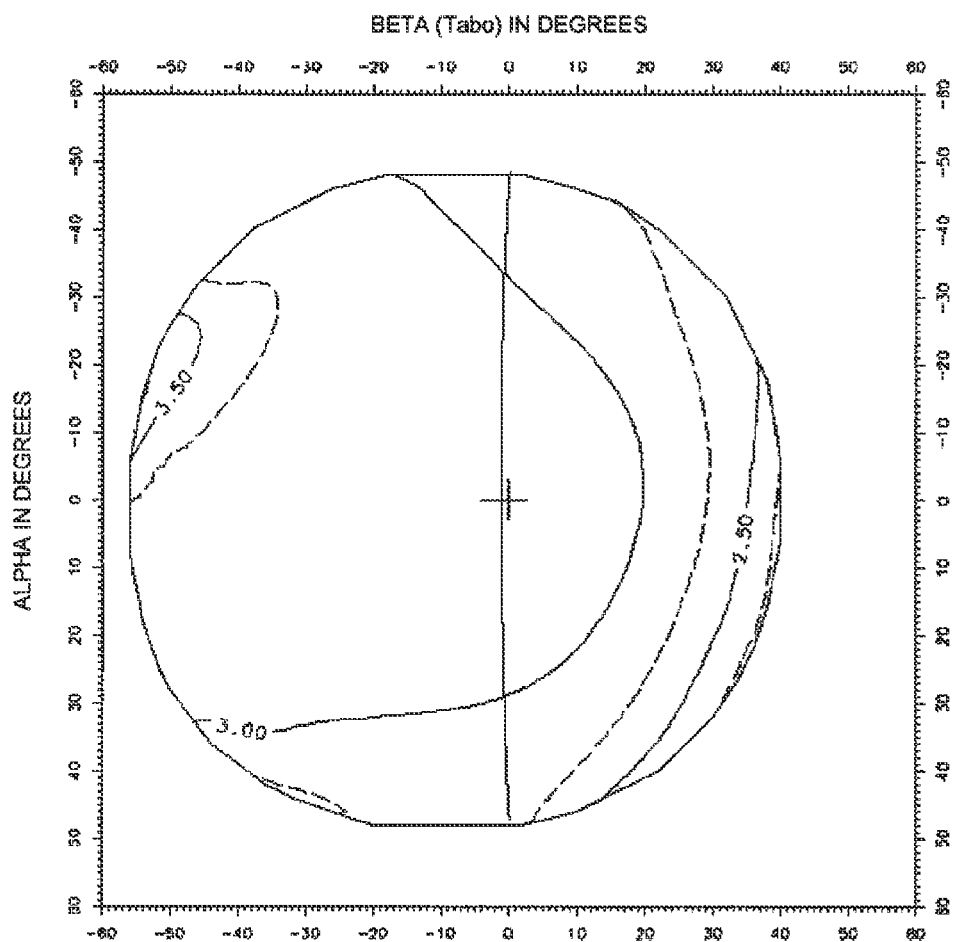
Figure 72:
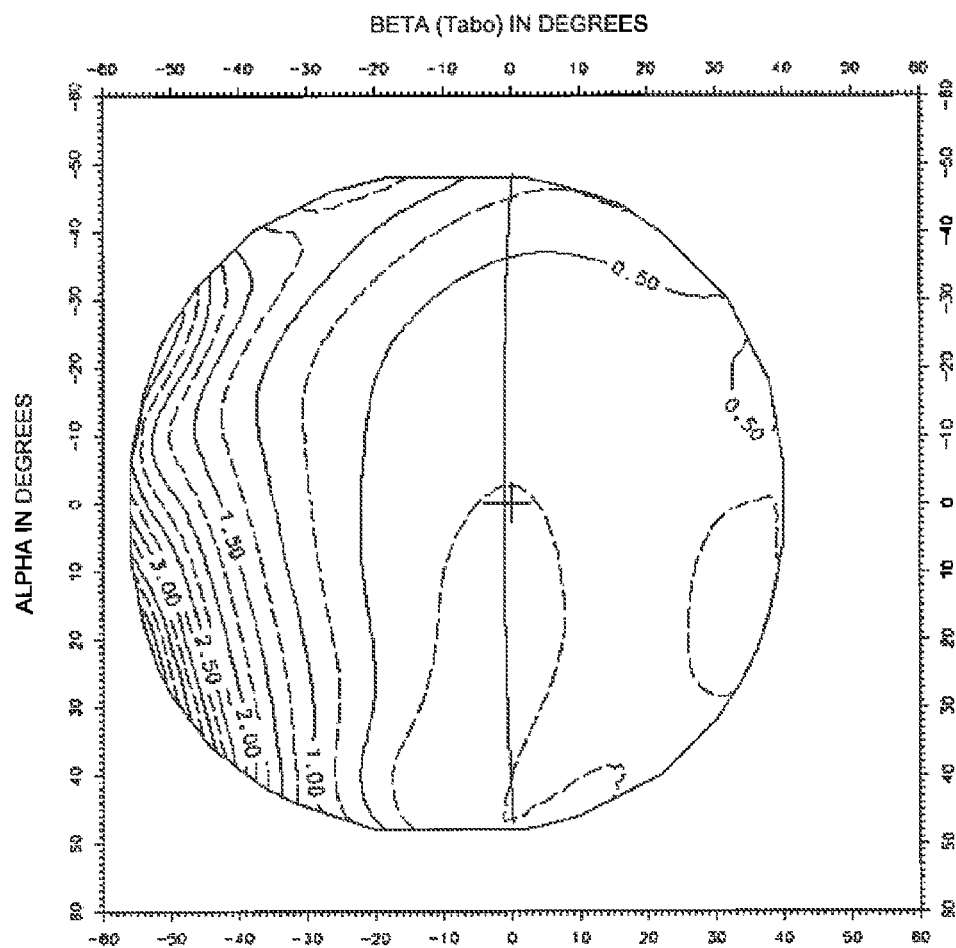
Figure 73:
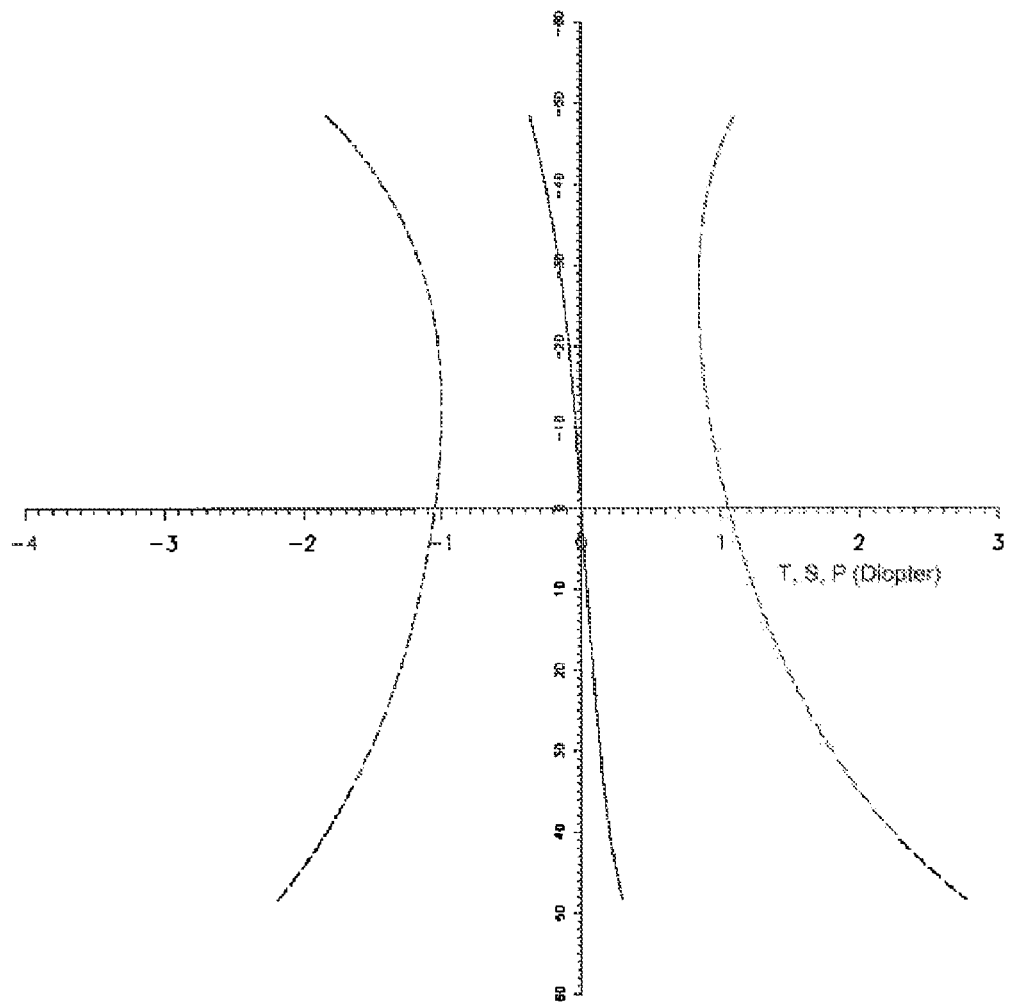
Figure 74:
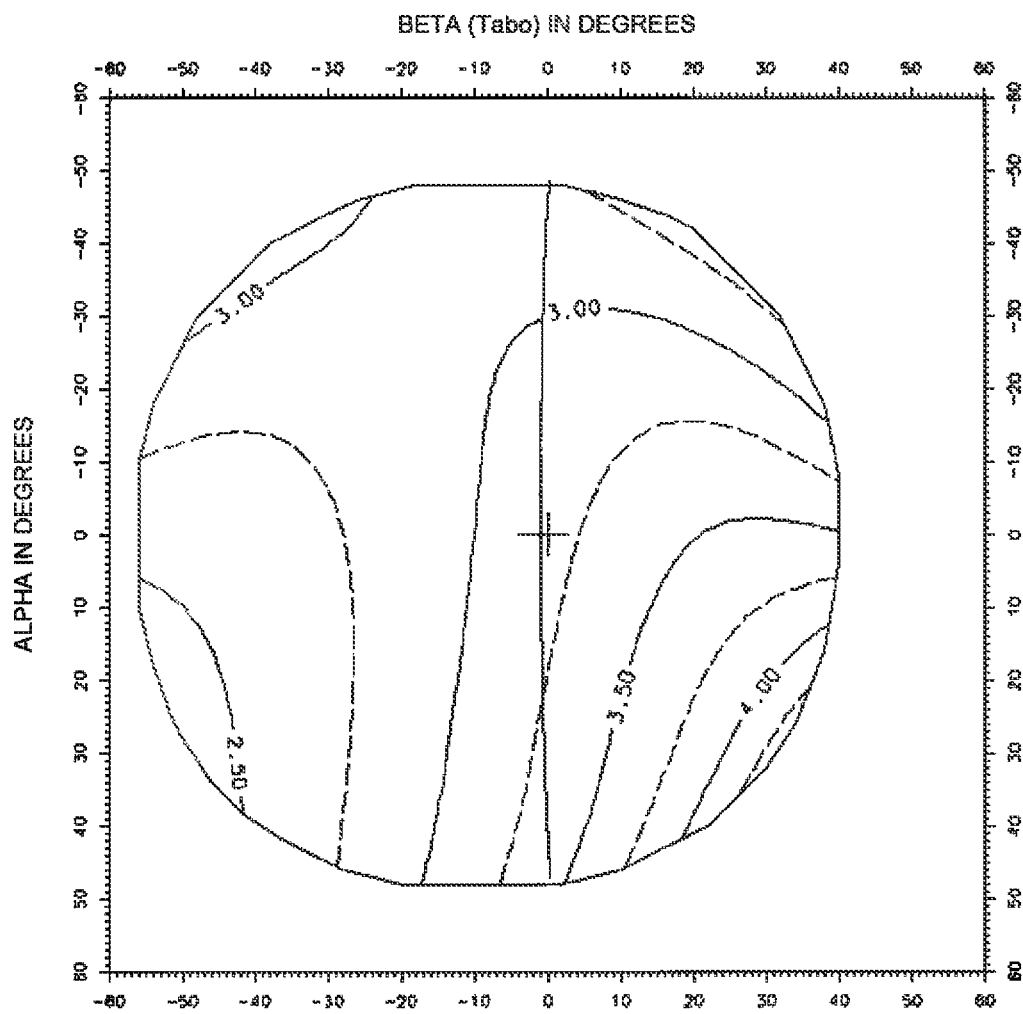
Figure 75:
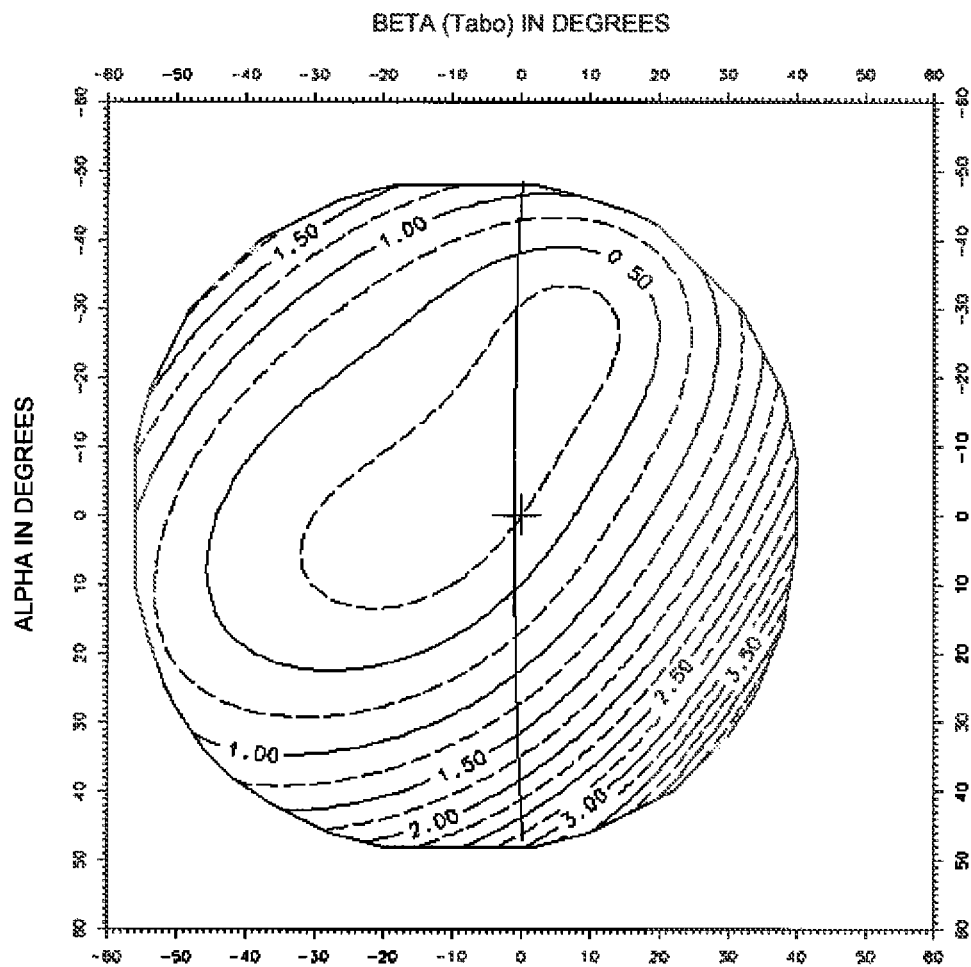

Other features and advantages of the invention will appear upon reading the following detailed description of specific embodiments of the invention, provided solely examples and in reference to the appended drawings, which show:

FIG. 1, a diagram of an optical system and lens in top view;

FIG. 2, a flowchart of an example of a determination method of an aspherization layer;

FIG. 3, a flowchart of an example of a determination method of an ophthalmic lens;

FIGS. 4-5, graphic illustrations of surface characteristics, average sphere and cylinder, respectively, of the front surface of a semi-finished lens used in one embodiment of the method;

FIGS. 6-7, graphic illustrations of surface characteristics, average sphere and cylinder, respectively, of the generic surface used in one embodiment of the method;

FIGS. 8-9, graphic illustrations of surface characteristics, average surface and cylinder, respectively, of the obtained aspherization layer according to one embodiment of the method;

FIGS. 10-12, graphic illustrations of optical characteristics of a lens obtained according to one embodiment of the invention;

FIGS. 13-15, graphic illustrations of optical characteristics of a lens of the prior art;

FIGS. 16-17, graphic illustrations of surface characteristics, average sphere and cylinder, respectively, of the front surface of a semi-finished lens used in one embodiment of the invention;

FIGS. 18-19, graphic illustrations of surface characteristics, average sphere and cylinder, respectively, of the generic surface used in another embodiment of the method;

FIGS. 20-21, graphic illustrations of the surface characteristics, average sphere and cylinder, respectively, of the aspherization layer obtained according to another embodiment of the method;

FIGS. 22-24, graphic illustrations of optical characteristics of a lens obtained according to another embodiment of the method;

FIGS. 25-27, graphic illustrations of optical characteristics of a lens according to the prior art;

FIGS. 28-29, graphic illustrations of surface characteristics, average sphere and cylinder, respectively, of the front surface of a semi-finished lens used in one embodiment of the method;

FIGS. 30-31, graphic illustrations of surface characteristics, average sphere and cylinder, respectively, of the generic surface used in one embodiment of the method;

FIGS. 32-33, graphic illustrations of surface characteristics, average sphere and cylinder, respectively, of the aspherization layer obtained according to another embodiment of the method;

FIGS. 34-36, graphic illustrations of the optical characteristics of a lens obtained according to another embodiment of the method;

FIGS. 37-39, graphic illustrations of optical characteristics of a lens according to the prior art;

FIGS. 40-41, graphic illustrations of surface characteristics, average sphere and cylinder, respectively, of the front surface of a semi-finished lens used in one embodiment of the method;

FIGS. 42-43, graphic illustrations of surface characteristics, average sphere and cylinder, respectively, of the generic surface used in another embodiment of the method;

FIGS. 44-45, graphic illustrations of the surface characteristics, average sphere and cylinder, respectively, of the aspherization layer obtained according to another embodiment of the method;

FIGS. 46-48, graphic illustrations of the optical characteristics of a lens obtained according to another embodiment of the method;

FIGS. 49-51, graphic illustrations of the optical characteristics of a lens according to the prior art;

FIGS. 52-53, graphic illustrations of the surface characteristics, average sphere and cylinder, respectively, of the front surface of a semi-finished lens used in one embodiment of the method;

FIGS. 54-55, graphic illustrations of surface characteristics, average sphere and cylinder, respectively, of the generic surface used in another embodiment of the method;

FIGS. 56-57, graphic illustrations of the surface characteristics, average sphere and cylinder, respectively, of the aspherization layer obtained according to another embodiment of the method;

FIGS. 58-60, graphic illustrations of optical characteristics of a lens obtained according to another embodiment of the method;

FIGS. 61-63, graphic illustrations of the optical characteristics of a lens according to the prior art;

FIGS. 64-65, graphic illustrations of the surface characteristics, average sphere and cylinder, respectively, of the front surface of a semi-finished lens used in one embodiment of the method;

FIGS. 66-67, graphic illustrations of the surface characteristics, average sphere and cylinder, respectively, of the generic surface used in another embodiment of the method;

FIGS. 68-69, graphic illustrations of the surface characteristics, average sphere and cylinder, respectively, of the aspherization layer obtained according to another embodiment of the method;

FIGS. 70-72, graphic illustrations of the optical characteristics of a lens obtained according to another embodiment of the method; and FIGS. 73-75, graphic illustrations of the optical characteristics of a lens according to the prior art.

The invention relates to a determination method of an aspherization layer for an ophthalmic lens for a wearer for whom a power and an astigmatism have been prescribed. A layer is defined as a fictitious surface characterized at all points by its altitude. An aspherization layer is defined here as a complex layer determined by optimization of the optical performance of a finished lens formed by the aspheric front surface of the semi-finished lens and the rear surface resulting from the combination of the aspherization layer and a prescription layer. The spherical or annular prescription layer makes it possible to adapt the lens to the user's ametropia. In the initial state before optimization of the lens, the aspherization layer is planar and therefore the prescription layer fully makes up the prescription surface. The addition of an aspherization layer to the prescription layer makes it possible to improve the lenses made from semi-finished lenses whereof the aspheric surface is unknown. In particular, the aberrations caused by the astigmatism prescription or aberrations related to specific wearing conditions are decreased.

The invention proposes to determine an aspherization layer from a virtual semi-finished lens whereof the geometry of the aspheric surface is known and to add the layer thus obtained with the prescription layer to form the rear surface of the lens whereof the front aspheric surface is unknown. The method is in particular well suited to implementation in prescription laboratories performing the finishing of semi-finished lenses.

The solution applies not only to multifocal progressive lenses, as in the examples of FIGS. 4 to 27 and 40 to 51 below, but also to unifocal lenses, as in the example of FIGS. 28 to 39 and 52 to 75 below. It is also possible to use the method with multifocal lenses, such as bifocal or trifocal lenses.

For each type of lens, a reference point is defined. In the case of a progressive lens, the reference point can correspond to the distant vision control point. In the case of a unifocal lens, the reference point is defined as a point where the prescription is done. Such a point can then be the geometric center of the lens.

The determination method applies in particular to a progressive lens. It is interesting to use the determination method for a progressive lens because the multifocal lenses pose a particular problem for the astigmatic wearer. The astigmatism seen by the wearer can be considered the result of three components:

the local cylinder of the progressive surface, characterized by its amplitude (or module) and its axis.

the cylinder (amplitude and axis) presented by the prescription surface making it possible in particular to achieve the prescription at the control point;

the oblique astigmatism generated by the obliqueness of the rays on the surfaces making up the lens.

The determination method also applies to an optimized lens for specific wearing conditions.

Below, as an example, the unknown aspheric surface is supported by the front surface. The aspheric surface could also be supported by the rear surface.

In a known manner, at any point of an aspheric surface, an average sphere D can be defined using the following formula:

$$D = \frac{n-1}{2}\left(\frac{1}{R_1} + \frac{1}{R_2}\right)$$

where $R_1$ and $R_2$ are the maximum and minimum curve radii expressed in meters, and n is the index of the material making up the lens.

A cylinder C can also be defined by the formula:

$$C = (n-1)\left|\frac{1}{R_1} - \frac{1}{R_2}\right|$$

For a given lens, and for example for a multifocal lens, the corresponding optical magnitudes, i.e. a power and an astigmatism, are defined.

FIG. 1 shows a diagram of an eye and lens optical system seen from above, and shows the definitions used in the continuation of the description. Q' refers to the center of rotation of the eye; the axis Q'F' shown in the figures in broken lines is the horizontal axis passing through the center of rotation of the eye and extending in front of the wearer—in other words, the axis Q'F' corresponds to the primary viewing direction. This axis cuts, on the front surface, through a point of the lens called cross mark, which is solidified on the lenses to allow them to be positioned by an optician. The cross mark is generally situated 4 mm above the geometric center of the front surface, i.e. the point O, intersection point of the rear surface and of this axis Q'F'. A sphere of the apices is defined, with center Q', and radius q', which is tangent to the rear surface of the lens in a point of the horizontal axis. As an example, a value of the radius q' of 25.5 mm corresponds to a current value and provides satisfactory results when the lenses are worn.

A given viewing direction—shown in solid lines in FIG. 1—corresponds to a position of the eye in rotation around Q' and to a point J of the sphere of the apices; the angle $\alpha$ is the angle formed between the axis Q'F' and the projection of the line Q'J on the horizontal plane containing the axis Q'F'; this angle appears in the diagram of FIG. 1. The angle $\beta$ is the angle formed between the axis Q'F' and the projection of the line Q'J on the vertical plane containing the axis Q'F'. A given viewing direction therefore corresponds to a point J of the sphere of the apices or to a pair $(\alpha,\beta)$. The image of a point of the object space, in a viewing direction, and at a given object distance, is formed between two points S and T corresponding to minimum and maximum focal distances, which would be sagittal and tangential focal distances in the case of revolution surfaces. On the optical axis, the infinite image of a point of the object space forms at point F'. The distance D is the focal distance of the eye-lens system.

Ergorama refers to a function associating each viewing direction with the usual distance of the object point. Typically, in distant vision along the primary viewing direction, the object point is infinite. In near vision, following a direction substantially corresponding to an angle $\alpha$ in the vicinity of 35° and an angle $\beta$ in the vicinity of 5°, the object distance is in the vicinity of 30 to 50 cm. For more information on one possible definition of an ergorama, reference may be made to FR-A-2 753 805 (U.S. Pat. No. 6,318,859). This document describes an ergorama, its definition and modeling method. A particular ergorama consists of only taking infinite points. For the inventive method, infinite or non-infinite points may be considered. The ergorama can also depend on the wearer's ametropia.

Using these elements, it is possible to define a power and an astigmatism, in each viewing direction. For a viewing direction $(\alpha, \beta)$, an object point M at an object distance given by the ergorama is considered. In the object space, for the point M on the corresponding luminous ray, an object proximity PO is defined as the opposite of the distance MJ between the point M and the point J of the sphere of the apices:

$$PO = 1/MJ$$

This makes it possible to calculate the object proximity in the context of a thin lens approximation in all points of the sphere of the apices, which is used to determine the ergorama. For a real lens, it is possible, with the assistance of a program for drawing rays considering the object proximity as the opposite of the distance between the object point and the front surface of the lens, on the corresponding ray.

Still for the same viewing direction ($\alpha$, $\beta$), the image of a point M having a given object proximity forms between two points S and T respectively corresponding to minimum and maximum focal distances (which would then be sagittal and tangential focal distances in the case of surfaces of revolution). The image proximity of the point M is the quantity:

$$PI = \frac{1}{2}\left(\frac{1}{JT} + \frac{1}{JS}\right)$$

By analogy with the case of the thin lens, one thus defines, in a given viewing direction and for a given object proximity, i.e. for a point of the object space on the corresponding luminous ray, an optical power as the sum of the image proximity and the object proximity.

$$P = PO + PI = \frac{1}{MJ} + \frac{1}{2}\left(\frac{1}{JT} + \frac{1}{JS}\right)$$

With the same notations, in each viewing direction and for a given object proximity, an astigmatism aberration AA is defined as $$AA = \left|\frac{1}{JT} - \frac{1}{JS}\right|$$

This definition corresponds to the astigmatism of the radiation beam created by the lens. It will be noted that the definition provides, in the primary viewing direction, the traditional value of the astigmatism.

One thus obtains possible definitions according to the invention of the optical power and the astigmatism of the lens, under the wear conditions, which can be calculated as explained in B. Bourdoncle et al., Ray tracing through progressive ophthalmic lenses, 1990 International Lens Design Conference, D. T. Moor ed., Proc. Soc. Photo. Opt. Instrum. Eng. "Standard wear conditions" refer to the position of the lens relative to the average wearer's eye, defined in particular by the pantoscopic angle, the lens-eye distance, and the curving contour. It is also possible to use other definitions. The definitions presented above have the advantage of being defined simply, and being able to be calculated easily using a ray drawing program, for a given lens. Hereafter, the optical power and the astigmatism can be calculated such that the prescription can be reached at the control point either for a wearer wearing his lenses in the wear conditions or for frontofocometer.

The method according to the invention aims to determine an aspherization layer for an ophthalmic lens for a wearer for whom a power and an astigmatism have been prescribed. The ophthalmologist or optician usually notes the prescription for each eye in the form of a triplet (sphere SPH, cylinder CYL, axis AXE) in a given convention, either called "positive cylinder" or "negative cylinder." The prescribed power is named P and is equivalent to SPH. The prescribed astigmatism is called A. Its module is CYL and its axis is AXE. The average power prescribed for the wearer is then equal to SPH+CYL/2. The ophthalmologist (or optician) can also measure the specific frame wear conditions for the wearer and in particular the lens-eye distance, the pantoscopic angle and the curving contour of the chosen frame.

The method can concern both an astigmatic wearer with a prescription for a zero power and a prescription for a non-zero power. The method can also be applied for a non-astigmatic wearer, but whose frame wear conditions are particular. We talk about "particular wear conditions" when the pantoscopic angle, curving contour, and lens-eye distance values are different from the average values defined by the manufacturer. Typically, the average pantoscopic angle is 8°, the curving contour is 0°, and the lens-eye distance 25.5 mm (standard wear conditions). Certain wearers can have a morphology and/or choose a frame that leads to different values of these averages, in which case one talks about particular or personalized wear conditions.

FIG. 2 illustrates a flowchart of one embodiment of the determination method of the aspherization layer.

The method can comprise a step 15 for providing lens and base index values. This makes it possible to have additional information on the wearer's needs. The method thus makes it possible to obtain an aspherization layer that is better adapted to the wearer's needs.

Step 15 can be carried out by providing a semi-finished lens. A semi-finished lens is a lens whereof only one surface is machined. In particular, the manufacturers of multifocal ophthalmic lenses generally manufacture a family of semi-finished lenses. Thus, first, only the surface of the lenses of the same family is machined on one surface; then the opposite surface is machined later according to a spherical or annular shape with curves appropriate for each glasses wearer according to an ophthalmologist's prescriptions. The index and base information relative to the semi-finished lens are thus easily known. This generally involves information provided by the manufacturer for each of its products.

At the end of step 15, the prescription by the ophthalmologist, or the data P, A, the addition Add if applicable, and the wear conditions, as well as the index and the base, are known. Only the prescription and wear conditions are known if the method is implemented in step 15.

The determination method comprises a step 10 for choosing a generic surface $S_G$. The surface $S_G$ has sphere and cylinder values known at each point. The surface $S_G$ can in particular be shown by an equation providing the altitude of the surface at each point. A generic surface can thus be any surface. The generic surface $S_G$ is chosen to be the best adapted to the product to be machined given the known data. For example, imagine that the progression length defined as the distance between the cross mark and the near vision control point is short. In such a case, the selected generic surface $S_G$ also has a short progression length, the progression length being able to be different. In particular, when the semi-finished lens provided is a progressive lens, it is advantageous for the chosen generic surface $S_G$ to have the same progression length as the semi-finished lens in order to improve the results obtained using the method. For the same reason, the chosen generic surface $S_G$ can have the same addition as the provided semi-finished lens. Furthermore, the surface $S_G$ can be adapted in the base and the index of the semi-finished lens if they are known.

The determination method also includes a step 20 for creating a fictitious target lens. The fictitious target lens is called $L_C$ hereinafter. The lens $L_C$ includes a front surface, a rear surface, and a reference point as previously defined. The front surface of the lens $L_C$ is the generic surface $S_G$. The rear surface of the lens $L_C$ is a simple surface called $S_2$. As an example, the simple surface can be a sphere or an annulus. A simple surface can be easily calculated.

The simple surface $S_2$ can be chosen in different ways. The simple surface $S_2$ can be such that the power $P_C$ and the astigmatism $A_C$ of the fictitious target lens at the reference point are also respectively the sum of the prescribed power and half of the prescribed astigmatism and a zero astigmatism. This is illustrated by the following mathematical relations (1) and (2):

$$P_C = P + A/2 = SPH + CYL/2 \quad (1)$$

$$A_C = 0 \quad (2)$$

In the particular case of a progressive fictitious target lens $L_C$, the reference point can be defined as the distant vision control point.

The fictitious target lens $L_C$ thus has a rear surface $S_2$ configured so that the target lens meets a target prescription that has a power $P_C$ equal to $P+A/2$ and no astigmatism.

Such a choice of the simple surface $S_2$ can in particular be used when the astigmatism prescription is not zero. The fictitious target lens $L_C$ of the examples of FIGS. 4 to 39 and 64 to 75 below is thus defined.

The simple surface $S_2$ can also be chosen so that the power $P_C$ and the astigmatism $A_C$ of the fictitious target lens at the reference point are substantially equal to the prescribed power P and the prescribed astigmatism A, respectively. This is illustrated by the following mathematical relations (3) and (4):

$$P_C = P = SPH \quad (3)$$

$$A_C = A = CYL \quad (4)$$

In the particular case of a progressive fictitious target lens $L_C$, the reference point can be defined as the distant vision control point.

The fictitious target lens $L_C$ thus has a rear surface configured so that the target lens meets a target prescription that has a power equal to P and an astigmatism equal to A.

Such a choice of the simple surface $S_2$ can in particular be used when one wishes to take wear conditions of the lens into account. The fictitious target lens $L_C$ of the examples of FIGS. 40 to 63 is defined in this way.

When the method implemented includes a step 15 for providing an index value and base value according to the example of FIG. 2, the fictitious target lens $L_C$ also has the index value and the base value.

The target lens $L_C$ defines the optical targets for each viewing direction. The optical targets can in particular be power, astigmatism (or resulting astigmatism), prismatic deviation, distortion targets, or a combination thereof. For example, in the case of an astigmatism target, for the lens $L_C$ one simulates, using a program for drawing rays, the astigmatism for a set of viewing directions, as defined above, in the wear situation, and from proximity values given by the ergorama. The target lens can then be virtually placed in standard wear conditions.

In step 30 of the determination method, a current fictitious lens $L_F$ is created. The current fictitious lens is a lens whereof the rear surface is configurable.

The current fictitious lens $L_F$ initially chosen is an initial fictitious test lens. The initial fictitious test lens is noted $L_I$. The initial test lens $L_I$ includes a front surface, a rear surface, and a reference point as previously defined. The front surface of the initial fictitious lens is the generic surface $S_G$. The rear surface $S_4$ of the initial fictitious test lens $L_I$ is a simple surface such as a sphere or an annulus. The simple surface $S_4$ is such that the power $P_I$ and the astigmatism $A_I$ of the initial test lens $L_I$ at the reference point are substantially equal to the prescribed power and the prescribed astigmatism, respectively. This is translated by the following relations (5) and (6):

$$P_I = P = SPH \quad (5)$$

$$A_I = A = CYL \quad (6)$$

In the particular case of a progressive lens $L_I$, the relations (5) and (6) mean that the value of the average power at the distant vision control point is equal to the prescribed average power P and the value of the astigmatism at the distant vision control point is equal to the prescribed astigmatism A.

The initial test lens $L_I$ thus has a rear surface $S_4$ configured so that the initial lens meets a prescription including a power of P and an astigmatism of A.

When the method implemented includes a step 15 for providing an index value and base value such as the example of FIG. 2, the initial fictitious test lens $L_I$ also has the index value and the base value.

The current fictitious lens obtained at the end of step 30 includes a front surface with surface $S_G$ and a rear surface configured so that the current fictitious lens meets a prescription that would include a power of P and an astigmatism of A. This rear surface can be broken down into two fictitious layers, the first $N_{F1}$ having the geometry of the rear surface $S_4$ determined above and allowing the current fictitious lens to meet the prescription, the second layer $N_{F2}$ being a planar surface. The rear surface is then defined as the sum in altitude of the two layers $N_{F1}$ and $N_{F2}$.

The method also includes step 40. Step 40 is the optical optimization of the current fictitious lens $L_F$. The rear surface of the current fictitious lens $L_F$ is configured to achieve the optical flaw targets of the target lens $L_C$ for each viewing direction. More particularly, the layer $N_{F2}$ of the rear surface of the current lens is optimized.

The aim of the optimization program, starting from a lens to be optimized, is to approach the target lens as much as possible in terms of optical characteristics. To that end, it is possible to consider a cost function, representative of the optical criteria deviations between the lens to be optimized and the target lens, defined as follows. For a set of points of the lens or viewing directions, indexed by a variable i, the merit function is considered to be written in the form:

$$\sum_i p_i \sum_j W_{ij}(V_{ij} - C_{ij})^2$$

where:
$p_i$ is a weight of the point i;
$V_{ij}$ is the value of the $j^{th}$ type of parameter at point i;
$C_{ij}$ is the target value of the $j^{th}$ type of parameter at point i;
$W_{ij}$ is the weight of the $j^{th}$ type of parameter at point i.

It is for example possible to arrive at appropriate results by considering a set of 1000 points, distributed along the meridian (100 points) and the rest of the lens.

It is possible to set j at 2, and to use parameters that are the wearer power and the resulting astigmatism, as explained above.

The weight $p_i$ of the points i makes it possible to allocate a more or less substantial weight to the various regions of the lens. It is for example preferable to provide for a substantial weight at the center of the lens, and to decrease the weight with the distance from the meridian.

The value $V_{ij}$, is measured for the point i by a program for drawing rays, using the wearer power and astigmatism aberration definitions provided above, from the proximity value provided by the ergorama. $V_{i1}$, is the wearer power value measured at point i and $V_{i2}$ is the astigmatism aberration value measured at point i.

More precisely, it is possible to proceed as follows. In the direction ($\alpha$, $\beta$) of the point i, one builds, by ray drawing program, the ray coming from the center of rotation of the eye, which crosses the rear surface of the lens, the lens, then the front surface and emerges in the object space. One next considers the object point situated on the ray thus drawn at a distance away from the front surface of the lens equal to the opposite of the object proximity given by the ergorama for the direction ($\alpha$, $\beta$). From this object point, one draws a plurality of rays, for example three, towards the lens, to reconstruct the points J and T of FIG. 1; one thus proceeds with an accurate evaluation of the image obtained from a given object point. One thus calculates the image proximity and the astigmatism $V_{i2}$. From the ergorama and the calculated image proximity, one determines the average power $V_{i1}$ in direction ($\alpha$, $\beta$).

The values $C_{ij}$ are the target values: in the example, $C_{i1}$ is the average power value of the fictitious target lens $L_C$ determined in step 20 and $C_{i2}$ is the astigmatism value, at the point i of the lens $L_C$.

Wij is the weight of the j-th type of parameter at point i. It is thus possible to favor, for a given point, the power or astigmatism.

In this way one therefore defines a target, and a cost function representative of the deviations of the optical characteristics of a lens relative to said target. Such a cost function is obviously positive and must be minimized during the optimization process.

To proceed with the optimization, it is then sufficient to choose a starting lens as described in step 30 of the method and a calculation method making it possible to decrease the value of the cost function by iterations.

It is advantageously possible to use, as calculation method, a method of damped least squares (DLS), or any other optimization method known in itself.

In this way, one arrives, for a given prescription and a given addition in the case of a progressive lens, at an optimized lens, after iterations of the optimization program. By using a method of damped least squares, the cost function defined above, and such a starting lens, it is sufficient to proceed with approximately ten iterations to arrive, in most cases, at a lens having satisfactory optical performance.

The position in which the current fictitious lens $L_F$ is optimized can vary. The current fictitious lens $L_F$ can be positioned under standard wearing conditions during the optimization. This is in particular the case of FIGS. 4 to 39 below. The current fictitious lens $L_F$ can also be positioned under customized wearing conditions during the optimization as in FIGS. 40 to 75 below. This makes it possible to adapt the lens to the specific wearing conditions of each user.

At the end of step 40, an optimized current lens is thus obtained.

The method for determining the aspherization layer also comprises a step 50 for determining a complex aspherization layer N. The layer N corresponds to $N_{F2}$. Such a method only uses the prescription given to the wearer and possibly customized wearing conditions, the base and index of the semi-finished lens. The method therefore makes it possible to obtain a complex aspherization layer N without precisely knowing the aspherized surface of the semi-finished lens.

Thus, the aspherization layer N obtained according to the aspherization method can in particular be used in a determination method of an ophthalmic lens.

FIG. 3 illustrates a flowchart of an example of an embodiment of such a determination method. The determination method of the lens comprises a step 100 for providing a semi-finished lens. The semi-finished lens has a front surface whereof the characteristics may not be known. This is in particular the case if the semi-finished lens comes from a non-partner or competing manufacturer of the laboratory.

The method also includes a step 110 for determining the ophthalmic lens. The ophthalmic lens is intended for a wearer to whom a power and an astigmatism have been prescribed. With the wearer's prescription, the provision of the semi-finished lens and possibly the customized wearing conditions, it is possible to implement the determination method of an aspherization layer as previously described. The steps described relative to FIG. 2 correspond to step 120 of FIG. 3; an aspherization layer N is thus obtained in step 130. The lens has a front surface whereof the geometry corresponds to the front surface of the semi-finished lens. The ophthalmic lens also includes a rear surface with surface $S_s$.

In step 140, the surface $S_5$ is obtained by the sum of the complex aspherization layer N previously obtained and a simple surface T. In the case of an astigmatic prescription, the simple surface T is an annulus. The simple surface T used is such that the value of the power at the reference point is equal to the prescribed power and the value of the astigmatism at the reference point is equal to the prescribed astigmatism. The simple surface T used makes it possible to meet the wearer's prescription.

Thus, at the end of the calculation, the rear surface of the ophthalmic lens is defined by the sum of a first traditional layer T meeting the prescription and an aspherization layer N. The sum of these two layers combined makes it possible to obtain the equation for the rear surface to be machined. The equation of the rear surface to be machined is thereby obtained independently of the aspheric layer of the front surface of the semi-finished lens. The equation of the rear surface only depends on the prescription, the index, and the base, and possibly personalized wear conditions. As a result, the method can be applied in prescription laboratories which, from any semi-finished lenses, obtain lenses having the characteristics of the prescription. Furthermore, the rear surface $S_5$ thus obtained can be made with already existing direct machining devices.

The aspherization layer thus makes it possible to improve the optical performance of the lenses obtained from semi-finished lenses whereof the complex surface is unknown. In particular, the aspherization layer makes it possible to reduce the resulting astigmatism. The aspherization layer also reduces the aberrations due to customized wear conditions. The method therefore makes it possible to obtain a complex aspherization layer N without precisely knowing the aspherized surface of the semi-finished lens.

In the case of an annular prescription, the lenses obtained using the method also have the advantage of offsetting the resulting astigmatism.

In the case of specific wearing conditions, the lenses obtained using the method have the advantage of offsetting the optical flaws introduced by those wear conditions.

Moreover, the advantages previously mentioned can be combined in the case of an astigmatic wearer having specific wear conditions.

The following examples provide several embodiments of the invention.

Example 1

In this example, the aim is to obtain a progressive multifocal lens for the following prescription:
prescribed sphere: 0 diopter,
prescribed cylinder: 3 diopters,
45° axis,
addition of 2 diopters.

The wear conditions of the multifocal lens for this prescription are standard wear conditions.

A semi-finished lens with an unknown front surface is provided. The index of the semi-finished lens is known or measured. It is equivalent to 1.665. Likewise, the base of the semi-finished lens is known and is equivalent to 4 diopters.

One seeks to determine the rear surface of the multifocal lens to meet the preceding prescription.

In order to be able to make comparisons on the lens once it is finished, a semi-finished lens is used whereof the front surface is known. FIGS. 4 and 5 show illustrations of surface characteristics of the front surface of the semi-finished lens. FIG. 4 shows the average isosphere lines of the front surface of the lens; the axes are graduated in mm; FIG. 5 shows the isocylinder lines, with the same axes. The isosphere lines are the lines made up of the projections in the plane tangent to the O-shaped progressive surface of the points of the surface having an average sphere of the same value. Likewise, isocylinder lines are the lines made up of the projection in the aforementioned plane of the points of the surface having a cylinder with the same value.

The determination method is carried out without taking into account the front surface of the semi-finished lens. For the determination method, the front surface of the semi-finished lens is unknown.

In step 10 of the determination method of the aspherization layer, a generic surface is chosen. FIGS. 6 and 7 show graphic illustrations of the surface characteristics of the generic surface, with the same conventions as FIGS. 4 to 5.

The comparison of FIGS. 4 and 6, on the one hand, and 5 and 7, on the other hand, clearly show that the chosen generic surface is not the front surface of the semi-finished lens. This illustrates the fact that the method is carried out independently of the front surface of the semi-finished lens.

At the end of the calculation, in step 50, an aspherization layer is obtained. FIGS. 8 and 9 show graphic illustrations of the surface characteristics of the aspherization layer, with the same conventions as FIGS. 4 to 5.

The equation of the rear surface of the multifocal ophthalmic lens can then be obtained in step 110 of the method. The lens can then be obtained by machining the rear surface of the provided semi-finished lens.

The optical characteristics then presented in FIGS. 10 to 15 were obtained by calculation. FIGS. 10 to 12 show graphic illustrations of the optical characteristics of a lens obtained according to the inventive method; FIG. 10 shows the power along the meridian, with the power definition provided above. The abscissa are graduated in diopters, and the ordinates provide the viewing direction; the solid line shows the power, and the broken lines show the quantities 1/JT and 1/JS defined in FIG. 1, for the object distances corresponding to an ergorama representative of the distances of the object points in each viewing direction and simulating an average object space. FIG. 10 thereby provides access to the power and astigmatism flaw along the meridian. FIG. 11 is a graphic illustration of the equal power lines, i.e. lines formed by the points having an identical power value. The axes of the abscissa and ordinates respectively yield angles β and α. FIG. 11 thereby makes it possible to view a map of the power flaw. FIG. 12 shows, with the same axes, the equal resulting astigmatism lines. FIG. 12 is thus a graphic illustration of the astigmatism flaw.

FIGS. 13 to 15 show graphic illustrations of the optical characteristics of a lens of the prior art. The lens of the prior art is a lens in which the rear surface has a simple annulus and the front surface is the front surface of the semi-finished lens. FIGS. 13 to 15 show graphic illustrations similar to those of FIGS. 10 to 12, with the same conventions.

In the case of the lens obtained using the inventive method, the comparison of the results shows that the astigmatism is reduced along the meridian. Moreover, the isoastigmatism lines of the lens obtained using the inventive method (FIG. 12) are more visible in distant vision and in near vision than those of the lens of the prior art (FIG. 15).

Example 2

In this example, the aim is to obtain a progressive multifocal lens for the following prescription:
prescribed sphere: 5 diopters,
prescribed cylinder: 3 diopters,
45° axis,
addition of 2 diopters.

The wear conditions of the multifocal lens for this prescription are standard wear conditions.

A semi-finished lens is provided. The index of the semi-finished lens is known or measured. It is equivalent to 1.665. Likewise, the base of the semi-finished lens is known and is equivalent to 7.5 diopters. One seeks to determine the rear surface of the unifocal lens to meet the preceding prescription.

In order to be able to make comparisons on the lens once it is finished, a semi-finished lens is used whereof the front surface is known. FIGS. 16 and 17 show graphic illustrations of the surface characteristics of the front surface of the semi-finished lens, with the same conventions as FIGS. 4 to 5.

The determination method is carried out without taking into account the front surface of the semi-finished lens. For the determination method, the front surface of the semi-finished lens is unknown.

In step 10 of the method, a generic surface is chosen. FIGS. 18 and 19 show graphic illustrations of the surface characteristics of the generic surface, with the same conventions as FIGS. 4 to 5.

The comparison of FIGS. 16 and 18, on the one hand, and 17 and 19, on the other hand, clearly shows that the chosen generic surface is not the front surface of the semi-finished lens. This illustrates the fact that the method is carried out independently of the front surface of the semi-finished lens.

At the end of the calculation, in step 50, an aspherization layer is obtained. FIGS. 20 and 21 show graphic illustrations of the surface characteristics of the aspherization layer, with the same conventions as before.

The equation of the rear surface of the multifocal ophthalmic lens can then be obtained in step 110 of the method. The lens can then be obtained by machining the rear surface of the provided semi-finished lens.

The optical characteristics then presented in FIGS. 22 to 27 were obtained by calculation. FIGS. 22 to 24 show graphic illustrations of the optical characteristics of a lens obtained according to the inventive method. FIGS. 22 to 24 show graphic illustrations similar to those of FIGS. 10 to 12, with the same conventions.

FIGS. 25 to 27 show graphic illustrations of the optical characteristics of a lens of the prior art. The lens of the prior art is a lens in which the rear surface supports an annulus and the front surface is the front surface of the semi-finished lens. FIGS. 25 to 27 show graphic illustrations similar to those of FIGS. 13 to 15, with the same conventions.

In the case of the lens obtained using the inventive method, the comparison of the results shows that the astigmatism is reduced along the meridian. Moreover, the isoastigmatism lines of the lens obtained using the inventive method (FIG. 24) are more visible in distant vision and in near vision than those of the lens of the prior art (FIG. 27).

Example 3

The case of a unifocal lens is now considered.

In this example, the aim is to obtain a unifocal lens for the following prescription:
prescribed sphere: 0 diopter,
prescribed cylinder: −3 diopters,
45° axis.

The wear conditions of the unifocal lens for this prescription are standard wear conditions.

A semi-finished lens is provided. The index of the semi-finished lens is known or measured. It is equivalent to 1.591. Likewise, the base of the semi-finished lens is known and is equivalent to 4 diopters.

One seeks to determine the rear surface of the unifocal lens to meet the preceding prescription.

In order to be able to make comparisons on the lens once it is finished, a semi-finished lens is used whereof the front surface is known. FIGS. 28 and 29 show graphic illustrations of the surface characteristics of the front surface of the semi-finished lens, with the same conventions as before.

The determination method is carried out without taking into account the front surface of the semi-finished lens. For the determination method, the front surface of the semi-finished lens is unknown.

In step 10 of the method, a generic surface is chosen. FIGS. 30 and 31 show graphic illustrations of the surface characteristics of the generic surface, with the same conventions as before. Since the generic surface chosen in the case of example 3 is a sphere, the value of the sphere is constant and the value of the cylinder is zero.

The comparison of FIGS. 28 and 30, on the one hand, and 29 and 31, on the other hand, clearly shows that the chosen generic surface is not the front surface of the semi-finished lens. This illustrates the fact that the method is carried out independently of the front surface of the semi-finished lens.

At the end of the calculation, in step 50, an aspherization layer is obtained. FIGS. 32 and 33 show graphic illustrations of the surface characteristics of the aspherization layer, with the same conventions as before.

The equation of the rear surface of the multifocal ophthalmic lens can then be obtained in step 110 of the method. The lens can then be obtained by machining the rear surface of the provided semi-finished lens.

The optical characteristics then presented in FIGS. 34 to 39 were obtained by calculation. FIGS. 34 to 36 show graphic illustrations of the optical characteristics of a lens obtained according to the inventive method. FIGS. 34 to 36 show graphic illustrations similar to those of FIGS. 13 to 15, with the same conventions.

FIGS. 37 to 39 show graphic illustrations of the optical characteristics of a lens of the prior art. The lens of the prior art is a lens in which the rear surface supports an annulus and the front surface is the front surface of the semi-finished lens. FIGS. 37 to 39 show graphic illustrations similar to those of FIGS. 10 to 12, with the same conventions.

The comparison of FIGS. 34 to 39 shows that in power, the fields are more visible and the lens obtained using the inventive method has weaker gradients. A power gradient is the power variation level per viewing direction unit. Concerning the astigmatism, the isoastigmatism lines are more symmetrical for the lens obtained using the method.

Example 4

In this example, the aim is to obtain a progressive multifocal lens for the following prescription:
prescribed sphere: 2 diopters,
prescribed cylinder: 0 diopter,
0° axis,
addition: 2 diopters.

Furthermore, the wear conditions of the multifocal lens for this prescription are customized wear conditions:
pantoscopic angle: 8°,
curving contour: 15°,
lens-eye distance: 12 mm.

A semi-finished lens is provided. The index of the semi-finished lens is known or measured. It is equivalent to 1.665. Likewise, the base of the semi-finished lens is known and is equivalent to 5.25 diopters. One seeks to determine the rear surface of the unifocal lens to meet the preceding prescription.

In order to be able to make comparisons on the lens once it is finished, a semi-finished lens is used whereof the front surface is known. FIGS. 40 and 41 show graphic illustrations of the surface characteristics of the front surface of the semi-finished lens, with the same conventions as FIGS. 4 to 5.

The determination method is carried out without taking into account the front surface of the semi-finished lens. For the determination method, the front surface of the semi-finished lens is unknown.

In step 10 of the method, a generic surface is chosen. FIGS. 42 and 43 show graphic illustrations of the surface characteristics of the generic surface, with the same conventions as FIGS. 4 to 5.

The comparison of FIGS. 40 and 42, on the one hand, and 41 and 43, on the other hand, clearly shows that the chosen generic surface is not the front surface of the semi-finished lens. This illustrates the fact that the method is carried out independently of the front surface of the semi-finished lens.

At the end of the calculation, in step 50, an aspherization layer is obtained. FIGS. 44 and 45 show graphic illustrations of the surface characteristics of the aspherization layer, with the same conventions as before.

The equation of the rear surface of the multifocal ophthalmic lens can then be obtained in step 110 of the method. The lens can then be obtained by machining the rear surface of the provided semi-finished lens.

The optical characteristics then presented in FIGS. 46 to 51 were obtained by calculation. FIGS. 46 to 48 show graphic illustrations of the optical characteristics of a lens obtained according to the inventive method. FIGS. 46 to 48 show graphic illustrations similar to those of FIGS. 10 to 12, with the same conventions.

FIGS. 49 to 51 show graphic illustrations of the optical characteristics of a lens of the prior art. The lens of the prior art is a lens in which the rear surface supports an annulus and the front surface is the front surface of the semi-finished lens. FIGS. 49 to 51 show graphic illustrations similar to those of FIGS. 13 to 15, with the same conventions.

The comparison of FIGS. 46 to 51 shows that in power, the fields are more visible and the lens obtained using the inventive method has weaker gradients. Furthermore, in the case of the lens obtained using the inventive method, the comparison of the results with [sic] shows that the astigmatism is reduced along the meridian. Moreover, the isoastigmatism lines of the lens obtained using the inventive method (FIG. 48) are more visible in distant vision and near vision than those of the lens of the prior art (FIG. 51).

Example 5

The case of a unifocal lens is now considered.
In this example, the aim is to obtain a unifocal lens for the following prescription:
prescribed sphere: 2 diopters,
prescribed cylinder: 0 diopter,
0° axis.
Furthermore, the wear conditions of the unifocal lens for this prescription are customized wear conditions:
pantoscopic angle: 8°,
curving contour: 15°,
lens-eye distance: 27 mm.
A semi-finished lens is provided. The index of the semi-finished lens is known or measured. It is equivalent to 1.591. Likewise, the base of the semi-finished lens is known and is equivalent to 4 diopters. One seeks to determine the rear surface of the unifocal lens to meet the preceding prescription.

In order to be able to make comparisons on the lens once it is finished, a semi-finished lens is used whereof the front surface is known. FIGS. 52 and 53 show graphic illustrations of the surface characteristics of the front surface of the semi-finished lens, with the same conventions as FIGS. 4 to 5.

The determination method is carried out without taking into account the front surface of the semi-finished lens. For the determination method, the front surface of the semi-finished lens is unknown.

In step 10 of the method, a generic surface is chosen. FIGS. 54 and 55 show graphic illustrations of the surface characteristics of the generic surface, with the same conventions as FIGS. 4 to 5.

The comparison of FIGS. 52 and 54, on the one hand, and 53 and 55, on the other hand, clearly shows that the chosen generic surface is not the front surface of the semi-finished lens. This illustrates the fact that the method is carried out independently of the front surface of the semi-finished lens.

At the end of the calculation, in step 50, an aspherization layer is obtained. FIGS. 56 and 57 show graphic illustrations of the surface characteristics of the aspherization layer, with the same conventions as before.

The equation of the rear surface of the multifocal ophthalmic lens can then be obtained in step 110 of the method. The lens can then be obtained by machining the rear surface of the provided semi-finished lens.

The optical characteristics then presented in FIGS. 58 to 63 were obtained by calculation. FIGS. 58 to 60 show graphic illustrations of the optical characteristics of a lens obtained according to the inventive method. FIGS. 58 to 60 show graphic illustrations similar to those of FIGS. 10 to 12, with the same conventions.

FIGS. 61 to 63 show graphic illustrations of the optical characteristics of a lens of the prior art. The lens of the prior art is a lens in which the rear surface supports an annulus and the front surface is the front surface of the semi-finished lens. FIGS. 61 to 63 show graphic illustrations similar to those of FIGS. 13 to 15, with the same conventions.

The comparison of FIGS. 58 to 63 shows that in power, the fields are more visible. Furthermore, in the case of the lens obtained using the inventive method, the comparison of the results with [sic] shows that the astigmatism is reduced along the meridian. Moreover, the isoastigmatism lines of the lens obtained using the inventive method (FIG. 60) are more visible than those of the lens of the prior art (FIG. 63).

Example 6

In this example, the aim is to obtain a unifocal lens for the following prescription:
prescribed sphere: 2 diopters,
prescribed cylinder: 2 diopters,
45° axis.
Furthermore, the wear conditions of the unifocal lens for this prescription are customized wear conditions:
pantoscopic angle: 8°,
curving contour: 15°,
lens-eye distance: 27 mm.
A semi-finished lens is provided. The index of the semi-finished lens is known or measured. It is equivalent to 1.591. Likewise, the base of the semi-finished lens is known and is equivalent to 4 diopters. One seeks to determine the rear surface of the unifocal lens to meet the preceding prescription.

In order to be able to make comparisons on the lens once it is finished, a semi-finished lens is used whereof the front surface is known. FIGS. 64 and 65 show graphic illustrations of the surface characteristics of the front surface of the semi-finished lens, with the same conventions as FIGS. 4 to 5.

The determination method is carried out without taking into account the front surface of the semi-finished lens. For the determination method, the front surface of the semi-finished lens is unknown.

In step 10 of the method, a generic surface is chosen. FIGS. 66 and 67 show graphic illustrations of the surface characteristics of the generic surface, with the same conventions as FIGS. 4 to 5.

The comparison of FIGS. 64 and 66, on the one hand, and 65 and 67, on the other hand, clearly shows that the chosen generic surface is not the front surface of the semi-finished lens. This illustrates the fact that the method is carried out independently of the front surface of the semi-finished lens.

At the end of the calculation, in step 50, an aspherization layer is obtained. FIGS. 68 and 69 show graphic illustrations of the surface characteristics of the aspherization layer, with the same conventions as before.

The equation of the rear surface of the multifocal ophthalmic lens can then be obtained in step 110 of the method. The lens can then be obtained by machining the rear surface of the provided semi-finished lens.

The optical characteristics then presented in FIGS. 70 to 75 were obtained by calculation. FIGS. 70 to 72 show graphic illustrations of the optical characteristics of a lens obtained according to the inventive method. FIGS. 70 to 72 show graphic illustrations similar to those of FIGS. 10 to 12, with the same conventions.

FIGS. 73 to 75 show graphic illustrations of the optical characteristics of a lens of the prior art. The lens of the prior art is a lens in which the rear surface supports an annulus and the front surface is the front surface of the semi-finished lens. FIGS. 73 to 75 show graphic illustrations similar to those of FIGS. 13 to 15, with the same conventions.

The comparison of FIGS. 70 to 75 shows that in power, the fields are more visible and that the lens obtained using the inventive method has weaker gradients. Furthermore, in the case of the lens obtained using the inventive method, the comparison of the results with [sic] shows that the astigmatism is reduced along the meridian. Moreover, the isoastigmatism lines of the lens obtained using the inventive method (FIG. 72) are more visible than those of the lens of the prior art (FIG. 75).

The inventive method has therefore made it possible to optimize an ophthalmic lens having controlled optical flaws even when the front surface of the semi-finished lens is not known, and in particular in the case of astigmatic prescriptions or particular wear conditions. This results in improved comfort for the wearer when the lens is machined in a laboratory competing with the manufacturer.

The invention claimed is:

1. A method for determining an aspherization layer for an ophthalmic lens for a wearer having a prescribed astigmatism and a prescribed power, comprising the following steps:
   providing a semi-finished lens with an unknown aspheric surface supported by a front surface or a rear surface of the semi-finished lens, the semi-finished lens having known information;
   choosing a generic surface having known sphere and cylinder values at each point, the generic surface being any surface chosen based on the known information of the semi-finished lens;
   creating a target fictitious lens having a front surface that is the generic surface and a rear surface, the target fictitious lens defining optical targets for each viewing direction from the prescribed astigmatism and the prescribed power;
   creating a current fictitious lens, the current fictitious lens initially being an initial fictitious test lens having a front surface that is the generic surface and a rear surface;
   optimizing the current fictitious lens by modulating the rear surface of the current fictitious lens to achieve the optical targets of the target fictitious lens for each viewing direction; and
   determining a complex aspherization layer corresponding to the rear surface of the optimized current fictitious lens from which the rear surface of the initial fictitious test lens is subtracted, the complex aspherization layer for use in determining the ophthalmic lens.

2. The method according to claim 1, wherein the optical targets of the target fictitious lens are defined under standard wear conditions.

3. The method according to claim 1, wherein the current fictitious lens is positioned under standard wear conditions during optimization.

4. The method according to claim 1, wherein the current fictitious lens is positioned under customized wear conditions during optimization.

5. The method according to claim 1, wherein the rear surface of the target fictitious lens is a first simple surface such that the target fictitious lens has an average power value at a first reference point substantially equal to a sum of the prescribed power and half of the prescribed astigmatism and a substantially null value of the prescribed astigmatism at the first reference point, and wherein the rear surface of the initial fictitious lens is a second simple surface such that the initial fictitious test lens has an average power value at a second reference point substantially equal to the prescribed power and an astigmatism value at the second reference point equal to the prescribed astigmatism.

6. The method according to claim 5, wherein the target fictitious lens is a progressive lens, the first reference point being a distant vision control point.

7. The method according to claim 1, wherein the rear surface of the target fictitious lens is a first simple surface such that the target fictitious lens has an average power value at a first reference point substantially equal to the prescribed power and an astigmatism value at the first reference point substantially equal to the prescribed power, and wherein rear surface of the initial fictitious lens is a second simple surface such that the initial fictitious test lens has an average power value at a second reference point substantially equal to the prescribed power and an astigmatism value at the second reference point substantially equal to the prescribed astigmatism.

8. The method according to claim 7, wherein the target fictitious lens is a progressive lens, the second reference point being a distant vision control point.

9. The method according to claim 1, wherein lens and base index values are provided for the target fictitious lens and the initial fictitious test lens.

10. The method according to claim 9, wherein the lens and base index values are provided by the semi-finished lens.

11. The method according to claim 1, wherein the optical targets of the target fictitious lens include at least one of a power target, an astigmatism target, a resulting astigmatism target, a prismatic deviation target, or a distortion target.

12. The method according to claim 1, wherein the rear surface of the target fictitious lens is a first simple surface and the rear surface of the initial fictitious lens is a second simple surface, the first and second simple surfaces being an annulus or a sphere.

13. The method according to claim 1, further comprising:
   determining the ophthalmic lens such that it has a front surface of the semi-finished lens and a rear surface having a surface obtained by a sum of the complex aspherization layer and a simple surface such that a power value at a reference point is equal to the prescribed power and an astigmatism value at the reference point is equal to the prescribed astigmatism.

14. The method according to claim 13, wherein the provided semi-finished lens is a progressive lens, the chosen generic surface having an addition that is the same addition as the semi-finished lens.

15. The method according to claim 13, wherein the provided semi-finished lens is a progressive lens, the chosen generic surface having a progression length that is the same progression length as the semi-finished lens.

16. The method of claim 1, wherein the known information of the semi-finished lens includes at least one of: a value of a base of the semi-finished lens; a value of an index of the semi-finished lens; or an addition of the semi-finished lens and a progression length of the semi-finished lens.

17. A method for determining an ophthalmic lens for a wearer having a prescribed astigmatism and a prescribed power, the method comprising:
   obtaining a semi-finished lens having a front surface that is an unknown aspheric surface; and
   determining the ophthalmic lens such that it has a front surface having a geometry corresponding to the front surface of the semi-finished lens and a rear surface having a surface obtained by a sum of a complex aspherization layer and a simple surface such that a power value at a reference point is equal to the prescribed power and an astigmatism value at the reference point is equal to the prescribed astigmatism.

18. An ophthalmic lens for a wearer having a prescribed astigmatism and a prescribed power, the ophthalmic lens comprising:

a front surface having a geometry corresponding to a front surface of a semi-finished lens, the front surface of the semi-finished lens being an unknown aspheric surface, and a rear surface having a surface obtained by a sum of a complex aspherization layer and a simple surface such that a power value at a reference point is equal to the prescribed power and an astigmatism value at the reference point is equal to the prescribed astigmatism.

19. The ophthalmic lens according to claim 18, the ophthalmic lens is a progressive lens and the reference point is a distant vision control point.

\* \* \* \* \*